(12) United States Patent
Li et al.

(10) Patent No.: US 11,041,958 B2
(45) Date of Patent: Jun. 22, 2021

(54) SENSING ASSEMBLY FOR AUTONOMOUS DRIVING

(71) Applicant: SZ DJI TECHNOLOGY CO., LTD., Shenzhen (CN)

(72) Inventors: Wei Li, Shenzhen (CN); Lu Ma, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/664,204

(22) Filed: Oct. 25, 2019

(65) Prior Publication Data

US 2020/0064483 A1  Feb. 27, 2020

Related U.S. Application Data

(63) Continuation of application No. PCT/CN2017/082606, filed on Apr. 28, 2017.

(51) Int. Cl.
| | |
|---|---|
| *G01S 17/931* | (2020.01) |
| *G01S 17/86* | (2020.01) |
| *G01S 13/42* | (2006.01) |
| *G01S 13/931* | (2020.01) |
| *G01S 17/89* | (2020.01) |
| *G05D 1/02* | (2020.01) |
| *H01Q 1/32* | (2006.01) |
| *H04L 29/08* | (2006.01) |

(52) U.S. Cl.
CPC .......... *G01S 17/931* (2020.01); *G01S 13/428* (2013.01); *G01S 13/931* (2013.01); *G01S 17/86* (2020.01); *G01S 17/89* (2013.01); *G05D 1/024* (2013.01); *H01Q 1/3233* (2013.01); *H04L 67/12* (2013.01); *G01S 2013/93271* (2020.01); *G01S 2013/93272* (2020.01); *G01S 2013/93274* (2020.01)

(58) Field of Classification Search
CPC .............................. G01S 17/86; G01S 13/428
See application file for complete search history.

(56) References Cited

U.S. PATENT DOCUMENTS

| | | | |
|---|---|---|---|
| 7,427,943 B1* | 9/2008 | Kronfeld | G01S 7/20 342/26 B |
| 8,902,103 B2* | 12/2014 | Kim | G01S 13/345 342/70 |
| 2010/0020306 A1* | 1/2010 | Hall | H01S 5/0428 356/5.01 |
| 2016/0282468 A1 | 9/2016 | Gruver et al. | |
| 2016/0292872 A1* | 10/2016 | Hammond | G01S 17/933 |

(Continued)

FOREIGN PATENT DOCUMENTS

WO   2016025136 A1   2/2016

OTHER PUBLICATIONS

The World Intellectual Property Organization (WIPO) International Search Report and Written Opinion for PCT/CN2017/082606 dated Feb. 1, 2018 7 pages.

*Primary Examiner* — Marcus E Windrich
(74) *Attorney, Agent, or Firm* — Anova Law Group, PLLC

(57) ABSTRACT

An autonomous driving assembly for a vehicle includes a plurality of lidar units configured to be supported by a vehicle body. The lidar units are collectively configured to detect a periphery region in proximity to the vehicle body to aid in autonomous driving upon coupling the driving assembly to the vehicle body. Each of the plurality of lidar units has a field of view of less than about 180 degrees.

18 Claims, 23 Drawing Sheets

(56) References Cited

U.S. PATENT DOCUMENTS

| | | | |
|---|---|---|---|
| 2017/0023946 A1* | 1/2017 | Humphrey | G01S 7/4813 |
| 2017/0075355 A1 | 3/2017 | Micks et al. | |
| 2017/0293025 A1* | 10/2017 | Davis | G01S 13/931 |
| 2017/0313247 A1* | 11/2017 | Hsu | G06T 7/70 |
| 2018/0067966 A1* | 3/2018 | Oder | G01S 13/865 |
| 2018/0074202 A1* | 3/2018 | Liang | G01S 17/86 |
| 2018/0105107 A1* | 4/2018 | Hassan-Shafique | G01S 17/931 |
| 2018/0149742 A1* | 5/2018 | Izadian | H01Q 1/1264 |
| 2018/0231654 A1* | 8/2018 | Bilik | G01S 17/931 |
| 2018/0288320 A1* | 10/2018 | Melick | G01S 17/86 |
| 2019/0011538 A1* | 1/2019 | Schwarz | G01S 7/4817 |
| 2019/0049577 A1* | 2/2019 | Iida | H01Q 21/0025 |

* cited by examiner

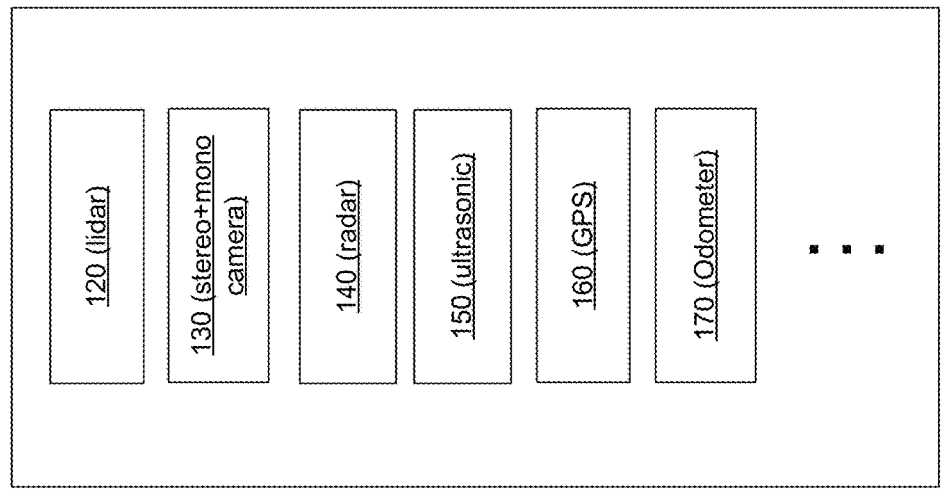
FIG. 2

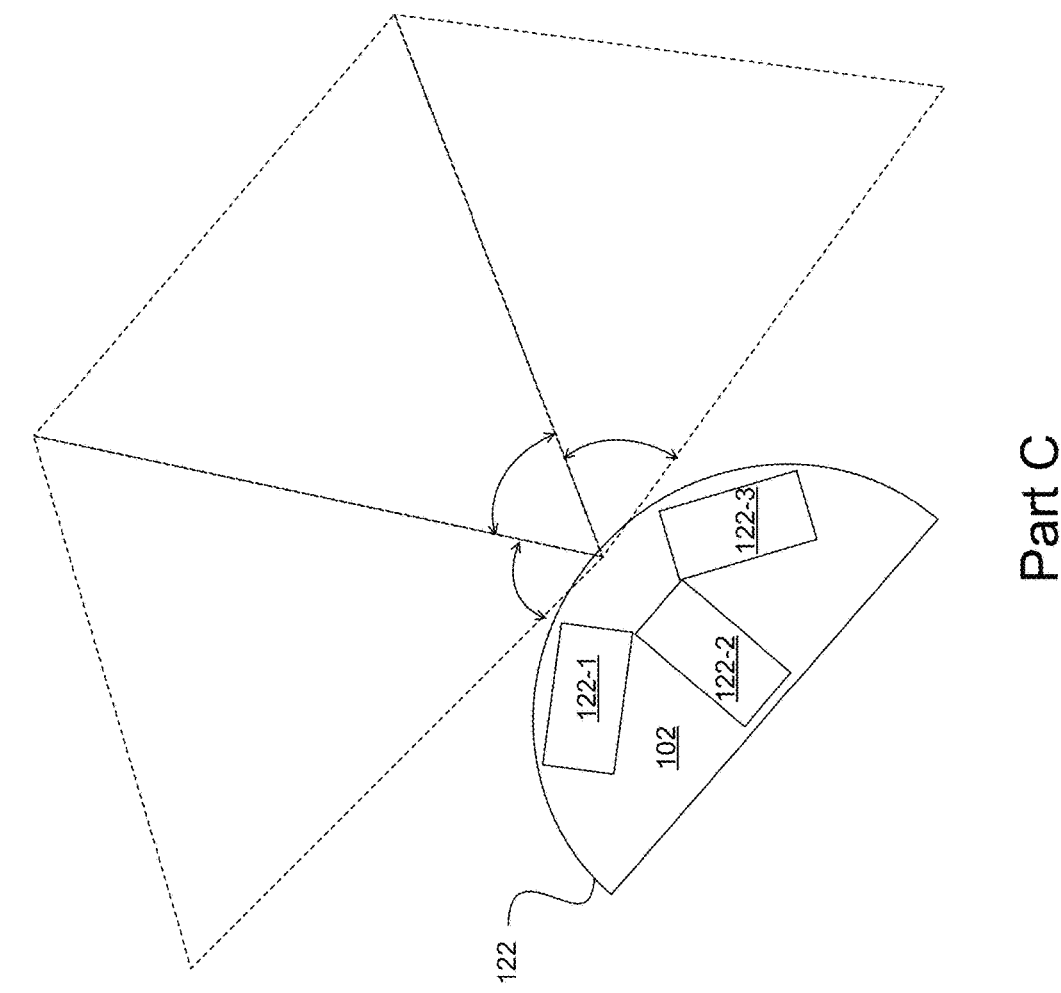
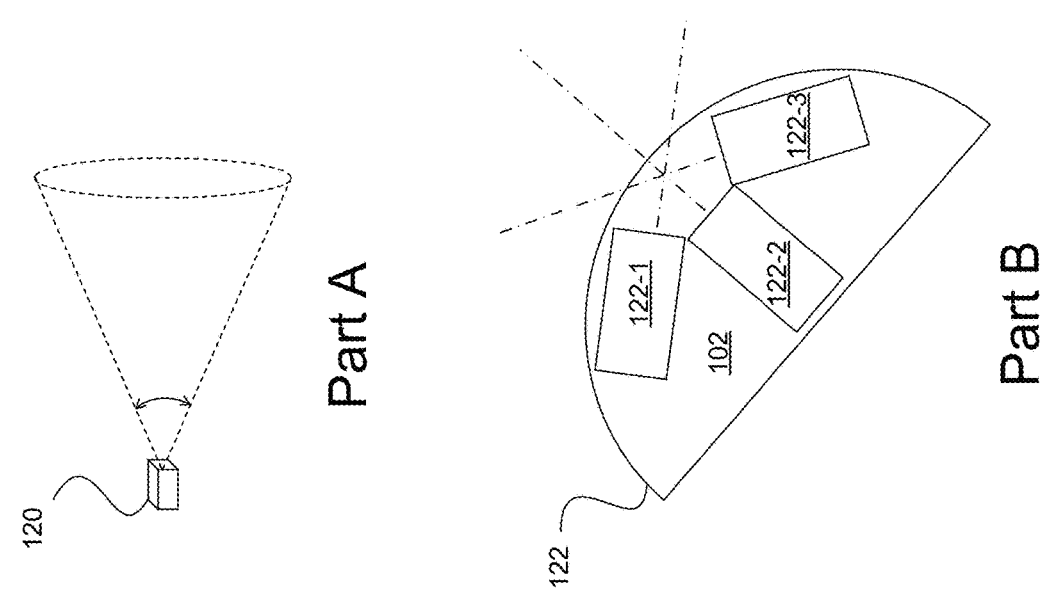
FIG. 4

Aerial top view

SENSING ASSEMBLY FOR AUTONOMOUS DRIVING

CROSS-REFERENCE TO RELATED APPLICATION

This application is a continuation of International Application No. PCT/CN2017/082606, filed Apr. 28, 2017, the entire content of which is incorporated herein by reference.

BACKGROUND

Autonomous vehicles are designed to sense and navigate through an environment without guidance from a human controller. Examples of autonomous vehicles include "self-driving" automobiles that are capable of driving without (or with minimal) human intervention. Automatically driving systems can detect an environment of a vehicle and allow autonomous navigation of the vehicle using multiple sensors. Various types of sensors can be used to generate positional and motion information enabling control and navigation of an autonomous vehicle. For example, some autonomous driving systems utilize a variety of sensors such as the Velodyne 64-channel lidar to achieve environmental detection.

However, current sensing systems for autonomous piloting of vehicles can be less than ideal. Current sensing systems such as the Velodyne 64-channel lidar are costly and may not have redundancies built-in. For example, such systems may be not be capable of determining which sensors to utilize, particularly when one or more sensors are malfunctioning or generating inaccurate data under different environmental conditions. The limited abilities of current sensing systems may reduce their usefulness and potentially comprise the safety of autonomous vehicles when the vehicles are self-piloting through certain types of environments.

SUMMARY

A need exists for improved autonomous driving systems. In some embodiments, the autonomous driving systems can (1) enable seamless environmental sensing in 360 degrees, (2) provide redundant, reliable and stable environment sensing data, and/or (3) effect an easy and quick sensor calibration and a real-time calibration verification. In some cases, the autonomous driving systems can be configured to select which sensors and/or data to utilize under various driving and/or environmental conditions.

The present disclosure addresses this need and provides related advantages as well. For example, the embodiments described herein can enhance flexibility and accuracy autonomous driving systems for vehicles such as automobiles. In particular, the disclosed methods and systems can improve the operational safety of vehicles, and enable these vehicles to be self-piloted in a safe manner.

An aspect of the disclosure is directed to an autonomous driving assembly for a vehicle, said assembly comprising: a plurality of lidar units configured to be supported by a vehicle body, said lidar units collectively configured to detect a periphery region in proximity to the vehicle body to aid in autonomous driving upon coupling said driving assembly to the vehicle body, wherein each of the plurality of lidar units has a field of view of less than about 180 degrees.

In some embodiments, the plurality of lidar units comprise a first subset of lidar units comprising at least two lidar units having a fixed disposition relative to one another, and a second subset of lidar units comprising at least two lidar units having a fixed disposition relative to one another. In some embodiments, the first subset of lidar units and the second subset of lidar units are supported on different areas of the vehicle body, and configured to work in concert to detect said region or a portion thereof. In some embodiments, the region detectable by the plurality of lidar units extends around the vehicle body in 360 degrees. In some embodiments, the first subset of lidar units is supported by a first support structure, and the second subset of lidar units is supported by a second support structure that is separate from the first support structure. In some embodiments, each of the plurality of lidar units is a single channel lidar unit. In some embodiments, at least one of the plurality of lidar units is a multi-channel lidar unit. In some embodiments, the plurality of lidar units are not part of a multi-channel monolithic lidar unit.

In some embodiments, the first subset of lidar units comprises a first lidar unit optically aligned in a first direction and a second lidar optically aligned in a second direction, wherein an angle between the first direction and the second direction is about 50 degrees or less. In some embodiments, each of the plurality of lidar units has a field of view less than about 90 degrees. In some embodiments, each of the plurality of lidar units has a field of view of about 60 degrees. In some embodiments, the plurality of lidar units comprise less than or equal to about 12 lidar units.

In some embodiments, the first subset of lidar units is located at a first corner of the vehicle and the second subset of lidar units is located at a second corner of the vehicle. In some embodiments, the first and second corners are located on a same side of the vehicle. In some embodiments, the first and second corners are located on different sides of the vehicle. In some embodiments, the first and second corners are located on opposite sides of the vehicle. In some embodiments, the first and second corners are located on adjacent sides of the vehicle. In some embodiments, the plurality of lidar units further comprise: a third subset of lidar units comprising at least two lidar units supported by a third support structure and a fourth subset of lidar units comprising at least two lidar units supported by a fourth support structure. In some embodiments, the third subset of lidar units is located at a third corner of the vehicle and the fourth subset of lidar units is located at a fourth corner of the vehicle. In some embodiments, the third and fourth corners of the vehicle are located opposite to the first and second corners of the vehicle. In some embodiments, the first subset of lidar units may be primarily oriented facing outward along a first diagonal from the first corner of the vehicle, the second subset of lidar units may be primarily oriented facing outward along a second diagonal from the second corner of the vehicle, the third subset of lidar units may be primarily oriented facing outward along a third diagonal from a third corner of the vehicle, and the fourth subset of lidar units may be primarily oriented facing outward along a fourth diagonal from a fourth corner of the vehicle.

In some embodiments, the first and second subsets of lidar units are located on a same side or different sides of the vehicle. In some embodiments, the first subset of lidar units is located on a first side of the vehicle and the second subset of lidar units is located on a second side of the vehicle. In some embodiments, the first and second sides of the vehicle are adjacent to each other. In some embodiments, the first and second sides of the vehicle are opposite to each other. In some embodiments, the plurality of lidar units further comprise: a third subset of lidar units comprising at least two lidar units supported by a third support structure and a fourth subset of lidar units comprising at least two lidar units supported by a fourth support structure. In some embodiments, the third subset of lidar units is located on a third side of the vehicle and the fourth subset of lidar units is located on a fourth side of the vehicle. In some embodiments, at least two of the first, second, third and fourth sides are located on opposite sides of the vehicle. In some embodiments, wherein at least two of the first, second, third and fourth sides are located on adjacent sides of the vehicle.

In some embodiments, the first subset of lidar units is primarily oriented in a first direction facing away from the vehicle, the second subset of lidar units is primarily oriented in a second direction facing away from the vehicle. In some embodiments, the plurality of lidar units further comprise: a third subset of lidar units comprising at least two lidar units supported by a third support structure and a fourth subset of lidar units comprising at least two lidar units supported by a fourth support structure. In some embodiments, the third subset of lidar units is primarily oriented in a third direction facing away from the vehicle, and the fourth subset of lidar units is primarily oriented in a fourth direction facing away from the vehicle. In some embodiments, two or more of the first, second, third, and fourth directions are orthogonal to each other. In some embodiments, two or more of the first, second, third, and fourth directions are parallel to each other. In some embodiments, two or more of the first, second, third, and fourth directions are oblique to each other.

In some embodiments, the first subset of lidar units comprises at least three lidar units supported by the first support structure. In some embodiments, the at least three lidar units of the first subset of lidar units are arranged in a manner to increase overlap between adjacent fields of view of said lidar units. In some embodiments, the second subset of lidar units comprises at least three lidar units supported by the second support structure. In some embodiments, the at least three lidar units of the second subset of lidar units are arranged in a manner to increase overlap between adjacent fields of view of said lidar units. In some embodiments, the first subset of lidar units is configured to move relative to the second subset of lidar units so as to adjust an overlap of field of view therebetween. In some embodiments, the first subset of lidar units and the second subset of lidar units are configured to move relative to each other so as to adjust an overlap of field of view therebetween. In some embodiments, an overlap of field of view between the first subset of lidar units and the second subset of lidar units is adjustable in real-time to compensate for blind spots while the vehicle is in operation. In some embodiments, at least 70 degrees of overlap of field of view exists between the first subset of lidar units and the second subset of lidar units. In some embodiments, the first subset of lidar units comprises a collective field of view of at least 160 degrees, and the second subset of lidar units comprises a collective field of view of at least 160 degrees.

In some embodiments, a collective field of view of the first subset of lidar units is adjustable in real-time by a changing a position of at least one lidar unit in the first subset of lidar units while the vehicle is in operation. In some embodiments, a collective field of view of the second subset of lidar units is adjustable in real-time by a changing a position of at least one lidar unit in the second subset of lidar units while the vehicle is in operation. In some embodiments, a collective field of view of the first and second subsets of lidar units is adjustable in real-time by a changing a position of at least one of the first and second subsets of lidar units while the vehicle is in operation. In some embodiments, the collective field of view of the first and second subsets of lidar units is adjustable by changing the positions of the first and second subsets of lidar units relative to each other. In some embodiments, the collective field of view of the first and second subsets of lidar units is adjustable by changing the position of the first subsets of lidar units relative to the second subset of lidar units.

In some embodiments, the collective field of view of the first and second subsets of lidar units is inversely proportional to a collective detection range of the first and second subsets of lidar units. In some embodiments, an increase in the collective field of view of the first and second subsets of lidar units causes the collective detection range of the first and second subsets of lidar units to decrease. In some embodiments, the collective field of view and the collective detection range of the first and second subsets of lidar units are adjustable in real-time while the vehicle is in operation, depending on a width of the collective field of view that is being selected, and/or depending on a distance of the collective detection range that is being selected.

In some embodiments, each lidar unit of the first subset of lidar units is fixedly attached to the first support structure, and each lidar unit of the second subset of lidar units is fixedly attached to the second support structure. In some embodiments, the at least two lidar units of the first subset of lidar units are configured to not move relative to one another during operation of the vehicle, and wherein the at least two lidar units of the second subset of lidar units are configured to not move relative to one another during operation of the vehicle. In some embodiments, each of the plurality of lidar units is configured to remain at a fixed position relative to the vehicle body during operation of the vehicle. In some embodiments, the fixed disposition between the at least two lidar units of the first subset of lidar units is maintained with aid of a fixture device configured to rigidly affix said lidar units.

In some embodiments, the fixed disposition between the at least two lidar units of the first subset of lidar units is maintained with aid of a carrier. In some embodiments, the carrier is configured to permit movement in one or more degrees of freedom so as to maintain the fixed disposition between the at least two lidar units of the first subset of lidar units. In some embodiments, the carrier comprises a single-axis gimbal or a multi-axis gimbal. In some embodiments, the carrier is configured to adjust a position of at least one of the two lidar units of the first subset of lidar units, so as to maintain the fixed disposition between the at least two lidar units. In some embodiments, the carrier is configured to adjust said position of the at least one of the two lidar units in real-time during operation of the vehicle. In some embodiments, the fixed disposition between the at least two lidar units of the first subset of lidar units is maintained with aid of one or more linkages. In some embodiments, the linkages include serial and/or parallel linkages. In some embodiments, the fixed disposition between the at least two lidar units of the first subset of lidar units is maintained with aid of a kinematic coupling. In some embodiments, the fixed disposition between the at least two lidar units of the first subset of lidar units is maintained by mechanically coupling said lidar units in a rigid manner.

In some embodiments, at least one of the plurality of lidar units is configured to move relative to the vehicle body during operation of the vehicle. In some embodiments, the at least one of the plurality of lidar units is configured to move relative to the vehicle body with aid of a carrier. In some embodiments, the first subset of lidar units is configured to move relative to the second subset of lidar units to focus on a predefined portion of said region while the vehicle is in operation. In some embodiments, the first subset of lidar units and the second subset of lidar units are configured to move relative to each other to focus on a predefined portion of said region while the vehicle is in operation. In some embodiments, the first subset of lidar units and the second subset of lidar units are configured to move relative to each other with aid of one or more carriers.

In some embodiments, the predefined portion of said region has a different object density than rest of said region. In some embodiments, the predefined portion of said region has a higher object density than rest of said region.

In some embodiments, the assembly further comprises: a long range lidar unit comprising a field of view that is narrower than a collective field of view of the plurality of lidar units. In some embodiments, the field of view of the long range lidar is narrower than a collective field of view of the first subset of lidar units or the second subset of lidar units. In some embodiments, the field of view of the long range lidar is greater than a collective field of view of the first subset of lidar units or the second subset of lidar units. In some embodiments, the long range lidar unit comprises a greater distance range than the plurality of lidar units. In some embodiments, the long range lidar unit has a primary direction facing the front of the vehicle.

In some embodiments, the first and/or second subsets of lidar units undergoes an initial intrinsic calibration prior to utilization of the first and/or second subsets of lidar units for sensing. In some embodiments, the lidar units within the first subset do not require online calibration during operation of the vehicle, and the lidar units within the second subset do not require online calibration during operation of the vehicle. In some embodiments, the first subset of lidar units and the second subset of lidar units undergo an online calibration relative to each other during the operation of the vehicle.

An additional aspect of the disclosure is directed to a vehicle comprising the autonomous driving assembly as previously described. In some embodiments, the vehicle is a land-bound vehicle. In some embodiments, the vehicle comprises space for one or more passengers. In some embodiments, the vehicle comprises one or more additional sensors configured to collect information about an environment around the vehicle. In some embodiments, the one or more additional sensors comprise one or more of the following: vision sensor, ultrasonic sensor, GPS, or wheel odometer. In some embodiments, the one or more additional sensors comprises a millimeter wave radar. In some embodiments, the information from the one or more additional sensors is combined with information from the plurality of lidar units to aid in autonomous operation of the vehicle. In some embodiments, the one or more additional sensors are calibrated to at least one of the first or second subsets of lidar units.

Further aspects of the disclosure are directed to a method of collecting information around a vehicle for autonomous driving, said method comprising: supporting, with aid of a vehicle body, a plurality of lidar units of an autonomous driving assembly for the vehicle, said lidar units collectively configured to detect a periphery region in proximity to the vehicle body to aid in autonomous driving upon coupling said driving assembly to the vehicle body, wherein each of the plurality of lidar units has a field of view of less than 180 degrees.

In some embodiments, the plurality of lidar units comprise a first subset of lidar units and a second subset of lidar units, the method further comprising: obtaining data using the first subset of lidar units comprising at least two lidar units having a fixed disposition relative to one another, and obtaining data using the second subset of lidar units comprising at least two lidar units having a fixed disposition relative to one another, wherein the first subset of lidar units and the second subset of lidar units are supported on different areas of the vehicle body, and configured to work in concert to detect said region or a portion thereof.

In accordance with additional aspects of the disclosure, a sensing system to aid in autonomous operation of a vehicle is provided, said sensing system comprising: a plurality of sensors configured to be supported by a vehicle body, wherein said plurality of sensors comprise: (1) a first set of sensors comprising two or more different types of sensors oriented in a forward-facing direction and configured to detect two or more regions in front of the vehicle, and (2) a second set of sensors comprising one or more types of sensors oriented in a plurality of directions and configured to detect one or more regions in proximity to or surrounding the vehicle, wherein a range of each of the two or more regions in front of the vehicle extends farther away from the vehicle compared to a range of each of the one or more regions in proximity to or surrounding the vehicle.

In some embodiments, the first set of sensors is configured to be oriented in the forward-facing direction while the vehicle is moving in the forward direction. In some embodiments, at least one sensor from the first set of sensors is configured to change its orientation based on the vehicle's motion or predicted motion path. In some embodiments, the at least one type of sensor from the first set of sensors is configured to change its orientation in real-time to preemptively scan for obstacles prior to or as the vehicle is changing its motion or predicted motion path. In some embodiments, the at least one type of sensor from the first set of sensors is configured to change its orientation by rotating a predetermined amount based on the vehicle's motion or predicted motion path. In some embodiments, the at least one type of sensor from the first set of sensors is configured to rotate clockwise prior to or as the vehicle changes its direction to the right, so as to detect a region to the front-right of the vehicle. In some embodiments, the at least one type of sensor from the first set of sensors is configured to rotate counterclockwise prior to or as the vehicle changes its direction to the left, so as to detect a region to the front-left of the vehicle. In some embodiments, an angle of rotation of the at least one type of sensor from the first set of sensors is adjusted based on a turn angle or arc length in the vehicle's motion or predicted motion path. In some embodiments, the predicted motion path is predicted based on a vehicle input and/or a map of an environment where the vehicle is located. In some embodiments, said vehicle input comprises a driving route between a start point and a destination. In some embodiments, said vehicle input comprises activation of a turn signal of the vehicle. In some embodiments, said vehicle input comprises a rotation of a steering wheel of the vehicle. In some embodiments, said vehicle input comprises a change in direction of one or more driving wheels of the vehicle.

In some embodiments, the two or more different types of sensors in the first set of sensors are selected from the group consisting of a monocular camera, a long range lidar unit, and a millimeter-wavelength radar unit. In some embodiments, the first set of sensors further comprises one or more types of sensors oriented in a backward-facing direction. In some embodiments, the one or more types of sensors oriented in the backward-facing direction are selected from the group consisting of a monocular camera, a long range lidar unit, and a millimeter-wavelength radar unit. In some embodiments, the first set of sensors comprises more types of sensors that are oriented in the forward-facing direction than the backward-facing direction.

In some embodiments, the forward-facing monocular camera is configured having a higher imaging resolution than the backward-facing monocular camera. In some embodiments, the forward-facing monocular camera has a 4K imaging resolution and the backward-facing monocular camera has a 1080p imaging resolution.

In some embodiments, the two or more regions in front of the vehicle overlap with one another. In some embodiments, the two or more regions in front of the vehicle comprise (1) a first region detectable by a first type of sensor selected from the first set of sensors and (2) a second region detectable by a second type of sensor selected from the first set of sensors. In some embodiments, the first detectable region lies completely within the second detectable region. In some embodiments, a portion of the first detectable region lies within the second detectable region, and another portion of the first detectable region lies outside of the second detectable region. In some embodiments, the first detectable region and the second detectable region have different ranges. In some embodiments, a range of the second detectable region is greater than a range of the first detectable region. In some embodiments, an area or volume of the first detectable region is determined by a scan angle of the first type of sensor, and an area or volume of the second detectable region is determined by a scan angle of the second type of sensor. In some embodiments, the scan angle of the first type of sensor is greater than the scan angle of the second type of sensor. In some embodiments, a detection range of the first type of sensor is less than a detection range of the second type of sensor. In some embodiments, the detection range of at least one of the first and second types of sensors is at least 180 m. In some embodiments, all of the sensors from the first set of sensors are operational and actively detecting the two or more regions in front of the vehicle while the vehicle is moving forward.

In some embodiments, the first type of sensor is more suitable for use in a first type of environment, and the second type of sensor is more suitable for use in a second type of environment. In some embodiments, the first type of environment comprises one or more of the following elements: rain, snow, fog, and heavy dust. In some embodiments, the first and second types of environment have different lighting conditions. In some embodiments, the first and second types of environment comprises different object densities, different types of objects, and/or different sizes of objects. In some embodiments, the first and second types of environment have different visibility ranges. In some embodiments, the first type of sensor is configured to actively detect the first region and the second type of sensor is configured to be passive or inactive while the vehicle is moving through or about to move through the first type of environment. In some embodiments, the second type of sensor is configured to actively detect the second region and the first type of sensor is configured to be passive or inactive while the vehicle is moving through or about to move through the second type of environment. In some embodiments, the first and second types of sensors are configured to collect data as the vehicle is moving through the first and second types of environment. In some embodiments, the data from the first type of sensor is processed, and the data from the second type of sensor is not processed, as the vehicle is moving through the first type of environment. In some embodiments, the data from the second type of sensor is processed, and the data from the first type of sensor is not processed, as the vehicle is moving through the second type of environment.

In some embodiments, the first set of sensors are rigidly coupled to the vehicle body. In some embodiments, the first set of sensors are movably coupled to the vehicle body. In some embodiments, the first set of sensors are movable relative to the vehicle body with aid of one or more carriers. In some embodiments, the one or more carriers are configured to permit movement of the first set of sensors about one or more degrees of freedom. In some embodiments, the first set of sensors comprises at least one type of sensor rigidly coupled to the vehicle body and at least one other type of sensor movably coupled to the vehicle body. In some embodiments, the two or more different types of sensors from the first set of sensors are coupled adjacent to one another in a lateral configuration on the vehicle body. In some embodiments, the two or more different types of sensors from the first set of sensors are coupled adjacent to one another in a vertical configuration on the vehicle body.

In some embodiments, the one or more different types of sensors in the second set of sensors are selected from the group consisting of stereo cameras, lidar units, and ultrasonic sensors. In some embodiments, the second set of sensors comprise a plurality of stereo cameras and a plurality of lidar units. In some embodiments, the plurality of stereo cameras are configured to capture color image and depth data. In some embodiments, data collected by the plurality of stereo cameras and data collected by the plurality of lidar units from the second set of sensors are fused together to generate a set of RGB-D data that is representative of a 3D color map of a region in proximity to or surrounding the vehicle. In some embodiments, the RGB-D data is usable to detect the presence and type of obstacles in a region in proximity to or surrounding the vehicle. In some embodiments, the RGB-D data is fused with data from other types of sensors from the first and/or second sets of sensors to extract more details about a region in proximity to or surrounding the vehicle. In some embodiments, data collected by the plurality of stereo cameras is used for obstacle detection and for generating a first set of obstacle information, wherein data collected by the plurality of lidar units is used for obstacle detection and for generating a second set of obstacle information, and wherein the first and second sets of obstacle information are fused together to generate an environmental map of a region in proximity to or surrounding the vehicle. In some embodiments, different weight values are assigned to the first and second sets of obstacle information depending on a visibility factor of a region in proximity to or surrounding the vehicle. In some embodiments, the visibility factor is determined based on the data collected by the plurality of stereo cameras. In some embodiments, the first set of obstacle information is assigned a higher weight value than the second set of obstacle information when the visibility factor is above a predetermined threshold. In some embodiments, the first set of obstacle information is assigned a lower weight value than the second set of obstacle information when the visibility factor is below the predetermined threshold.

In some embodiments, the plurality of stereo cameras comprise a plurality of vision sensors supported on multiple sides of the vehicle body. In some embodiments, the plurality of vision sensors is configured to collect data from four sides around the vehicle body. In some embodiments, the plurality of vision sensors are configured to be combined in different ways to form different stereo cameras. In some embodiments, the plurality of vision sensors are combinable to form a multi-ocular vehicular surround vision system. In some embodiments, the plurality of vision sensors comprise: (1) a first subset of vision sensors comprising at least two vision sensors having a first baseline that collectively form a first stereo camera, and (2) a second subset of vision sensors comprising at least two vision sensors having a second baseline shorter than the first baseline and that collectively form a second stereo camera. In some embodiments, the first stereo camera has a farther visual detection range than the second stereo camera. In some embodiments, the first stereo camera has a wider field of view than the second stereo camera. In some embodiments, the second stereo camera is configured to detect a first region that falls outside the field of view of the first stereo camera. In some embodiments, the first region corresponds to a blind spot of the first stereo camera. In some embodiments, the first region is closer to the vehicle body than a second region that falls within the field of view of the first stereo camera. In some embodiments, the first stereo camera and the second stereo camera utilize at least one common vision sensor. In some embodiments, each of the first stereo camera and the second stereo camera comprises a unique pair of vision sensors. In some embodiments, a pair of vision sensors of the second stereo camera is positioned between a pair of vision sensors of the first stereo camera on at least one side of the vehicle body. In some embodiments, the second stereo camera comprises (1) a first vision sensor positioned between a pair of vision sensors of the first stereo camera, and (2) a second vision sensor that is not positioned between the pair of vision sensors of the first stereo camera. In some embodiments, the first subset of vision sensors and the second subset of vision sensors are on a first side of the vehicle, and the sensing system further comprises a third subset of vision sensors comprising at least two vision sensors collectively configured to collect data from a second side of the vehicle and a fourth subset of vision sensors comprising at least two vision sensors collectively configured to collect data from the second side of the vehicle, wherein the third subset and the fourth subset of vision sensors utilize at least one common vision sensor. In some embodiments, the second side of the vehicle is opposite the first side of the vehicle. In some embodiments, the sensing system further comprises a fifth subset of vision sensors comprising at least two vision sensors on a third side of the vehicle and collectively configured to collect data from the third side of the vehicle. In some embodiments, the third side of the vehicle is a front side of the vehicle. In some embodiments, the fifth subset of vision sensors does not utilize any common vision sensors with the first subset or second subset of vision sensors. In some embodiments, the sensing system is configured to collect data from at least three sides around the vehicle body with aid of 8 vision sensors or less. In some embodiments, the sensing system is configured to collect data from at least 225 degrees around the vehicle body with aid of 8 vision sensors or less.

In some embodiments, each type of sensor in the first and second sets of sensors is configured to obtain and automatically transmit data directly to a sensing module subscribed to the corresponding type of sensor. In some embodiments, the plurality of types of sensors in the first and second sets of sensors are configured to obtain the data in an asynchronous manner. In some embodiments, the plurality of types of sensors in the first and second sets of sensors are configured to obtain the data at different frequencies. In some embodiments, the data obtained by the plurality of types of sensors is synchronized and/or calibrated at predetermined time intervals. In some embodiments, two or more types of sensors in the first and second sets of sensors are configured to obtain and automatically transmit data to a sensor fusion module for fusing together said data.

In some embodiments, the second set of sensors comprises a plurality of ultrasonic sensors supported on multiple sides of the vehicle body. In some embodiments, the plurality of ultrasonic sensors are configured to detect objects independent of visual characteristics of said objects, wherein said visual characteristics include a color, reflectivity, and/or texture of said objects. In some embodiments, the plurality of ultrasonic sensors are configured to detect objects that are not capable of being detected by cameras in the first and second sets of sensors. In some embodiments, at least one of the plurality of ultrasonic sensors is movable relative to the vehicle body with aid of a carrier. In some embodiments, the at least one of the plurality of ultrasonic sensors is movable about one or more degrees of freedom with aid of the carrier. In some embodiments, the carrier comprises a single axis gimbal or a multi-axis gimbal. In some embodiments, the at least one of the plurality of ultrasonic sensors is configured to move to scan one or more regions that are not covered by the other types of sensors of the first and second sets of sensors. In some embodiments, the one or more regions that are not covered by the other types of sensors of the first and second sets of sensors, are located within a range of 8 m or less from the vehicle body. In some embodiments, the at least one of the plurality of ultrasonic sensors is configured to move relative to the vehicle body while the vehicle is in operation. In some embodiments, two or more of the plurality of ultrasonic sensors are configured to move relative to each other to cover a blind spot in proximity to the vehicle.

Aspects of the disclosure are directed to a vehicle comprising the sensing system as described previously herein. In some embodiments, the vehicle is a land-bound vehicle. In some embodiments, the vehicle comprises space for one or more passengers. In some embodiments, the vehicle comprises one or more additional sensors configured to collect information about an environment in proximity to or around the vehicle. In some embodiments, the one or more additional sensors comprise one or more of the following: GPS, infrared sensors, or wheel odometer. In some embodiments, the information from the one or more additional sensors is combined with information from the first and second sets of sensors to aid in the autonomous operation of the vehicle.

Moreover, aspects of the disclosure provide a method for enabling autonomous operation of a vehicle, said method comprising: supporting, with aid of a vehicle body, a plurality of sensors comprising: (1) a first set of sensors comprising two or more different types of sensors oriented in a forward-facing direction and configured to detect two or more regions in front of the vehicle, and (2) a second set of sensors comprising one or more types of sensors oriented in a plurality of directions and configured to detect one or more regions in proximity to or surrounding the vehicle, wherein a range of each of the two or more regions in front of the vehicle extends farther away from the vehicle compared to a range of each of the one or more regions in proximity to or surrounding the vehicle; and collecting information from the plurality of sensors to aid in the autonomous operation of the vehicle. In some embodiments, the method further comprises: effecting a change in an orientation of at least one sensor from the first set of sensors in real-time based on the vehicle's motion or predicted motion path.

It shall be understood that different aspects of the disclosure can be appreciated individually, collectively, or in combination with each other. Various aspects of the disclosure described herein may be applied to any of the particular applications set forth below or for any other types of movable objects. Any description herein of a vehicle may apply to and be used for any movable object, such as any vehicle. Additionally, the systems, devices, and methods disclosed herein in the context of ground motion (e.g., autonomous driving) may also be applied in the context of other types of motion, such as movement in the air or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 2 shows an example of a sensing assembly on-board a vehicle, in accordance with embodiments of the disclosure.

FIG. 4 provides an example of lidar units that may be part of a sensing assembly of a vehicle, in accordance with embodiments of the disclosure.

DETAILED DESCRIPTION

The present disclosure provides systems and methods for autonomous piloting (driving) of a vehicle. The autonomous driving systems disclosed herein can (1) enable seamless environmental sensing in 360 degrees, (2) provide redundant, reliable and stable environment sensing data, and/or (3) effect an easy and quick sensor calibration and a real-time calibration verification. The disclosed systems can sense the environment in which the vehicle is being operated, and detect the presence of stationary and moving obstacles. For example, the systems described herein can collect positional and/or motion information of the vehicle using a plurality of sensors, and control the vehicle (e.g., with respect to position, velocity, and/or acceleration) to safely navigate through various types of environments without collision with obstacles. In some cases, the autonomous driving systems can be configured to determine and select which sensors and/or sensing data to utilize under various driving and/or environmental type. In particular, the disclosed methods and systems can improve the operational safety of a vehicle, and enable the vehicle to self-navigate through various environments (e.g., indoors or outdoors, adverse weather conditions such as rain, fog and snow, different types of obstacles located at various distances, unfamiliar terrain, high altitude or low altitude, etc.) in a safe manner. It shall be understood that different aspects of the disclosure can be appreciated individually, collectively, or in combination with each other. Various aspects of the disclosure described herein may be applied to any of the particular applications set forth below or for any other types of remotely controlled vehicles or movable objects.

The embodiments disclosed herein can be applied to any suitable movable object. The movable object can be configured to move within any suitable environment, such as on ground (e.g., a motor vehicle or a train), in air (e.g., a fixed-wing aircraft, a rotary-wing aircraft, or an aircraft having neither fixed wings nor rotary wings), in water (e.g., a ship or a submarine), in space (e.g., a spaceplane, a satellite, or a probe), or any combination of these environments. The movable object can be a vehicle, such as an automobile.

Figure 1:
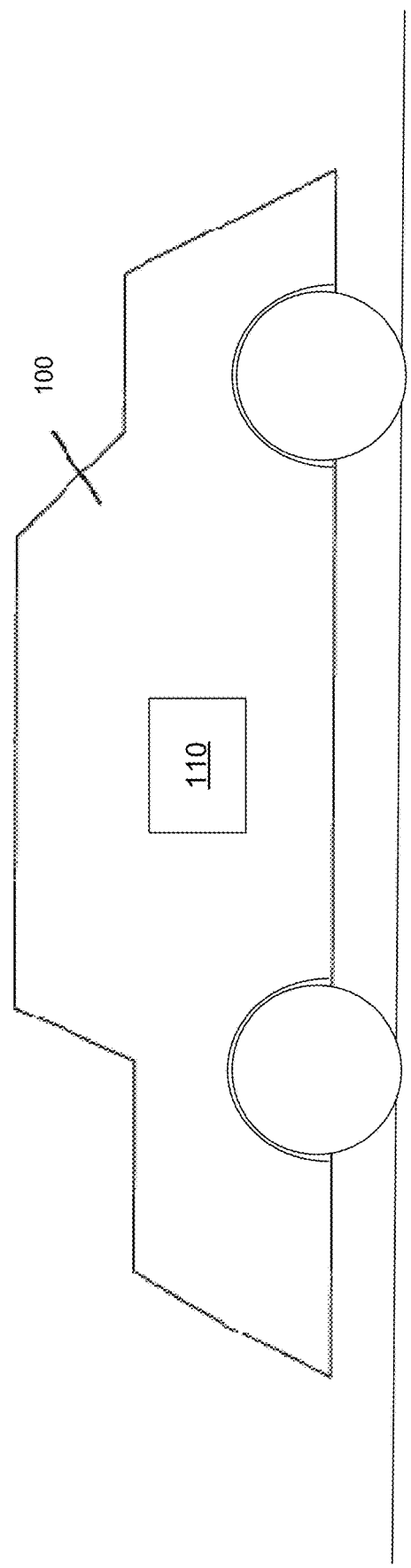
FIG. 1 shows an example of a vehicle with a sensing assembly, in accordance with embodiments of the disclosure.

FIG. 1 shows an example of a vehicle 100 with a sensing assembly 110, in accordance with embodiments of the disclosure. The sensing assembly may be on-board the vehicle. The vehicle may be capable of traveling within an environment and collecting information about the environment with aid of the sensing assembly. The sensing assembly may aid in automated driving by the vehicle. The automated driving system of the vehicle may comprise the sensing assembly, which may comprise multiple sensors.

The vehicle 100 may be a sensing vehicle capable of sensing the environment in proximity to or around the vehicle. The vehicle may be a land-bound vehicle. The vehicle may travel over land. Alternatively or in addition, the vehicle may be capable of traveling on or in the water, underground in the air, and/or in space. The vehicle may be an automobile. The vehicle may be a land-bound vehicle, watercraft, aircraft, and/or spacecraft. The vehicle may travel freely over a surface. The vehicle may travel freely within two dimensions. The vehicle may primarily drive on one or more roads.

Optionally, the vehicle may be an unmanned vehicle. The vehicle may not have a passenger or operator on-board the vehicle. The vehicle may or may not have a space within which a passenger could ride. The vehicle may or may not have space for cargo or objects to be carried by the vehicle. The vehicle may or may not have tools that may permit the vehicle to interact with the environment (e.g., collect samples, move objects). The vehicle may or may not have objects that may be emitted to be dispersed to the environment (e.g., light, sound, liquids, pesticides). The vehicle may operate without requiring a human operator.

In some embodiments, the vehicle may permit one or more passengers to ride on-board the vehicle. The vehicle may comprise a space for one or more passengers to ride the vehicle. The vehicle may have an interior cabin with space for one or more passengers. The vehicle may or may not have an operator. For example, a vehicle may have a space for a driver of the vehicle. In some embodiments, the vehicle may be capable of being driven by a human operator. Alternatively or in addition, the vehicle may be operated using an autonomous driving system.

In some embodiments, a vehicle may switch between a manual driving mode during which a human driver would drive the vehicle, and an autonomous driving mode during which an automated controller may generate signals that operate the vehicle without requiring intervention of the human driver. In some embodiments, the vehicle may provide driver assistance where the driver may primarily manually drive the vehicle, but the vehicle may execute certain automated procedures or assist the driver with performing certain procedures (e.g., lane changes, merging, parking, auto-braking). In some embodiments, the vehicle may have a default operation mode. For example, the manual driving mode may be a default operation mode, or an autonomous driving mode may be a default operation mode.

A secondary operation mode may come into effect. For example, if the manual driving mode is the default operation mode, the autonomous driving mode may be the secondary operation mode. If the autonomous driving mode is the default operation mode, the manual driving mode may be the secondary operation mode.

The secondary operation mode may come into effect as a result of user input. For example, a user may start by driving in a manual driving mode. Then, the user may provide an input to indicate a switch over to autonomous driving mode. The user may provide the input while driving. The user may provide the input while the vehicle is stationary. In another example, the user may start by having the car in an autonomous driving mode. The user may provide an input that indicates the user is taking over manual control of the vehicle.

The secondary operation mode may come into effect as a result of a signal generated by one or more processors. The signal may be generated by the one or more processors in response to a detected event. The event may be detected with aid of one or more sensors. For example, if the user is in a manual driving mode and sensors detect large debris on the road up-ahead, the system may automatically brake to avoid the debris, or swerve around it if the conditions are safe. The secondary operation mode may come into effect without requiring any human input.

The vehicle may be any type of vehicle. The vehicle may be a passenger vehicle. Examples of vehicle types may include, but are not limited to, sedans, coupes, pickup trucks, hatchbacks, station wagons, mini-vans, vans, buses, crossovers, SUVs, convertibles, trucks, motorcycles, carts, flatbeds, semis, transport trucks, shuttles, all-terrain vehicles, or any other types of vehicles. The vehicle may be capable of transporting at least 1, 2, 3, 4, 5, 6, 7, 8, 9, 10, 12, 16, 20, 30, 40, 50, 60, 70, or 100 people. The vehicle may have seats for any number of individuals, including the numbers listed herein.

The vehicle may comprise one or more propulsion units that may allow a vehicle to traverse an environment. The propulsion units may comprise one or more wheels that may come into contact with an underlying surface. The propulsion units may comprise treads, rollers, propellers, rotor blades, and/or nozzles that may permit the vehicle to move. The vehicle may comprise an engine or motor that may drive the vehicle.

The vehicle may operate with aid of a fuel. The vehicle may operate using a gaseous fuel, liquid fuel, and/or solid fuel. The vehicle may operate using a diesel fuel. The vehicle may operate on a biofuel. The vehicle may be an electric vehicle, or may be a hybrid electric vehicle.

The vehicle may comprise an on-board sensing assembly 110. The sensing assembly may be carried by the vehicle. The sensing assembly may comprise one or more sensors capable of sensing the environment in proximity to or around the vehicle. External sensors may be capable of collecting data from the environment around the vehicle. The sensing assembly may comprise one or more sensors capable of sensing a condition of the vehicle, or sensing a characteristic of a component on-board the vehicle. Internal sensors may be capable of collecting data regarding the vehicle itself.

The sensing assembly may comprise a single sensor or multiple sensors. The sensing assembly may comprise a single type of sensor or multiple types of sensors. Examples of types of sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-movement cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy). The sensing assembly may comprise a single sensor of a particular sensor type or multiple sensors of the particular sensor type.

The sensors may have various detectable ranges. A detectable range of the sensor may include a region relative to the sensor where the sensor may collect data. The detectable range may include a distance range and/or a direction. For example, detectable range may include a maximum distance and/or minimum distance that can be read by the sensor. The minimum distance may be zero. The maximum distance may or may not be affected by environmental conditions (e.g., temperature, particulates in the air, precipitation, air pressure, noise, etc.). Direction may include an angle range. For instance, a sensor may have an angular range field of view. Sensors may not be capable of collecting data outside their detectable range. Areas outside the detectable range of a particular sensor may be a blind spot of the sensor. Different sensors may have different detectable ranges or the same detectable range.

The sensors may be distributed anywhere on the vehicle. The vehicle may comprise a vehicle body. The sensors may be distributed anywhere over the vehicle body. The sensors may be within an interior of the vehicle body, outside the vehicle body, or part of the vehicle body. The sensors may be distributed within a space defined by a vehicle chassis, outside a space defined by a vehicle chassis or may be part of the vehicle chassis. The sensors may be within a vehicle housing, outside a vehicle housing, or part of the vehicle housing. The sensors may be distributed on a top surface of a vehicle, bottom surface of a vehicle, front surface of a vehicle, rear surface of a vehicle, right side surface of a vehicle or a left side surface of a vehicle. The sensors may be distributed on an upper half of the vehicle, and/or lower half of the vehicle. The sensors may be distributed on a front half of the vehicle and/or a rear half of the vehicle. The sensors may be distributed around a perimeter of the vehicle.

The sensors may be arranged to have various detectable ranges around the vehicle. The various detectable ranges may or may not overlap one another. The various detectable ranges may be sufficient to permit safe autonomous driving of the vehicle. The detectable ranges covered by the sensors may be sufficient to prevent accidents or unsafe driving of the vehicle when operating in an autonomous driving mode. The sensors may be capable of permitting the vehicle to drive autonomously on one or more roads. The sensors may be capable of permitting the vehicle to drive safely off-road.

A sufficient number and variety of types of sensors may be provided that may permit safe autonomous operation of the vehicle in different environmental conditions. For instance the vehicle may be capable of operating safely in a wide range of temperatures (e.g., even in extreme heat or cold). The autonomous driving system of the vehicle may be capable of operating safely in conditions with poor visibility (e.g., night time, heavy precipitation, fog, particulates in the air). The autonomous driving system of the vehicle may be capable of operating in conditions with different atmospheric pressure or levels of moisture. The autonomous driving system of the vehicle may be capable of operating in conditions with various types of precipitation (e.g., rain, hail, snow, sleet), various wind conditions, various road conditions, and/or various noise conditions. The number and/or types of sensors from the sensing assembly may be able to detect relevant information from the environment under the various types of conditions.

FIG. 2 shows an example of a sensing assembly 110 on-board a vehicle, in accordance with embodiments of the disclosure. The sensing assembly may comprise one or more types of sensors, such as lidar 120, cameras 130, radar 140, ultrasonic sensors 150, GPS 160 and/or odometers 170. The one or more sensors carried by the vehicle may include, but are not limited to location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-movement cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). The sensors may be used to collect data of the surrounding environment around the vehicle. Optionally, the sensors may be used to collect data regarding the vehicle itself. Data from the sensors (e.g., of the surrounding environment and/or the vehicle itself) may be fused. Data from multiple types of sensors can be fused. For instance, data of the surrounding environment can be obtained in substantially real-time by fusing information from multiple sensors.

The sensing assembly may comprise one or more lidar 120 units. The lidar units may be single-channel lidars. The lidar units may be one or more scanning lidars. The lidar units may illuminate a target or detectable range with laser light. The lidar units may be capable of detecting backscattering. The light may comprise ultraviolet, visible, and/or near-infrared light to image the surrounding environment. The lidar units may be capable of detecting a wide range of materials. For instance, the lidar may detect metallic or non-metallic objects, precipitation, certain aerosols, clouds or molecules. In some embodiments, the lidar units may be operating at a high resolution. Any type of lidar may be used, such as Rayleigh lidar, Mie lidar, Raman lidar, Na/Fe/K lidar, etc. In some embodiments, the lidar units need not be of a mechanical scanning type of lidar. For example, the lidar units may include phase array lidars integrated on microchips. Advantages of phase array lidars include lower cost, lower weight, smaller form factor, and fewer mechanical components compared to existing scanning lidar systems. Phase array lidars are also more robust due to the lack of moving parts since the components are integrated onto microchips.

One or more cameras 130 may be part of the sensing assembly. The cameras may collectively form a vision sensing system. Multiple cameras may be provided. The cameras may be capable of capturing image data for environmental sensing. The cameras may be the same type of cameras or different types of cameras. In some embodiments, the cameras may include stereo cameras. Optionally, the cameras may include one or more monocular cameras. In some embodiments, combinations of stereo cameras and monocular cameras may be provided. The cameras may include black and white cameras. In some embodiments, the cameras may include color cameras. Any description herein of cameras may apply to any type of vision sensors, and may be referred to interchangeably as imaging devices of which examples are described below.

An imaging device may be a physical imaging device. An imaging device can be configured to detect electromagnetic radiation (e.g., visible, infrared, and/or ultraviolet light) and generate image data based on the detected electromagnetic radiation. An imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

The imaging device can be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, infrared images, and the like. The camera may be a thermal imaging device when it is configured to capture infrared images.

In some embodiments, the cameras 130 may include multiple imaging devices, or an imaging device with multiple lenses and/or image sensors. The cameras may be capable of taking multiple images substantially simultaneously. The multiple images may aid in the creation of a 3D scene, a 3D virtual environment, a 3D map, or a 3D model. For instance, a right image and a left image may be taken and used for stereo-mapping. A depth map may be calculated from a calibrated binocular image. Any number of images (e.g., 2 or more, 3 or more, 4 or more, 5 or more, 6 or more, 7 or more, 8 or more, 9 or more) may be taken simultaneously to aid in the creation of a 3D scene/virtual environment/model, and/or for depth mapping. The images may be directed in substantially the same direction or may be directed in slightly different directions. In some instances, data from other sensors (e.g., ultrasonic data, LIDAR data, data from any other sensors as described elsewhere herein, or data from external devices) may aid in the creation of a 2D or 3D image or map.

An imaging device may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the camera may be a 4K camera or a camera with a higher resolution.

An imaging device may capture a sequence of images at a specific capture rate. In some embodiments, the sequence of images may be captured standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, unobvious surface texture of environment).

An imaging device may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

In some alternative embodiments, an imaging device may extend beyond a physical imaging device. For example, an imaging device may include any technique that is capable of capturing and/or generating images or video frames. In some embodiments, the imaging device may refer to an algorithm that is capable of processing images obtained from another physical device.

The sensing system may comprise one or more radar systems 140. The radar systems may use radio waves to detect objects in the environment around the vehicle. The radar system may comprise a transmitter producing electromagnetic waves in the radio or microwaves domain, and a transmitting antenna. The radar system may comprise a receiving antenna (which may be the same as the transmitting antenna). The radar system may comprise a receiver and a processor that may determine properties of any detected objects. Radio waves may be sent from the transmitter to be reflected off of any objects in the detectable range, and return to the receiver.

In some embodiments, the radar may be an extremely high frequency (EHF) radar, such as a millimeter wave radar. In some alternative embodiments, the radar may be at a super high frequency band, or the far infrared band. The radar may have a band of radio frequencies in the electromagnetic spectrum from 30 to 300 gigaHertz. The radio waves may have wavelengths from ten to one millimeters.

One or more ultrasonic sensors 150 may be part of the sensing system of the vehicle. The ultrasonic sensors may comprise ultrasonic transmitters that convert electrical signals into ultrasound. The ultrasound signals may be emitted and reflected. The reflected ultrasound may be converted by receivers into electrical signals. The ultrasound transmitters and receivers may or may not be part of the same transceivers.

The sensing assembly may comprise one or more global positioning system (GPS) sensors 160. The GPS sensor may be used to detect a geolocation of the vehicle. Any description herein of a GPS sensor may apply to any type of global navigation satellite system (GNSS) sensor. The GPS sensor may communicate with one or more satellites to provide autonomous geo-spatial positioning. The GPS sensor may comprise a small electronic receiver that determines its location (e.g., longitude, latitude, and/or altitude/elevation) using time signals transmitted along a line of sight from the satellites. The signals may be transmitted via radio. In some embodiments, the GPS sensor may be capable of detecting the geolocation of the vehicle to a high degree of precision (e.g., within a few meters).

In some embodiments, a wheel odometer 170 may be provided as part of the sensing assembly. The wheel odometer may be used to calculate a distance traveled by the vehicle. If a signal by a GPS sensor is lost, the data from the wheel odometer may be used to detect how far a vehicle has traveled and estimate a location of the vehicle based on the last known location.

A set of sensor modules may be built with the various sensors to cover a certain detection area and range. The sensing assembly may comprise a plurality of sensor modules that may relate to the various types of sensors as provided. For example, the sensing assembly may comprise one or more multi-lidar modules, one or more multi-camera modules, one or more multi-radar modules, one or more ultrasonic sensor modules, and/or one or more wheel odometer and GPS modules. A module may comprise one or more sensors. For instance a multi-lidar module may comprise multiple lidar sensors.

Data from each of the sensors may be collected. In some instances, data from sensors in a module may be collected and/or aggregated. The data from the sensors in a module may be analyzed separately or together. Data from multiple modules of a vehicle may be collected and/or aggregated. The data from the modules may be analyzed separately or together. For instance, data from multiple modules with different types of sensors may be fused together. Sensor fusion may also include data from multiple types of sensors to be used together to aid in operation of the vehicle.

In some embodiments, sensing results are generated by combining sensor data obtained by multiple sensors using any known sensor fusion techniques, which can include algorithms based on a Kalman filter, an extended Kalman filter (EKF), an unscented Kalman filter (UKF), a particle filter (PF), or suitable combinations thereof. For instance, sensor fusion can be used to combine sensing data obtained by different sensor types, including as GPS sensors, inertial sensors, vision sensors, lidar, ultrasonic sensors, and so on. As another example, sensor fusion can be used to combine different types of sensing data, such as absolute measurement data (e.g., data provided relative to a global coordinate system such as GPS data) and relative measurement data (e.g., data provided relative to a local coordinate system such as vision sensing data, lidar data, or ultrasonic sensing data). Sensor fusion can be used to compensate for limitations or inaccuracies associated with individual sensor types, thereby improving the accuracy and reliability of the final sensing result.

The data obtained by the sensing assembly can provide various types of environmental information. For example, the sensor data may be indicative of an environment type, such as an indoor environment, outdoor environment, low altitude environment, or high altitude environment. The sensor data may also provide information regarding current environmental conditions, including weather (e.g., clear, rainy, snowing), visibility conditions, wind speed, time of day, and so on. Furthermore, the environmental information collected by the sensors may include information regarding objects in the environment such as obstacles described herein. Obstacle information may include information regarding the number, density, geometry, and/or spatial disposition of obstacles in the environment.

The data collected from the various sensors of the sensing assembly may be obtained and analyzed with aid of one or more processors. The one or more processors may aggregate the data from the various sensors, which may include multiple sensor types. The one or more processors may generate one or more instructions that may affect operation of the vehicle based on the analyzed data from the sensors. The analysis and generation of the instructions may occur substantially in real-time. For instance, the instructions that may affect operation of the vehicle may be generated within about 1 minute, 30 seconds, 20 seconds, 15 seconds, 10 seconds, 7 seconds, 5 seconds, 3 seconds, 2 seconds, 1 second, 0.5 seconds, 0.3 seconds, 0.1 seconds, 0.05 seconds, 0.01 seconds, 0.005 seconds, or 0.001 seconds of the data being collected by the sensors.

In some embodiments, the one or more processors can process the data from the sensing assembly, and select which set of sensors and/or data to utilize for sensing the surrounding environment. The processors can be located onboard or remote from the vehicle. The data collected by the selected sensors can be provided to the automated driving system described herein. The automated driving system can be configured to control one or more propulsion units of the vehicle to effect motion based on the sensing data. For example, the sensing data provided by the selected sensors can be used to control the spatial disposition, velocity, and/or orientation of the vehicle (e.g., using a suitable processing unit and/or control module, as described elsewhere herein). Additionally, the sensors can be used to provide data regarding the environment proximate to or surrounding the vehicle, such as weather conditions, proximity to potential obstacles, location of geographical features, location of manmade structures, and the like, as described above.

The instructions affecting operation of the vehicle may include instructions for driving the vehicle. The instructions may be used to enable autonomous driving of the vehicle. Autonomous driving of the vehicle may enable the vehicle to drive safely to a destination. Autonomous driving of the vehicle may include causing the vehicle to remain on the roadway. Autonomous driving of the vehicle may include detection of an available lane. Autonomous driving of the vehicle may include detection of other vehicles and pedestrians. Autonomous driving of the vehicle may include collision avoidance, with one or more other vehicles, pedestrians, and/or objects.

The vehicle may optionally comprise one or more communication units. The communication unit may permit the vehicle to communicate with one or more external devices. The external device may be one or more data centers that may collect and/or aggregate information the vehicle and/or other vehicles. The one or more data centers may be provided on one or more external devices, such as one or more servers, personal computers, mobile devices, and/or via a cloud computing or peer-to-peer infrastructure. In some embodiments, the external device may be another vehicle.

The communication unit may permit wireless communication between the sensing vehicle and one or more external devices. The communication unit may permit one-way communication (e.g., from the sensing vehicle to the external device, or from the external device to the sensing vehicle), and/or two-way communications (e.g., between the sensing vehicle and one or more external devices). The communication unit may have a limited distance or range. The communication unit may be capable of long-range communications. The communication unit may engage in point-to-point communications. The communication unit may be broadcasting information.

In one example, the communication unit may comprise one or more transceivers. The communication unit may comprise a transmitter and/or a receiver. The communication unit may be configured for any type of wireless communication as described elsewhere herein. The communication unit may comprise one or more antennas that may aid in the communications. The communication unit may or may not include a communication dish. The communication unit may be directional (e.g., operate strongest in a specified direction) or may operate substantially uniformly across all directions.

A communication unit 102 may be in communication with one or more sensors. The communication unit may receive data collected by the one or more sensors. In some embodiments, data collected by one or more sensors may be transmitted using the communication unit. The data transmitted by the communication unit may optionally be raw data collected by the one or more sensors. Alternatively or in addition, the data transmitted by the communication unit may be pre-processed on-board the vehicle. In some embodiments, a vehicle may have one or more on-board processors that may perform one or more pre-processing steps on the data collected by the sensors, prior to transmission of data to the communication unit. The pre-processing may or may not include formatting of the data into a desired form.

The pre-processing may or may not include analysis of the sensor data with respect to the sensing vehicle and/or with respect to an inertial reference frame (e.g., the environment). For instance, the pre-processing may or may not include determination of positional information relating to one or more surrounding vehicles or vehicle itself. The positional information may be with respect to the vehicle or with respect to the inertial reference frame (e.g., geo-spatial coordinates). For instance, the vehicle may be able to determine location and/or movement information for the vehicle or one or more surrounding vehicles. The vehicle may be able to detect location and/or movement of other objects within the environment, such as pedestrians, animals, structures, curbs, walkways, trees, bushes, bumpers, sidewalks, or so forth.

The communication unit may be positioned anywhere on or in the vehicle. The communication unit may be provided within a volume contained by one or more body panels of the vehicle. The communication unit may be provided within a volume within a vehicle chassis. The communication unit may be external to a housing or body of the vehicle.

The vehicle may comprise one or more on-board processors. The one or more processors may form an on-board computer or controller. For instance, the vehicle may comprise an electronic control unit (ECU). The ECU may provide instructions for one or more activities of the vehicle, which may include, but are not limited to, propulsion, steering, braking, fuel regulation, battery level regulation, temperature, communications, sensing, or any other operations. The one or more processors may be or may comprise a central processing unit (CPU), graphics processing unit (GPU), field-programmable gate array (FPGA), digital signal processor (DSP) and so forth.

Figure 3A:
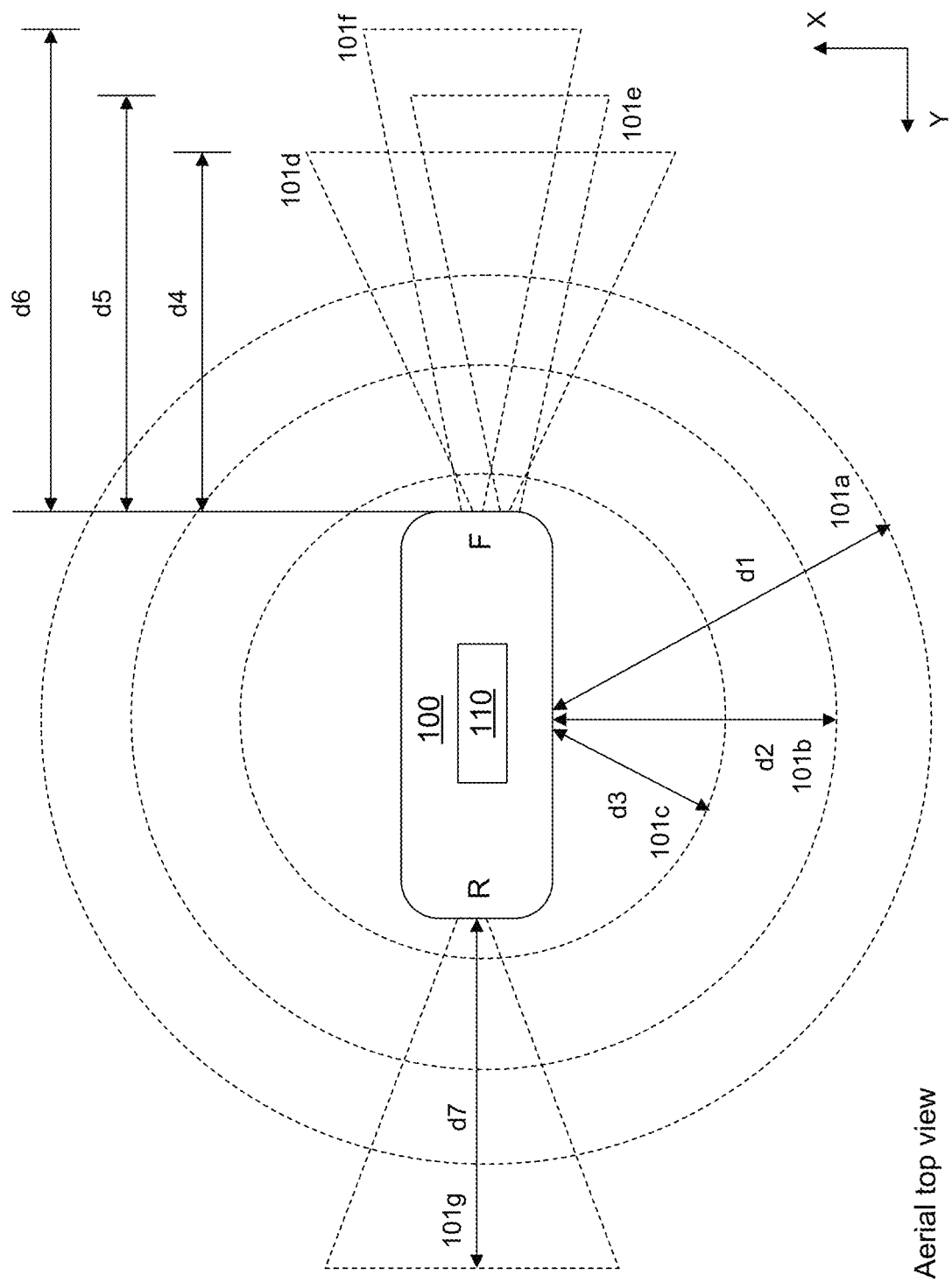
FIG. 3A shows examples of detectable ranges of various sensors that may detect an environment around a vehicle, in accordance with embodiments of the disclosure.

FIG. 3A shows examples of detectable ranges of various sensors that may detect an periphery environment in proximity to or around a vehicle, in accordance with embodiments of the disclosure. A vehicle 100 may comprise a sensing assembly 110 which may comprise one, two or more different sensors that may be capable of collecting information for an environment around the vehicle. For example, sensors from a first sensor type may collectively have a first detectable range 101a, sensors from a second sensor type may collectively have a second detectable range 101b, sensors from a third sensor type may collectively have a third detectable range 101c, sensors from a fourth sensor type may collectively have a fourth detectable range 101d, sensors from a fifth sensor type may collectively have a fifth detectable range 101e, sensors from a sixth sensor type may collectively have a sixth detectable range 101f, and/or sensors from a seventh sensor type may collectively have a seventh detectable range 101g. Any of the sensor types provided herein may include lidar, cameras, radar, ultrasonic sensors, GPS, odometers, inertial sensors, or any other sensors, such as those described elsewhere herein.

Although various detectable ranges are illustrated with various shapes, it may be understood that the detectable ranges may have any shape. For example, the detectable range may have a substantially circular shape. The vehicle may be located at the center of the circle or another part of the circle. The detectable range may have a substantially ellipsoidal or oval shape. The detectable range may have a substantially sector or wedge shape. The detectable range may have a substantially triangular shape, quadrilateral shape (e.g., rectangular shape, square shape, diamond shape, trapezoidal shape), pentagonal shape, hexagonal shape, octagonal shape, or any other shape. Any of the shapes described herein may represent a cross-section of the detectable range. In some embodiments, the shapes may be a lateral cross-sectional shape, or a vertical cross-sectional shape. The detectable range may form a spherical, semi-spherical, conical, cylindrical, prismatic, toroidal, or any other type of shape. In some embodiments, the detectable range may comprise a combination or a plurality of any of the shapes described, to collectively form a new shape. The detectable range may be formed of a single continuous shape or multiple discontinuous shapes.

The detectable range may collectively reach around at least 360 degrees surrounding the vehicle. In some instances, the detectable range may be at least about 15 degrees, 30 degrees, 45 degrees, 60 degrees, 75 degrees, 90 degrees, 120 degrees, 150 degrees, 180 degrees, 210 degrees, 240 degrees, 270 degrees, 300 degrees, or 330 degrees around the vehicle. The detectable range may have angular values less than any of the values described herein, or falling within a range between any two of the values described herein. The angle ranges may be provided relative to a lateral direction around the vehicle, or vertical direction around the vehicle. In some embodiments, the detectable ranges may be evenly distributed around the vehicle. In some embodiments, some of the detectable ranges for various sensors may be distributed more and extending away from the front of the vehicle, the rear of the vehicle, the top of the vehicle, a right side of the vehicle, a left side of the vehicle, or a bottom side of the vehicle, or any combination of these sides of the vehicle. The distribution of the sensors may depend on the types of sensors. The distribution of the sensors may depend on the type of objects or environmental conditions that the sensors are used to detect.

A first sensor type may comprise lidar units. One or more lidar units may be provided on-board the vehicle. The one or more lidar units may collectively have a first detectable range 101a. The first detectable range may have a radius of d1. The radius d1 may represent the maximum range of the first detectable range. In some embodiments, d1 may be about 80 m. In some embodiments, the detectable range may have a maximum value about 20 m, 30 m, 40 m, 50 m, 60 m, 70 m, 75 m, 80 m, 85 m, 90 m, 100 m, 110 m, 120 m, 130 m, 150 m, 175 m, 200 m, or 250 m. In some embodiments, the detectable range by the lidar units may encompass 360 degrees around the vehicle. In some embodiments, the collective detectable range by the lidar units may have a substantially circular shape around the vehicle. In some embodiments, the collective detectable range of by the lidar units may comprise a plurality of cones or wedge shapes around the vehicle.

A second sensor type may comprise stereo cameras. One or more stereo cameras may be provided on-board the vehicle. The one or more stereo cameras may collectively have a second detectable range 101b. The second detectable range may have a radius of d2. The radius d2 may represent the maximum range of the second detectable range. In some embodiments, d2 may be about 60-100 m. In some embodiments, the detectable range may have a maximum value about 5 m, 10 m, 20 m, 30 m, 40 m, 50 m, 55 m, 60 m, 65 m, 70 m, 75 m, 80 m, 85 m, 90 m, 95 m, 100 m, 105 m, 110 m, 120 m, 130 m, 150 m, 175 m, 200 m, or 250 m. In some embodiments, the detectable range by encompass 360 degrees around the vehicle. In some embodiments, the collective detectable range by the stereo cameras may have a substantially circular shape around the vehicle. In some embodiments, the collective detectable range of the stereo cameras may comprise a plurality of cones or wedge shapes around the vehicle.

A third sensor type may comprise ultrasonic sensors. One or more ultrasonic sensors may be provided on-board the vehicle. The one or more ultrasonic sensors may collectively have a third detectable range 101c. The third detectable range may have a radius of d3. The radius d3 may represent the maximum range of the third detectable range. In some embodiments, d3 may be about 8 m. In some embodiments, the detectable range may have a maximum value about 0.1 m, 0.5 m, 1 m, 1.5 m, 2 m, 2.5 m, 3 m, 4 m, 5 m, 6 m, 7 m, 8 m, 9 m, 10 m, 11 m, 12 m, 13 m, 15 m, 20 m, 30 m, or 50 m. In some embodiments, the detectable range by encompass 360 degrees around the vehicle. In some embodiments, the collective detectable range by the ultrasonic sensors may have a substantially circular shape around the vehicle. In some embodiments, the collective detectable range of by the ultrasonic sensors may comprise a plurality of cones or wedge shapes around the vehicle.

A fourth sensor type may comprise radar, such as millimeter wave radar. One or more radar systems may be provided on-board the vehicle. The one or more radar systems may collectively have a fourth detectable range 101d. The fourth detectable range may have a distance range of d4. The distance range d4 may represent the maximum range of the fourth detectable range. In some embodiments, d4 may be about 180 m. In some embodiments, the detectable range may have a maximum value about 20 m, 30 m, 50 m, 75 m, 100 m, 120 m, 150 m, 160 m, 170 m, 180 m, 190 m, 200 m, 220 m, 250 m, 300 m, or 500 m. In some embodiments, the detectable range by encompass a front region of the vehicle. In some embodiments, the collective detectable range by the radar systems may have a substantially conical shape or wedge shape.

A fifth sensor type may comprise long range lidar. The long range lidar may have a narrow field of view (FOV) but is not limited thereto. Different fields of view for the long lidar ranging from narrow to wide can be configured depending on the optical configuration of the lidar. In some embodiments, one or more long range lidar units may be provided on-board the vehicle. The one or more long range lidar units may collectively have a fifth detectable range 101e. The fifth detectable range may have a distance range of d5. The distance range d5 may represent the maximum range of the fourth detectable range. In some embodiments, d5 may be about 200 m. In some embodiments, the detectable range may have a maximum value about 20 m, 30 m, 50 m, 75 m, 100 m, 120 m, 150 m, 170 m, 180 m, 190 m, 200 m, 210 m, 220 m, 230 m, 250 m, 300 m, or 500 m. In some embodiments, the detectable range by encompass a front region of the vehicle. In some embodiments, the collective detectable range by the long range lidar unit may have a substantially conical shape or wedge shape.

A sixth sensor type may comprise a camera, such as a monocular camera. One or more monocular cameras may be provided on-board the vehicle. The one or more monocular cameras may collectively have a sixth detectable range 101f. The sixth detectable range may have a distance range of d6. The distance range d6 may represent the maximum range of the sixth detectable range. In some embodiments, d6 may be about 230 m. In some embodiments, the detectable range may have a maximum value about 20 m, 30 m, 50 m, 75 m, 100 m, 120 m, 150 m, 160 m, 170 m, 180 m, 200 m, 210 m, 220 m, 225 m, 230 m, 240 m, 250 m, 270 m, 300 m, or 500 m. In some embodiments, the detectable range by encompass a front region of the vehicle. In some embodiments, the collective detectable range by the monocular camera may have a substantially conical shape or wedge shape.

A seventh sensor type may comprise a second radar, such as millimeter wave radar, a second monocular camera, an additional long range lidar unit, or any other type of sensor. The sensor may be a rear-facing sensor. The one or more rear facing sensors may collectively have a seventh detectable range 101g. The seventh detectable range may have a distance range of d7. The distance range d7 may represent the maximum range of the fourth detectable range. The distance value may be any of the distance values described elsewhere herein. In some embodiments, the detectable range by encompass a rear region of the vehicle. In some embodiments, the collective detectable range by the rear-facing sensor may have a substantially conical shape or wedge shape.

Detection ranges of a multi-sensor system are shown. Data from various sensors can be fused before feeding to a detection algorithm. As illustrated, different sensors and/or sensor types may have different detectable ranges that may collectively encompass the vehicle. Some sensors may have different distance ranges than others. For instance, some sensors may be able to reach greater distances than others. Some sensors may encompass different angular ranges than others. Some sensors may encompass wider ranges around the vehicle, while some sensors may have more narrow angular ranges. In some instances, some of the sensors with a greater distance range may focus on the front and/or rear of the vehicle. This may be useful for detecting objects of interest as the vehicle drives.

An automatic driving system of the vehicle may be able to monitor the surrounding environment of the vehicle with aid of the one or more sensors. The one or more sensors may aid in automated driving in one or more ways. For instance, one or more of the sensors may be used to detect movement of remote objects to provide an early warning. One or more sensors may be used to detect objects nearby, including those that may be in the blind spot of a vehicle operator, passenger, or other sensors.

Any of the sensors provided herein may be fixedly coupled to the vehicle. Any of the sensors provided herein may be rigidly coupled to the vehicle. Any of the sensors may remain stationary relative to the vehicle.

Any of the sensors provided herein may move relative to the vehicle. Any of the sensors provided herein may rotate relative to the vehicle. The one or more sensors may rotate about one axis, two axes, or three axes, relative to the vehicle. Any of the sensors provided herein may move translationally relative to the vehicle. For instance, the one or more sensors may slide relative to the vehicle. The one or more sensors may slide along a first axis, second axis, and/or third axis.

In some embodiments, the one or more sensors may rotate relative to the vehicle with aid of a carrier. The carrier may comprise a gimbal. The gimbal may be a single-axis gimbal or multi-axis gimbal. The gimbal may be a one-axis, two-axis, or three-axis gimbal. The gimbal may permit rotation about the yaw axis, the pitch axis, and/or the roll axis. In some embodiments, the gimbal may permit rotation about the yaw axis only, the pitch axis only, or both the yaw and the pitch axis. The gimbal may comprise a frame assembly comprising one or more frame components that may move relative to one another to permit rotation of the sensor. In some embodiments, a first frame component may be coupled to the sensor. The sensor may be fixed relative to the frame component or may rotate relative to the frame component about a first axis. The first frame component may be optionally supported by a second frame component. The first frame component may rotate relative to the second frame component. In some embodiments, the first frame component rotates relative to the second frame component about a second axis. The second axis may be different from the first axis. The second frame component may be supported by a third frame component. The second frame component may rotate about a third axis relative to the third frame component. The third axis may be different from the first and second axis. The gimbal may comprise a motor assembly comprising one or more motors that may drive movement of the frame components. For example, a first motor may drive movement of a sensor relative to the first frame component. A second motor may drive movement of a first frame component relative to a second frame component. A third motor may drive movement of a second frame component relative to a third frame component.

The carrier may comprise one or more sensors that may be useful for determining orientation of the sensor relative to the vehicle and/or an inertial reference frame. The carrier may be used to control rotation of the sensors in response to instructions. The instructions may be generated with aid of one or more processors on-board the vehicle, or at an external device or cloud computing infrastructure external to the vehicle. In some embodiments, the instructions may be generated based on movement of the vehicle, predicted movement of the vehicle, environmental conditions, and/or external objects.

The one or more sensors may move translationally relative to the vehicle with aid of one or more actuators. In some embodiments, a guide or track may be utilized that may allow the sensors to move translationally. The sensors may move along the guide or track. The one or more actuators may drive movement of the sensor along the guide or track. The guide or track may be substantially straight or may have a bend or curve. In some embodiments, multiple guide or tracks may intersect and the movement of the sensors may be transition between any of the guide or tracks at the intersections.

Figure 3B:
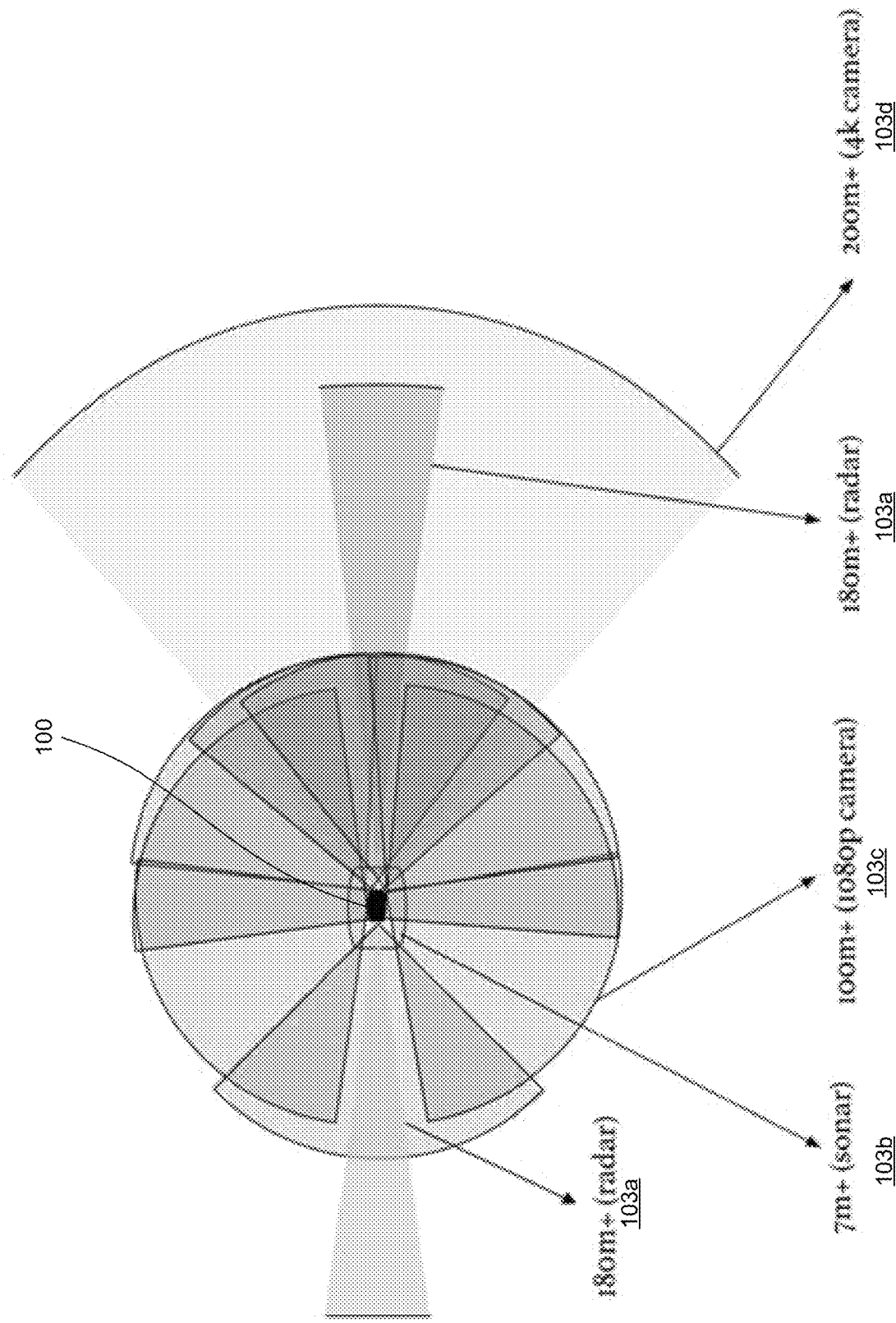
FIG. 3B shows additional examples of detectable ranges of various sensors that may detect an environment around a vehicle, in accordance with embodiments of the disclosure.

FIG. 3B shows additional examples of detectable ranges of various sensors that may detect an environment around a vehicle, in accordance with embodiments of the disclosure. Any variation of the various detectable ranges for different types of sensors as described elsewhere herein, may apply.

In one example, a vehicle 100 may comprise a sensing system with a radar having a first detectable range 103a (e.g., 180 meters or more), sonar having a second detectable range 103b (e.g., 7 meters or more), 1080p cameras having a third detectable range 103c (e.g., 100 meters or more), 4k camera having a fourth detectable range 103d (e.g., 200 meters or more), and/or lidar units having a fifth detectable range. In some embodiments, the various detectable ranges may be sectors of circles, circles, cones, or any other shape or combination thereof.

In some embodiments, a sensing system may be provided, to aid in autonomous operation of the vehicle. The sensing system may comprise a first set of sensors and a second set of sensors. The first set of sensors may comprise two or more different types of sensors. The first set of sensors may be oriented in a forward-facing direction and configured to detect two or more regions in front of the vehicle. The regions may or may not overlap with one another. In some embodiments, a first detectable region may lie completely within a second detectable region. Optionally, a portion of the first detectable region lies within the second detectable region, and a portion of the first detectable region lies outside the second detectable region. The first and second detectable regions may have different ranges. For example, a range of a second detectable region may be greater than a range of the first detectable region. An area or volume of the first detectable region may be determined by a scan angle of a first sensor type and an area or volume of a second detectable region may be determined by a scan angle of a second sensor type. The scan angles of the first and second sensor types may be different or the same. For instance, the scan angle of the first sensor type may be greater than a scan angle of the second sensor type. The detection range of the first sensor type may be less than or equal to the detection range of the second sensor type. Different sensor types may be detecting the two or more regions. The second set of sensors may comprise one or more types of sensors oriented in a plurality of directions and configured to detect one or more regions surrounding or in proximity to the vehicle. The second set of sensors may be configured to collectively detect an area at least 180, 270, or 360 degrees around the vehicle. The range of the first set of sensors may extend farther away from the vehicle compared to the range from the second set of sensors. In some embodiments, the first set of sensors and the second set of sensors may share some sensors that are of the same type. In some embodiments, the first set of sensors and the second set of sensors may share some common sensors (i.e. one or more sensors may be commonly utilized by both the first and second sets of sensors).

In some embodiments, the first set of sensors may comprise a monocular camera, a long range lidar unit, and/or a millimeter-wavelength radar unit. In some embodiments, one or more sensors may be oriented backwards. The backwards facing sensors may comprise a monocular camera, a long range lidar unit, and/or a millimeter-wavelength radar unit. In some embodiments, more forward-facing sensors may be provided than backward-facing sensors. In some embodiments, one or more sensors facing forward may operate with a higher resolution or precision than one or more of the backward facing sensors. For example, a forward-facing monocular camera may have a higher imaging resolution than a backward-facing monocular camera. For example, the forward-facing monocular camera may have a 4K imaging resolution while a backward-facing monocular camera may have a 1080p imaging resolution.

The various sensors described herein may be suitable for use within an environment that the vehicle is traversing. In some embodiments, some sensor types may be more suited than others for operating in various environmental conditions. For instance, a first sensor type may be more suitable for use in a first type of environment and a second sensor type may be more suitable for use in a second type of environment. The first and second types of environments may have at least one differing environmental condition relative to one another. For instance, the first and second environmental type may have different lighting conditions. The first and second environment types may have different object densities, different types of objects, and/or different sizes of objects. The first and second types of environments may have different visibility ranges. The first and second types of environments may have different background noises or vibrations. The first and second types of environment may have different types or degrees of particulates in the air. The first and second types of environment may experience different temperatures. The first and second types of environment may experience different precipitation. For example, factors, such as rain, snow, hail, sleet, fog, smog, dust, wind, smoke, cloudiness, time of day, temperature, may affect the type of environment.

Sensors may be selectively turned on or off, or used for various environmental conditions. For example, a first sensor type may operate well in a first environment type and poorly in a second environment type. A second sensor type may operate well in a second environment type and poorly in a first environment type. A first sensor type may be configured to actively detect a region when the vehicle is operating in the first type of environment. The second sensor type may be configured to be passive or inactive when the vehicle is operating in the first type of environment. A second sensor type may be configured to actively detect a region when the vehicle is operating in the second type of environment. The first sensor type may be configured to be passive or inactive when the vehicle is operating in the second type of environment. In some embodiments, the first sensor type, the second sensor type, or both may be configured to collect data as the vehicle is moving through the first and second types of environments. In one example, the data from the first type of sensor is processed and the data from the second type of sensor is not processed when the vehicle moving is through the first environment type. The data from the second type of sensor may be provided and the data from the first type of sensor may not be processed when the vehicle is moving through the second environment type. Data from one or more types of sensors may or may not be processed or analyzed depending on the environment type within which the vehicle is operating and the suitability of those sensor types for that environment type. In some embodiments, some sensors may be capable of operating in multiple environment types. Such sensors may be collecting data and/or processing/analyzing data while the vehicle is operating in the multiple environment types.

In some embodiments, one or more sensors on-board a vehicle may detect the type of environment that the vehicle is operating in. In other embodiments, data from outside the vehicle may be used to determine the environment that the vehicle is operating in. For instance, data from an external sensor off-board the vehicle may be used to collect information about the environment. Online data sources, such as weather reports, may be used to determine environmental conditions. In some embodiments, external data sources may be used in combination with a map of an environment that the vehicle is navigating to determine the environment type. The environment type may be changed over time, when the vehicle is moving or stationary. The environment type information may be updated periodically.

In response to detecting the environment type, an assessment may be made of the suitability of one or more sensor types for operating within the detected environment type. In some embodiments, when one or more sensors are determined to be suitable to operate within the detected environment type, they may be used to actively collect data. The data collected by the sensors may be processed and/or analyzed. When one or more sensors are determined to be unsuitable for operation within the detected environment type, they may be inactive or used to passively collect data. In some embodiments, they may collect data, but the data may not be processed and/or analyzed. Or the data that is processed and/or analyzed may be discounted or weighted less than data from sensors that are suitable for the environment.

FIG. 4 provides an example of lidar units that may be part of a sensing assembly of a vehicle, in accordance with embodiments of the disclosure. Part A shows an example of a single lidar unit 120. Part B shows an example of a plurality of lidars that may be commonly supported. Part C shows an example of a detectable range of a plurality of lidars.

Part A shows an example of a single lidar unit 120. A vehicle sensing assembly may comprise a single lidar unit or multiple lidar units. A lidar unit may be any type of lidar. In some embodiments, the lidar unit may be a single-channel lidar. The lidar unit may be a scanning lidar. Optionally, one or more lidar units on the vehicle may not be part of a multi-channel monolithic lidar unit. In some embodiments, none of the lidar units on the vehicle are part of a multi-channel monolithic lidar unit. In some embodiments, any type of lidar unit may be used with any number of channels (e.g., 1, 2, 4, 8, 16, 24, 32, or 64 channels). The lidar unit may be a multi-channel lidar unit. The lidar unit may operate at any sampling frequency. For example, the lidar unit may emit at least 5K, 10K, 20K, 30K, 50K, 75K, 100K, 200K, or 500K pulses per second.

The lidar unit may have any detectable range. In one example, the lidar unit may have a substantially conical detectable range, with the point of the cone at the location of the lidar unit. The lidar unit may have a primary direction, which may intersect the center of the cone. The cone may have any field of view (FOV). In some embodiments, the lidar unit may have a FOV of at least 15, 30, 45, 55, 57, 60, 75, 90, 120, 150, 180, 210, 240, 270, 300, 330, or 360 degrees. The lidar unit may have a FOV with an angular range less than any of the values provided herein or falling within a range between any two of the values provided herein. The lidar unit may be scanning anywhere within the detectable range. The lidar unit can control a direction of the emitted laser at a certain rate to cover a detectable range, such as a conical detectable range as described.

One or more lidar units may be supported by a vehicle. The lidar units may be distributed in any manner on the vehicle. In some embodiments, a plurality of lidar units may be distributed on the vehicle to detect a 360 degree region around the vehicle. The plurality of lidar units may be arranged so that a set of lidar units is supported by a common support.

Part B shows an example of a plurality of lidar units 122-1, 122-2, 122-3 on a common support 102. A set 122 of lidar units may comprise two or more lidar units that are on a common support. A set of lidar units may comprise one or more, two or more, three or more, four or more, five or more, six or more, seven or more, or eight or more lidar units on a common support. The lidar units in the set may be clustered together.

The lidar units may be arranged to be pointing at different directions from one another. The primary direction of each of the lidar units within the set may be different from one another. The primary directions of each of the lidar units may be non-parallel. The primary directions of each of the lidar units of the set may or may not intersect at a common point. The lidar units may be pointing toward one another. Alternatively, the lidar units may be pointing away from one another.

The lidar units may have a fixed position relative to one another. The common support may provide a support structure that may keep the lidar units at fixed positions relative to one another. Each lidar unit of a group may be fixedly attached to its respective support structure. During operation of the vehicle, the lidar units may remain at fixed positions relative to one another. During operation of the vehicle, the lidar units may remain at fixed positions relative to the vehicle body. During operation of the vehicle, the lidar units may remain at fixed positions relative to the support structure. The lidar units may remain fixed with aid of a fixture device configured to rigidly affix the lidar units. During operation of the vehicle, the lidar units within a group may be configured to move relative to one another. Movement of the vehicle may cause less than a 5 degree, 3 degree, 2 degree, 1 degree, 0.5 degree or 0.1 degree variance in the angles relative to one another and/or relative to the environment. Such movement of less than the degrees provided may constitute the lidar units being substantially fixed. The support structure may be formed from a substantially rigid material. In some alternative embodiments, the lidar units may move relative to one another. During operation of the vehicle, the lidar units may move relative to the vehicle body. The support structure may comprise one or more hinges, ball joints, tracks, slides, grooves, or other mechanisms that may allow the lidar units to move relative to one another. The support structure may comprise one or more actuator that may cause the lidar units to move relative to one another. In some embodiments, the lidar units may be supported by a carrier on the support structure. The carrier may be gimbal as described elsewhere herein. The carrier may comprise a one-axis gimbal, two-axis gimbal, or three-axis gimbal. The lidar may rotate about a yaw, pitch, and/or roll axis relative to the support structure. In some embodiments, at some moment in time, the carrier may hold the lidar units at fixed positions relative to one another, the support structure, and/or the vehicle body. In some embodiments, the carrier may permit movement about one, two, or more degrees of freedom relative to the support structure, vehicle, or inertial reference frame, to maintain a fixed disposition between lidar units within the same set. The lidar units may rotate about the same amount in the same direction. In some instances, the fixed disposition may be maintained with aid of one or more linkages. The linkages may comprise serial or parallel linkages. The linkages may be multi-bar linkages. The fixed disposition may be maintained with aid of a kinematic coupling. The fixed disposition may be maintained by mechanically coupling the lidar units in a rigid manner. The disposition of the lidar units may be controlled in real-time. The disposition of the lidar units may be controlled during operation of the vehicle.

The lidar units may be held within a recess or sleeve of the common support. The lidar units may be attached with aid of brackets, or other types of fasteners, to the common support. The lidar units may be completely or partially embedded in the common support. The lidar units on a common support may be located close to one another. In some embodiments, there may be a distance of less than 30 cm, 20 cm, 15 cm, 10 cm, 7 cm, 5 cm, 3 cm, 2 cm, 1 cm, 0.5 cm, or 0.1 cm between adjacent lidar units within the same set. The lidar units may be supported by the support structure. The weight of the lidar units may be borne by the support structure.

Part C shows an example of a set 122 of lidar units 122-1, 122-2, 122-3 on a common support 102. Each of the lidar units may comprise a detectable range. The detectable range for each of the lidar units relative to the respective lidar units may be the same. For example, each lidar unit may have the same detectable distance and/or FOV angle. In one example, each lidar unit has a 57 degree FOV, or any other value as described elsewhere herein. The detectable range for each of the lidar units relative to an inertial reference frame (e.g., the environment) may be different from one another. The difference may be due to the placement of the lidar units relative to one another.

In some embodiments, the lidar units may be arranged on the common support so that they are in the same plane. The lidar units may be on substantially the same lateral plane. The lidar units may be at the same elevation above ground. The lidar units may be at the same height on the vehicle. The lidar units may be arranged so that the detectable ranges are directed primarily laterally. The lidar units may be substantially oriented horizontally. There may or may not be a vertical component to the direction of the lidar units. A vertical component of the direction of the lidar units may be less than or equal to about 15 degrees, 10 degrees, 5 degrees, 3 degrees, or 1 degree.

The lidar units within the same set may be arranged to all have the same vertical degree of orientation. For instance, all of the lidar units may be arranged with zero degrees of vertical orientation. In another example, all of the lidar units within the set may be angled slightly upwards, or may be angled slightly downwards. Alternatively, lidar units within the same set may have slightly different vertical orientations. For example, a first lidar unit within a set may be angled slightly upwards, while the other two lidar units are angled slightly downwards or straight horizontally. In another example, two of the lidar units may be angled slightly upwards while a third lidar unit may be angled slightly downwards or straight horizontally. In some embodiments, lidar units within the same set or between different sets may have slightly different vertical orientations or substantially different vertical orientations. The variations in vertical orientations allow the lidar units to adequately detect different types objects of various heights (e.g., children who may be below a certain height and not easily detected, small animals such as pets, bicycles, motorcycles, trucks such as 18-wheelers, trucks with tailgates, etc.).

The detectable ranges of the lidar units within a set may or may not overlap with one another. The lidar units may be arranged so that their FOVs may or may not overlap. In some embodiments, their FOVs may overlap by less than 15 degrees, 10 degrees, 5 degrees, 3 degrees, 2 degrees, or 1 degree. In some instances, their FOVs may overlap more than any of the values provided herein. The FOVs may overlap within a range between any two values provided herein. In some embodiments, the detectable range may not overlap at all.

The detectable ranges of the plurality of lidar units of a set may collectively form a detectable range for the set. For instance, if each of the lidar units have a detectable range with a 57 degree FOV, and the lidar units are arranged so that the detectable ranges are right next to each other to form a single continuous range without substantial overlap, then the collective detectable range may have about a 171 degree FOV. In some embodiments, the lidar units within the same set may be shifted about 30 degrees, 40 degrees, 45 degrees, 50 degrees, 55 degrees, 57 degrees, 60 degrees, 65 degrees, 70 degrees, 80 degrees, 90 degrees or any other value. The lidar units within the same set may be shifted by at least any of these degree values, no more than any of these degree values or within a range falling between any of these degree values. The lidar units of the set may have detectable ranges that are arranged to form a single continuous detectable range for the set. Alternatively, there may be gaps that may cause multiple discontinuous detectable ranges for the set. A collective field of view of a lidar unit of a set may be adjustable in real-time by changing a position of at least one lidar unit within the set. This adjustment may occur while a vehicle is in operation. Such adjustments may occur in real-time.

In some embodiments, overlap may be provided between the detectable ranges of the lidar units of the same set. The lidar units may be arranged in a manner to increase overlap between adjacent detectable ranges of the lidar units. Increased overlap may include overlap of at least 1 degree, 3 degrees, 5 degrees, 10 degrees, 15 degrees, 30 degrees, 45 degrees, 60 degrees, 75 degrees, or 90 degrees.

In some embodiments the set of lidar units may have a collective field of view of at least 30 degrees, 45 degrees, 60 degrees, 90 degrees, 120 degrees, 135 degrees, 150 degrees, 160 degrees, 171 degrees, 180 degrees, 210 degrees, 240 degrees, 270 degrees, 300 degrees, 330 degrees, or 360 degrees.

Figure 5:
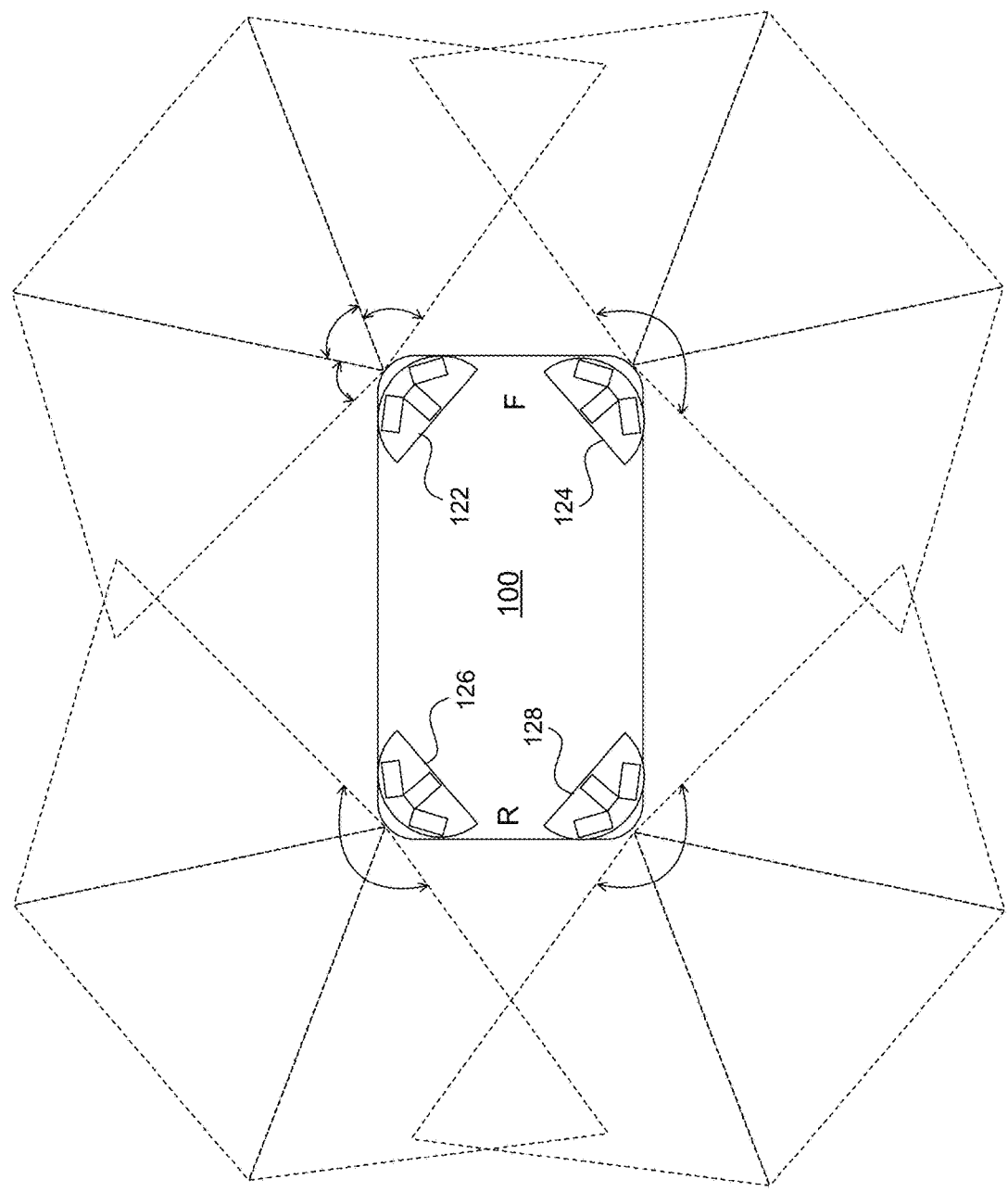
FIG. 5 shows an example of multiple groups of lidar units being arranged on a vehicle, in accordance with an embodiment of the disclosure.

FIG. 5 shows an example of multiple groups of lidar units being arranged on a vehicle, in accordance with an embodiment of the disclosure. A vehicle 100 may comprise a plurality of sets of lidar units that are arranged to form a multi-lidar module. Each set of lidar units may be a subset of the lidar units of the vehicle. Each subset of lidar units may comprise two or more lidar units. Each lidar unit of each subset may not overlap with lidar units in other subsets. In some embodiments, no two subsets of lidar units may share lidar units with one another. A lidar unit may belong to a single lidar unit.

Any number of lidar units may be arranged on the vehicle body. In some embodiments, less than or equal to about 1, 2, 3, 4, 5, 6, 7, 8, 9, 10, 12, 15, 20, 25, 30, 35, 40, 50, or 100 lidar units are used to cover a desired detectable region around the vehicle. Optionally, more than any of the numbers of lidar units provided herein may be used. In some embodiments, the number of lidar units used to cover a desired detectable range may fall within a range between any two of these numbers.

A driving assembly may comprise a plurality of lidar units that may be configured to be supported by a vehicle body. The lidar units may be collectively configured to detect a periphery region in proximity to or around the vehicle body. The lidar units may be useful for aiding in autonomous driving upon coupling the driving assembly to the vehicle body. Each of the plurality of lidar units may have any detectable range angle, such as those described elsewhere herein (e.g., less than 180 degrees). The lidar units may comprise a first subset of lidar units comprising at least two lidar units having a fixed disposition relative to one another and a second subset of lidar units comprising at least two lidar units having a fixed disposition relative to one another. The first and second subset of lidar units may be supported on different areas of the vehicle body and may be configured to work in concert to detect a periphery region in proximity to or around the vehicle body or a portion thereof. The subset of lidar units may be groupings or clusters of lidar units.

Any number of groupings of lidar units may be provided. For instance, one or more, two or more, three or more, four or more, five or more, six or more, seven or more, eight or more, nine or more, or ten or more groupings of lidar units may be provided. Each grouping of lidar units may have a common support. The groupings of lidar units may be arranged so that multiple clusters of lidar units are arranged on a vehicle.

Each grouping of lidar units may have the same characteristics. For example, each grouping of lidar units may have the same detectable range relative to the grouping. Each grouping of lidar units may have the same maximum distance or FOV angle. Alternatively, one or more of the grouping of lidar units may have different characteristics. One or more grouping of lidar units may have a different detectable range. One or more groupings of lidar units may have a different maximum distance or FOV angle.

In one example, four groups of lidar units 122, 124, 126, 128 may be provided on a vehicle. Any description herein may apply to any number of groups of lidar units on the vehicle. The groups of lidar units may be arranged so that overlap is provided between the groups of the lidar units. Overlap may or may not be provided between any two adjacent groups of lidar units. In some embodiments, overlap between two groups of lidar units, such as adjacent groups of lidar units may be at least 5 degrees, 15 degrees, 30 degrees, 45 degrees, 60 degrees, 70 degrees, 80 degrees, 90 degrees, 105 degrees, 120 degrees, 150 degrees, 180 degrees, 210 degrees, 240 degrees, 270 degrees, or 360 degrees. Optionally, the overlap between two groups of lidar units may be less than any of the values provided herein or within a range falling between any two of the lidar units provided herein. The degree of overlap between the groups of lidar units may be sufficient for sensor calibration and/or real time error detection of sensor calibration.

Each of the groups of sensors may have a support for the lidar units of the group. Each group of lidar units may comprise multiple lidar units. For example, a first support structure may support one, two, three or more lidar units, a second support structure may support one, two, three or more lidar units, a third support structure may support one, two, three or more lidar units, and/or a fourth support structure may support one, two, three or more lidar units. Each support structure may be separate from one another. The support structure may be substantially stationary relative to one another on a vehicle. Alternatively, the support structures may move relative to one another. In some embodiments, operation of the vehicle may cause motion that may cause the support structures to move slightly relative to one another. Data from different support structures may be calibrated relative to one another.

In some embodiments, the support structures may move relative to the vehicle body. The support structure may rotate or slide relative to the vehicle body. The support structure may be rigidly affixed to the vehicle body. The support structure may be attached to the vehicle body via one or more dampeners (e.g., shock absorbing mechanisms). Examples of dampeners may comprise springs, elastic materials (e.g., rubbers, foams), pneumatic dampeners, or hydraulic dampeners. The support structure may be attached to the vehicle with aid of a carrier, such as a gimbal as described elsewhere herein.

In some embodiments, a first support structure may move relative to a second support structure. A first group of lidar units supported by the first support structure may move relative to a second group of lidar units supported by the second support structure. The groups of lidar units may move to focus on a predefined portion of a region around the vehicle. The groups of lidar units may move while the vehicle is in operation. The groups of lidar units may be configured to move with aid of one more carriers. The one or more carriers may effect rotation of the support structures, or may effect rotation of individual lidar units. In some embodiments, the predefined portion of the region may have a different object density than the rest of the region around the vehicle. The predefined region may have a higher object density than the rest of the region. Object density may be based on a number of objects within a volume of space. Object density may be based on a percentage of a volume of space that is taken up by one or more objects. Object density may be based on a percentage of volume of space that is not taken up by one or more objects having a continuous volume that meets a minimum threshold.

The groups of lidar units may move relative to one another to adjust an overlap of field of view between the groups of lidar units. A first group of lidar units may move relative to a second group of lidar units to adjust an overlap of field of view between the first and second groups of lidar units. In some embodiments, the overlap of the field of view may be adjusted in real-time. The overlap of the field of view may be adjusted during operation of the vehicle. In some embodiments, the overlap of the field of view may be adjusted to compensate for blind spots while the vehicle is in operation. In some embodiments, the adjustment may be made based on activity of the vehicle, such as a change or predicted change in direction. In some embodiments, the adjustment may be made based on conditions around the vehicle, such as traffic coming from a particular side of the vehicle.

The collective field of view of the lidar units may be adjustable by causing groups of lidar units may move relative to one another. The collective field of view of lidar units may be adjustable by changing a position of a first group of lidar units relative to a second group of lidar units. A collective field of view of a plurality of groups of lidar units may be inversely proportional to a collective detection range of the groups of lidar units. In some embodiments, an increase of the collective field of view of the groups of lidar units may cause the collective detection range of the groups of lidar units to decrease. The collective field of view and detection range may be adjustable in real-time while the vehicle is in operation. This may depend on a width of the collective field of view and/or distance of the collective detection range that is being selected.

In some embodiments, an autonomous driving assembly of a vehicle may comprise a plurality of lidar units configured to be supported by the vehicle body, wherein the lidar units may be collectively configured to detect a 360 degree region around the vehicle body, or any other degree region as provided elsewhere herein, to aid in the autonomous driving upon coupling said driving assembly to the vehicle body. The plurality of lidar units may comprise a first subset of lidar units comprising at least two lidar units supported by a first support structure and a second subset of lidar units comprising at least two lidar units supported by a second support structure. The first and second support structures may be separate from one another. Optionally, the plurality of lidar units may comprise a third subset of lidar units comprising at least two lidar units supported by a third support structure. The third support structure may be separate from the first and second support structure. The plurality of lidar units may comprise a fourth subset of lidar units comprising at least two lidar units supported by a fourth support structure. The fourth support structure may be separate from the first, second, and/or third support structure. In some embodiments, the subsets of lidar units may be oriented facing diagonally outward from different corners of the vehicle. For example, the first subset of lidar units may be oriented facing outward along a diagonal extending from the first corner of the vehicle. Similarly, the second subset of lidar units may be oriented facing outward along a diagonal extending from the second corner of the vehicle, the third subset of lidar units may be oriented facing outward along a diagonal extending from the third corner of the vehicle, and the fourth subset of lidar units may be oriented facing outward along a diagonal extending from the fourth corner of the vehicle. The diagonals extending from different corners of the vehicle may or may not be on a same horizontal plane. In some cases, two or more of the diagonals may lie on a common axis. Alternatively, all of the diagonals may lie on different axes. The diagonals may extend, for example at about 45 degrees from each respective corner of the vehicle. The diagonals may extend at an acute angle or oblique angle. In some embodiments, the first subset of lidar units may be primarily oriented at 45 degrees, the second subset of lidar units may be primarily oriented at 135 degrees, the third subset of lidar units may be primarily oriented at 225 degrees, and/or the fourth subset of lidar units may be primarily oriented at 315 degrees, facing away from the vehicle along diagonals extending respectively from the first, second, third and fourth corners of the vehicle.

As described above, each subset of lidar units may be supported by its respective support structure. In some embodiments, two or more subsets of lidar units may be supported by a same or single support structure. For example, the first and second subsets of lidar units may be supported by one support structure, and the third and fourth subsets of lidar units may be supported by another support structure. The first and second subsets of lidar units may be rigidly attached to one support structure. Similarly, the third and fourth subsets of lidar units may be rigidly attached to the other support structure. The aforementioned support structures may be located on different sides of the vehicle, and can be fixed or movable relative to each other.

In some embodiments, all of the subsets of lidar units may be supported on a same support structure. For example, the first, second, third and fourth subsets of lidar units may be supported on a single support structure that is attached or coupled to the vehicle. The single support structure may be provided as a frame, plate, truss, or sheet, and may be formed of a rigid material (e.g., metal or fiber composite). The support structure may be rigidly coupled to the chassis of the vehicle. Each subset of lidar units may be attached to a different end or corner of a single support structure. In some embodiments, the single support structure may have a rectangular shape, and the first, second, third and fourth subsets of lidar units may be attached to the respective four corners of the rectangular-shaped support structure. Each subset of lidar units may be rigidly attached or movably attached to each respective corner of the support structure. In some embodiments, all of the subsets of lidar units may be rigidly attached to the same (or single) support structure, such that all of the subsets of lidar units have a fixed spatial disposition relative to one another. The fixed spatial disposition of the subsets of lidar units may be maintained at all times, for example even during motion of the vehicle. In some cases, the single support structure need not have a rectangular shape, and can be formed in a variety of regular shapes (e.g., triangular, pentagonal, hexagonal, etc.) or irregular shapes. In those cases, a subset of lidar unit may be attached to each corner. For example, when the support structure is formed having a hexagonal shape, six different subsets of lidar units may be respectively attached to the six corners of the hexagonal-shaped support structure. In some embodiments, the single support structure may be formed having a shape that substantially follows the contour or profile of the vehicle body.

In some further embodiments, one or more support structures need not be used to support the subsets of lidar units. In some cases, the omission of support structures can be advantageous and help reduce the weight and cost of the vehicle. One or more subsets of lidar units may be attached directly to the vehicle body without any intervening support structure. In some embodiments, all of the subsets of lidar units may be attached directly to the vehicle body. For example, a first subset of lidar units may be directly attached to a first corner of the vehicle body, a second subset of lidar units may be directly attached to a second corner of the vehicle body, a third subset of lidar units may be directly attached to a third corner of the vehicle body, and a fourth subset of lidar units may be directly attached to a fourth corner of the vehicle body. As described elsewhere herein, the first subset of lidar units may be primarily oriented facing outward along a first diagonal from the first corner of the vehicle, the second subset of lidar units may be primarily oriented facing outward along a second diagonal from the second corner of the vehicle, the third subset of lidar units may be primarily oriented facing outward along a third diagonal from a third corner of the vehicle, and the fourth subset of lidar units may be primarily oriented facing outward along a fourth diagonal from a fourth corner of the vehicle.

The groups of lidar units may be arranged to be pointing at different directions from one another. A primary direction of a group of lidar units may be at a center of a FOV of the collective lidar units. The primary direction of each of the groups of lidar units may be different from one another. The primary directions of each of the groups of lidar units may be non-parallel. The primary directions of each of the lidar units of the set may or may not intersect at a common point. The groups of lidar units may be pointing away from one another. Alternatively, the groups of lidar units may be pointing toward one another.

In some embodiments, the groups of lidar units may be arranged so that their respective common supports are in the same plane. The groups of lidar units may be on substantially the same lateral plane. The support structures may be on substantially the same lateral plane. Alternatively, the groups of lidar units may be arranged such that their respective common supports are on different planes. Two or more planes may be parallel to one another. Alternatively, two or more planes need not be parallel, and may intersect one another. In some embodiments, the groups of lidar units may be arranged such that some of the common supports are on a same plane and the remaining common supports may be on different planes. The groups of lidar units may be at the same elevation above ground. The support structures may be at the same elevation above ground. The groups of lidar units may be at the same height on the vehicle. The support structures may be at the same height on the vehicle. The groups of lidar units may be arranged so that the detectable ranges are directed primarily laterally. The groups of lidar units may be substantially oriented horizontally. There may or may not be a vertical component to the primary direction of the groups of lidar units. A vertical component of the direction of the groups of lidar units may be less than or equal to about 15 degrees, 10 degrees, 5 degrees, 3 degrees, or 1 degree.

Each group of lidar units may have identical arrangements. For instance, each group of lidar units may have the same number of lidar units and/or types of lidar units. Each group of lidar units may have the same support structure. Each group of lidar units may have the same detectable ranges relative to the lidar units and/or the support structure. Alternatively, two or more of the groups of lidar units may have different characteristics from one another (e.g., different number, different type of lidar units, different support structure, different detectable ranges, etc.).

The groups of lidar units may be arranged on a vehicle so that they have 90 degree offsets relative to one another. For instance, a first group may have a primary direction that is about 90 degrees relative to a primary direction of a second group. The second group may have a primary direction that is about 90 degrees relative to a third group. The third group may have a primary direction that is about 90 degrees relative to a fourth group. The fourth group may have a primary direction that is about 90 degrees relative to the first group. Depending on the group of lidar units, they may have different degrees of offset relative to one another. For instance, if there are N groups of lidar units, the groups of lidar units may have a 360/N degree offset relative to one another. The groups of lidar units may be evenly spaced or angled relative to one another. Alternatively they need not be evenly spaced or angled relative to one another.

In some embodiments, the groups of lidar units may be positioned at or near corners of the vehicle. The groups of lidar units may be positioned at or near top corners of the vehicle (e.g., the roof corners of the vehicle). The groups of lidar units may be positioned at or near the far corners of the vehicle (e.g., the main body of the vehicle). The groups of lidar units may be positioned at or near the front bumper corners and/or the rear bumper corners. The groups of lidar units may be positioned at or near the front hood corners, and/or the rear trunk corners. Corners of the vehicle may be provided where two sides comes together. Corners of the vehicle may be provided where two sides having different orientations intersect with one another. In some embodiments, corners of the vehicle may be provided where three sides having different orientations intersect one another. For example, an upper right front corner may be provided where a front surface, right surface, and top surface intersect.

The groups of lidar units may be directed to be about 45 degrees (or a multiple thereof) offset a direction of motion of the vehicle. The group of lidar units may be directed to about 45 degrees offset a length of the vehicle (e.g., running from the front F to rear R of the vehicle). For example, a first group 122 of lidars may be offset by about 315 degrees from an axis running along the length of the vehicle, a second group 124 may be offset by about 45 degrees from an axis running along the length of the vehicle, a third group 126 may be offset by about 225 degrees from an axis running along the length of the vehicle, and/or a fourth group 128 may be offset by about 135 degrees from an axis running along the length of the vehicle. The groups of lidar units may be directed toward the corners of the vehicle.

Figure 6:
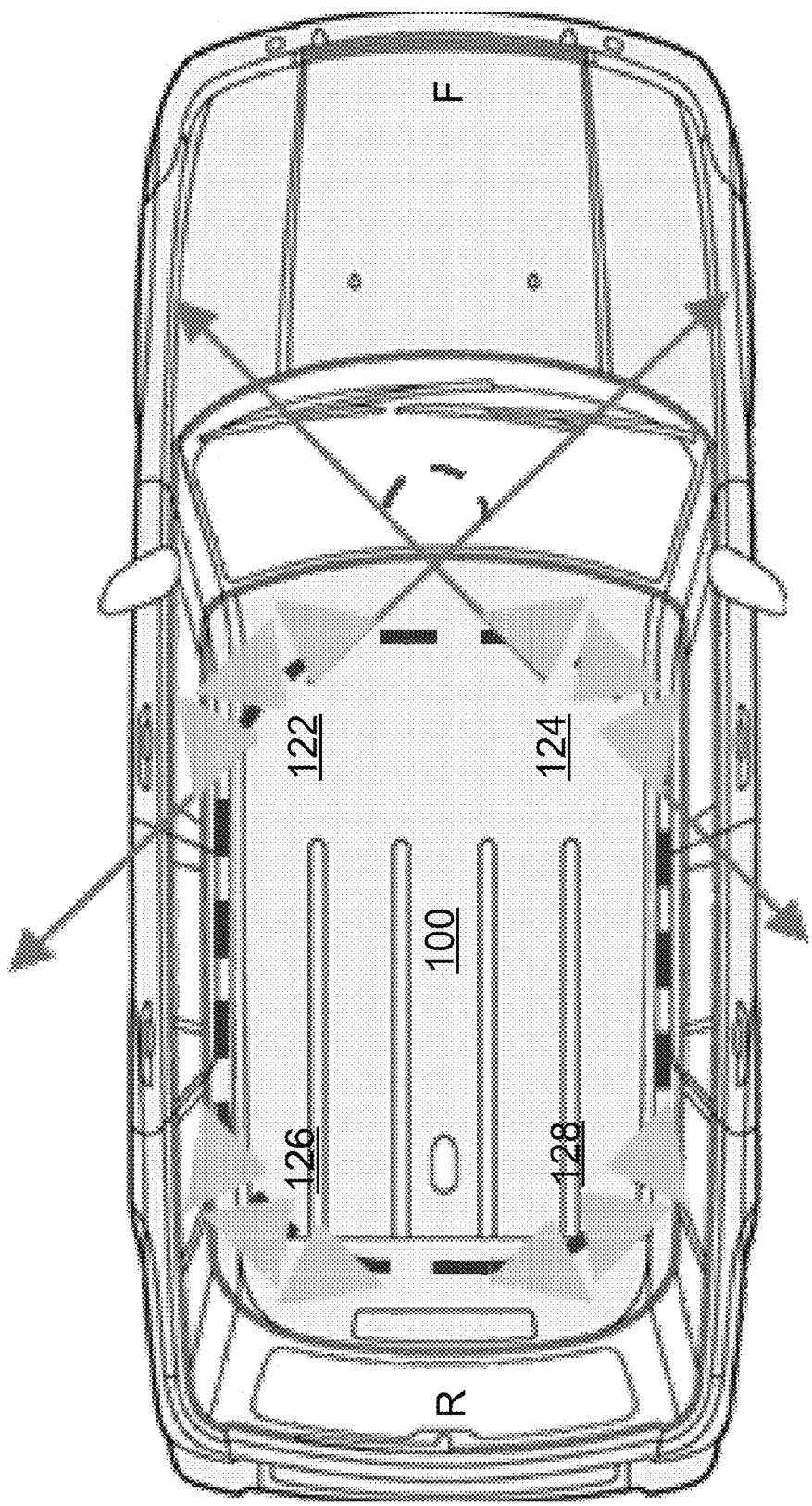
FIG. 6 shows an example of a vehicle with a plurality of groups of lidar units, in accordance with embodiments of the disclosure.

FIG. 6 shows an example of a vehicle 100 with a plurality of groups 122, 124, 126, 128 of lidar units, in accordance with embodiments of the disclosure. The groups of lidar units may be located anywhere on the vehicle. The lidar units may be supported by a vehicle body. The weight of the lidar units may be borne by the vehicle body. The lidar units may or may not directly contact the vehicle body. The lidar units may move with the vehicle body. The lidar units may be affixed relative to the vehicle body.

In some embodiments, the lidar units may be located at or near a ceiling of the vehicle. For example, the lidar units may be located on a top roof of the vehicle facing away from the vehicle. The lidar units may be located at or near a top of a cabin of the vehicle. The lidar units may be located on, outside, or within body panels of the vehicle. The lidar units may be located at top corners of the vehicle. The lidar units may be located at top corners of the cabin of the vehicle. The lidar units may be located at the top corners of the ceiling of the vehicle. For instance, the lidar units may be located at a top right front corner, top right rear corner, top rear left corner, and/or a top left front corner of the passenger cabin of the vehicle. The lidar units may be located at a position above or in line with a head of an operator or passenger of the vehicle. The groups of lidar units may be facing away from one another. The groups of lidar units may be facing outwards into the environment around the vehicle. The lidar units may or may not be located at or near the highest point of the vehicle. The lidar units may be located at or near the top 50%, 40%, 30%, 25%, 20%, 15%, 10%, 5%, 3%, or 1% of the vehicle.

Alternatively or in addition, the lidar units may be located at or near a bottom portion of the vehicle. The lidar units may be located at or near the bottom 50%, 40%, 30%, 25%, 20%, 15%, 10%, 5%, 3%, or 1% of the vehicle. The lidar units may be locate at or near the corners of the entirety of the vehicle body. The lidar units may be located at or near the bumpers of the vehicle. The lidar units may be located at or near the front panels of the vehicle, the rear panels of the vehicle, and/or the side panels of the vehicle. The lidar units may be at a height near or in line with the front or rear lights of the vehicle. The lidar units may be located at or near a hood and/or trunk of the vehicle. The lidar units may be located at or near the corners of a hood and/or trunk of the vehicle.

The groups of lidar units may be located at one or more corners of the vehicle. For instance, a first group of lidar units may be located at a first corner of the vehicle while a second group of lidar units may be located at a second corner of the vehicle. The first and second corners may be located on the same side of the vehicle or different sides of the vehicle. The first and second corners may be located on opposite sides of the vehicle or adjacent sides of the vehicle. A corner may be located at, or defined by the intersection of two laterally adjacent sides of the vehicle. There may be a third group of lidar units located at a third corner of the vehicle and a fourth group of lidar units located at a fourth corner of the vehicle. The third and fourth corners may be located opposite to the first and second corners of the vehicle. The first and second groups of lidar units may be located on a same side or different sides of the vehicle. The first and second groups of lidar units may be supported by the same body panel of the vehicle or different body panels of the vehicle. The first group of lidar units may be located on a first side of the vehicle and a second group of lidar units may be located on a second side of the vehicle. The first and second sides may be adjacent to one another or may be opposite one another. A third and fourth group of lidar units may be located on a third side and a fourth side of the vehicle respectively. In some embodiments, at least two of the first, second, third, and fourth sides may be opposite one another. At least two of the first, second, third, and fourth sides may be adjacent to one another.

The groups of lidar units may be oriented so that they substantially face outward from the corners of the vehicle. Two or more groups of lidar units may substantially face outward from corners at the front F of the vehicle and/or two or more groups of lidar units may substantially face outward from corners at the rear R of the vehicle. Alternatively or in addition, the groups of lidar units may be oriented so they face the primary directions of the vehicle. For instance, one or more groups of lidar units may substantially face the front of the vehicle, one or more groups of lidar units may substantially face the rear of the vehicle, one or more groups of lidar units may substantially face a right side of the vehicle, and/or one or more groups of lidar units may substantially face a left side of the vehicle. The groups of lidar units may be facing away from one another. The groups of lidar units may be facing away from a center of the vehicle. In some embodiments, at least four groups of lidar units may be facing away from one another. In some instances, at least two of the four groups of lidar units may be oriented at directions orthogonal to one another. Optionally, at least two of the four groups of lidar units may be oriented at directions parallel to one another. Alternatively or in addition, at least two of the four groups of lidar units may be oriented at directions oblique to one another.

The one or more groups of lidar units may be substantially facing horizontally. The one or more groups of lidar units may substantially be facing laterally outwards. The one or more groups of lidar units may or may not have a vertical component to their primary direction. The one or more groups of lidar units may have a vertical component of less than or equal to about 30 degrees, 15 degrees, 10 degrees, 5 degrees, 3 degrees, or 1 degree, or any other degree value provided elsewhere herein. The groups of lidar units may be angled downwards, upwards, or straight horizontally.

Each group of lidar units may comprise a plurality of lidar units on a common support. The support structure may be located on a body panel of the vehicle, part of the body panel of the vehicle, or within a body panel of the vehicle. The support structures may be located on, or may be part of a vehicle chassis. The support structures may or may not be removable from the rest of the vehicle. The support structure may be permanently affixed or integral of the vehicle. The support structures may have a fixed position relative to the rest of the vehicle. The support structures may be fixed relative to the vehicle panels and/or chassis. The support structures may or may not be movable relative to the vehicle panels and/or chassis. The support structures may or may not comprise an actuator that move the support structure relative to the vehicle panels and/or chassis.

Clustering the lidar units as indicated may allow a wide range to be detected around the vehicle, using simple lidar units. For instance, single channel lidars may be used to detect at least 180, 270, 360 or any other degree value as described elsewhere herein, around the vehicle. Lidar units with less than 55 degrees, 57 degrees, or 60 degrees FOV may be used to detect regions around the vehicle. In some embodiments, fewer than 30, 25, 20, 18, 16, 15, 14, 13, 12, 10, 8, 6, or 4 lidar units may be used to detect a desired angular range while having a FOV with any of the values described elsewhere herein. In some embodiments, fewer than 10, 8, 6, 5, 4, 3, or 2 groups of lidar units may be used. The lidar units may be arranged so that each group (e.g., cluster) of lidar units may be overlap with an adjacent group of lidar units. The degree of overlap may be sufficient so that even if there is an error in a particular lidar unit, the error can be compensated by the overlap.

Clustering the lidar units may be advantageous since the relative positions between lidar units within the same group may be fixed and known. The lidar units within the same group may be supported by the same support structure, which may keep the positions between the lidar units known and fixed. Thus, during operation of the vehicle, calibration between the lidar units within the same group may not be required. In some embodiments, calibration between the lidar units within the same group may occur upon manufacture of the vehicle. Calibration between the lidar units within the same group may occur upon powering up the vehicle and/or initialization of the vehicle. Calibration of the lidar units may occur in response to a detected event. Calibration may occur prior to utilization of the groups of lidar units. The calibration may be intrinsic calibration. Calibration of the lidar units within the same group may not be required during regular operation of the vehicle.

Calibration may occur between different groups of lidar units. Since the lidar units are clustered into groups, there may be less calibration required than if the lidar units are each separately supported. In some embodiments, calibration between different groups of lidar units may occur upon manufacture of the vehicle. Calibration between different groups of lidar units may occur upon powering up the vehicle and/or initialization of the vehicle. Calibration different groups of lidar units may occur in response to a detected event. Calibration different groups of lidar units may be required during regular operation of the vehicle. Calibration may occur on a regular basis. However, clustering of lidar units may advantageously require less calibration than if the lidar units are each separately supported. For instance, if 12 lidar units are separately supported, they may each need to be calibrated toward one another. If the 12 lidar units are clustered into four groups, then only calibration between the four groups may be required.

Single channel lidar units may be cost-effective and easily accessible compared to multi-channel lidar units. In some embodiments, alternatively or in addition to the groups of lidar units described herein, a multi-channel lidar unit may be used to detect the environment around the vehicle. For example, a 64-channel lidar unit, such as a Velodyne 64-channel lidar unit, may be used. In some embodiments, a combination of single channel lidar units and multi-channel lidar units may be utilized, either individually or collectively, on a vehicle for environmental sensing.

Figure 7:
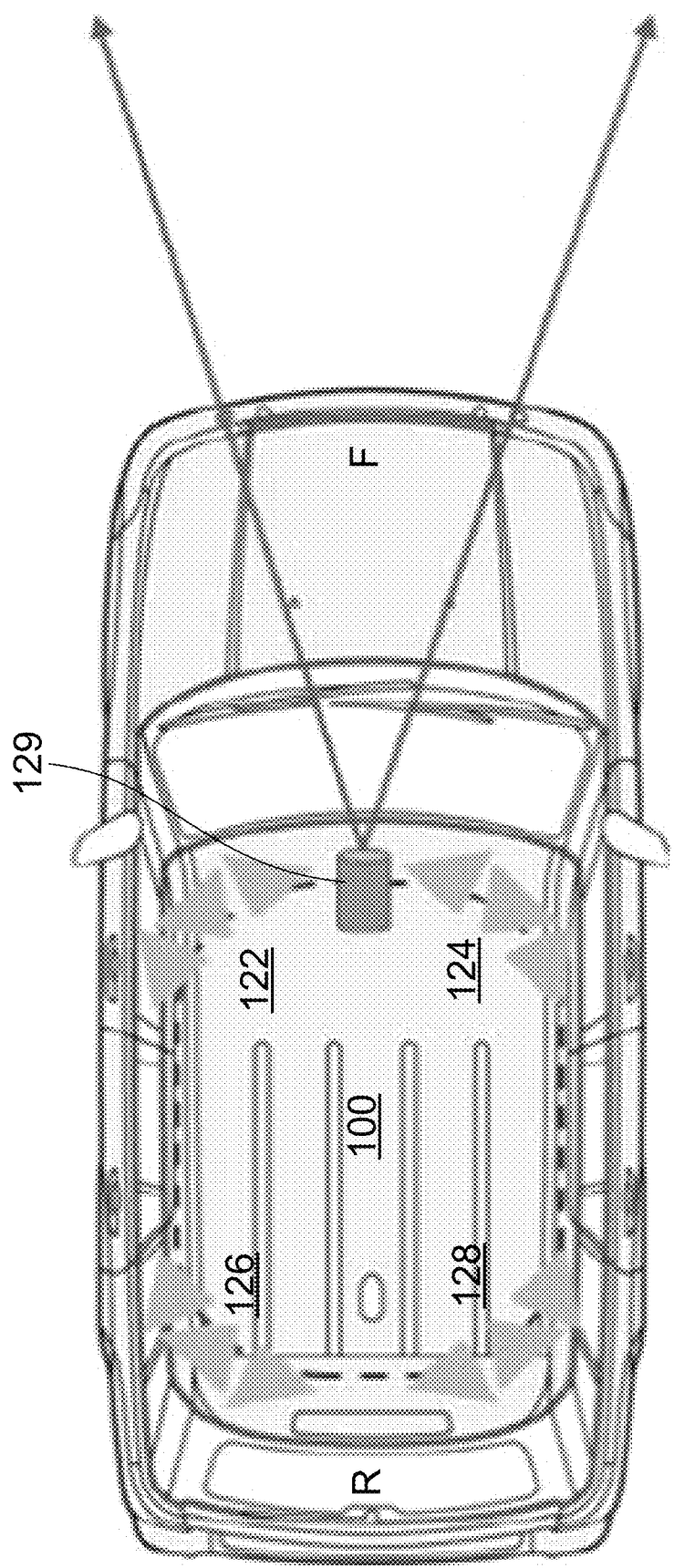
FIG. 7 shows an example of a multi-lidar module including a long range lidar unit, in accordance with embodiments of the disclosure.

FIG. 7 shows an example of a multi-lidar module including a long range lidar unit 129, in accordance with embodiments of the disclosure. In some embodiments, the long range lidar unit may have a narrow field of view (FOV) but is not limited thereto. Different fields of view for the long lidar ranging from narrow to wide can be configured depending on the optical configuration of the lidar. A multi-lidar module may comprise one or more lidar units with a first range, and may comprise one or more lidar units with a second range. The second range may have a greater maximum distance than the first range.

For example, the multi-lidar module may comprise a plurality of groups of lidar units having a first range. The first range may have any distance value as provided elsewhere herein. In some embodiments, the first range may have a maximum distance of about 80. The multi-lidar module may comprise one or more additional lidar units having a second range. The second range may have any distance value as provided elsewhere herein. In some instances, the second range may have a maximum distance of about 200 m. In some embodiments, the second range may have a greater maximum distance than the first range. The second range may have a maximum distance that is at least 10%, 20%, 30%, 40%, 50%, 75%, 100%, 150%, 200%, 300%, or 500% greater than the maximum distance of the first range. The first range and second range may have the same FOV angle, or may have different FOV angles. A lidar unit with the first range may have a FOV angle than is greater than, less than, or equal to the FOV angle of a lidar unit with the second range. In some embodiments, the long range lidar unit may have a narrower FOV than the other types of lidar units. The second range may have a narrower FOV angle than the first range.

As illustrated, the long range lidar unit 129 may be forward-facing. The long range lidar unit may have a primary direction to the front, and facing out from the front side of the vehicle. The long range lidar unit may or may not deviate from its primary direction. The long range lidar unit may be substantially directed laterally. The long range lidar unit may or may not have a vertical component to its primary direction. The long range lidar unit may have a vertical direction within 30 degrees, 15 degrees, 10 degrees, 5 degrees, 3 degrees, 1 degree, or any other degree value, of the horizontal direction. The long range lidar unit may be facing any direction. Alternatively or in addition to facing forwards, the long range lidar unit may backwards, to the right side, the left side, upwards, and/or downwards. The long range lidar unit may have a range greater than the other lidar units. The long range lidar unit may have a field of view that is narrower than or wider than the other lidar units. The long range lidar unit may have a field of view that is narrower than or wider than a collective field of view of a grouping of lidar units. The long range lidar unit may have a field of view that is narrower than the collective field of view of all the other lidar units.

The long range lidar unit may have a fixed position. For instance, the long range lidar unit may remain facing in the same direction, relative to the vehicle. The long range lidar unit may remain facing in the same direction, relative to the other lidar units. In some alternative embodiments, the long range lidar unit may move. The long range lidar unit may move relative to the vehicle. The long range lidar unit may move relative to the other lidar units. The long range lidar unit may change its orientation relative to the vehicle. The long range lidar unit may change its orientation relative to the other lidar units. An actuator may or may not be provided that may cause the long range lidar unit to change its orientation. In some embodiments, a hinge, ball joint, pin, linkage, shaft, or other mechanical component may be provided that may allow the long range lidar unit to change its orientation.

The long range lidar unit may be located on top of a vehicle. The long range lidar unit may be located at the same height as the other lidar units of the multi-lidar module. The long range lidar unit may be located at a different height as the other lidar units of the multi-lidar module (e.g., higher or lower). The long range lidar unit may be located at or near the top 50%, 40%, 30%, 25%, 20%, 15%, 10%, 5%, 3%, or 1% of the vehicle. The long range lidar unit may be located at or near the bottom 50%, 40%, 30%, 25%, 20%, 15%, 10%, 5%, 3%, or 1% of the vehicle. The long range lidar unit may be located at or near the front of the vehicle. The long range lidar unit may be located within 50%, 40%, 30%, 25%, 20%, 15%, 10%, 5%, 3%, or 1% of the front of the vehicle.

The long range lidar unit may be located between two groups of lidar units. The long range lidar unit may be located directly between and in line with two groups of lidar units. In some embodiments, data collected by the long range lidar unit can be fused with data collected by one or more groups of lidar units, for improved and more accurate sensing. The fusion of data from the long range lidar unit and the one or more groups of lidar units can also be used to create a more detailed and comprehensive environmental map. The long range lidar unit may have a different support structure than the groups of lidar units.

The long range lidar unit may be used to detect remote objects. The long range lidar unit may be used in conjunction with other long-ranging sensors (e.g., radar, cameras) for improved reliability.

Figure 8:
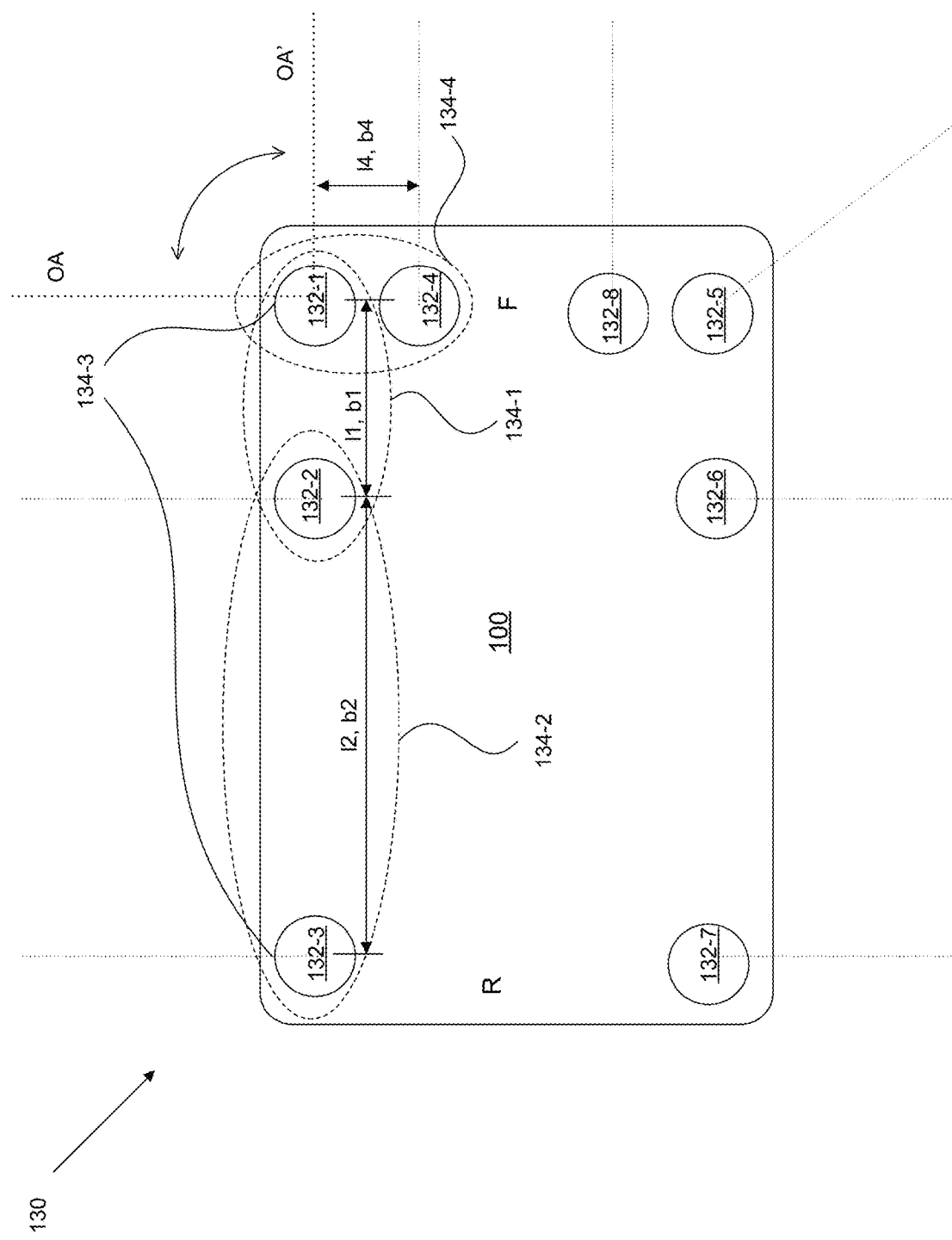
FIG. 8 shows an example of multiple vision sensors being arranged on a vehicle to provide a plurality of binocular cameras, in accordance with some embodiments.

FIG. 8 shows an example of multiple vision sensors being arranged on a vehicle to provide a plurality of binocular cameras, in accordance with some embodiments. The vehicle may be a land-based vehicle such as an automobile. A vision sensing system 130 may comprise a plurality of vision sensors 132 located on different sides of a vehicle 100. The data collected by the vision sensors can be used to determine the presence or absence of obstacles in an environment proximate to or surrounding the vehicle, as well as the distances of those obstacles to the vehicle. The data collected by the vision sensors can also be used to obtain positional and/or motion information, that can be used to control and/or enable autonomous navigation of the vehicle.

The visual sensing range of the vision sensing system may correspond to an environmental sensing range. Each vision sensor may have an angle of view. The maximum visual sensing range may be determined based on the angle of view (horizontally, vertically, and diagonally) and image sensor size within each vision sensor. The angle of view defines the field of the view (FOV) of the vision sensor. A visual sensing range can be defined by any shape and/or size, and the sensitivity/accuracy of the visual sensing may decrease with increasing distance away from the vehicle. In some embodiments, the visual sensing range can be defined by a regular shape (e.g., cube, cylinder, cone, etc.) or an irregular shape surrounding the vehicle.

The vision sensing system 130 may be in operable communication with one or more processors onboard the vehicle. Alternatively, the one or more processors may be remote from the vehicle. The processors may be configured to execute an algorithm for selecting which vision sensors and/or vision sensing data to utilize under various conditions, as described in detail elsewhere herein. The algorithm can be implemented using a combination of software and/or hardware. Examples of the various conditions may include sensor malfunction, inaccuracies or deviations in the vision sensing data, different types of environments in which the vehicle operates, etc.

The vision sensors can be any suitable device for collecting optical signals of the surrounding environment, that can be processed to generate image data of the surrounding environment which may include one or more obstacles. Any suitable number of vision sensors can be used, for example a single vision sensor, a pair of vision sensors, three vision sensors, four vision sensors, or any other number of vision sensors. A vision sensor as used herein may be referred to interchangeably as a camera or an imaging device. In some cases, a vision sensor can be an optical component of a camera or an imaging device. The vision sensors may be part of different imaging devices that are capable of operating in different modes. For example, the vision sensors may be part of one or more monocular cameras and/or multi-ocular cameras. Examples of multi-ocular cameras include binocular cameras also known as stereo cameras.

In some embodiments, the vision sensing system may include at least one imaging device that is configured to operate in a monocular mode, and at least one imaging device that is configured to operate in a multi-ocular mode. In some embodiments, a single imaging device may be configured to operate and switch between two or more imaging modes, which may include a monocular mode and a multi-ocular mode. As an example, an imaging device may be configured to operate in the monocular mode in one instance, and operate in the multi-ocular mode in another instance. A multi-ocular mode may include a binocular mode (or stereo mode).

Referring to FIG. 8, the vision sensing system 130 may include a plurality of vision sensors 132 supported by a vehicle 100. The vision sensors may be stereo vision sensors, and can be used collectively to form one or more binocular cameras. The vision sensors may be coupled to different sides of the vehicle. In some embodiments, the vision sensors can be rigidly coupled to the vehicle such that the positions of the vision sensors are fixed relative to the vehicle. Alternatively, the vision sensors may be operably coupled to the vehicle via one or more carriers, that permit the vision sensors to move relative to the vehicle with respect to up to six degrees of freedom. For example, a vision sensor may be configured to tilt (e.g. pitch upwards, downwards or sideways) by a predetermined amount with aid of a carrier, thereby changing the direction of its optical axis relative to the vehicle.

The plurality of vision sensors may be laterally spaced apart on different sides (e.g., front, rear, left, and right sides) of the vehicle. Each side of the vehicle may be configured to support two or more vision sensors. The vision sensors can be separated laterally apart around the vehicle body by up to 1 m, 500 cm, 250 cm, 100 cm, 50 cm, 25 cm, 10 cm, 5 cm, 2 cm, or 1 cm. The vision sensors can be collectively used to provide a multi-ocular vision sensing system. For example, each vision sensor can provide an image from a different viewpoint relative to the vehicle, that can be used to enable stereo imaging. The vision sensors can be paired with one another in different ways and combinations, to provide binocular (stereo) cameras having different baseline lengths on different sides of the vehicle body. For example, referring to FIG. 8, vision sensors 132-1 through 132-3 may be supported on the left side of the vehicle body. The vision sensors 132-1 through 132-3 may be laterally spaced apart by different distances along the left side of the vehicle body. For example, sensors 132-1 and 132-2 may be separated by a distance l1, and sensors 132-2 and 132-3 may be separated by a distance l2. The distance l1 may be less than the distance l2. Alternatively, the distance l1 may be greater than the distance l2. In some other embodiments, the vision sensors 132-1 through 132-3 may be laterally spaced apart by a same distance such that the distances l1 and l2 are equal. Each of the distances l1 and l2 may be about 0.1 m, 0.2 m, 0.3 m, 0.4 m, 0.5 m, 0.6 m, 0.7 m, 0.8 m, 0.9 m, 1 m, or greater.

The vision sensors can be combined in different ways to form binocular cameras having different baseline lengths. The binocular cameras may comprise different subsets of vision sensors. In some embodiments, a first binocular camera may comprise a first subset of vision sensors comprising at least two vision sensors having a first baseline therebetween, and a second binocular camera may comprise a second subset of vision sensors comprising at least two vision sensors having a second baseline therebetween. For example, referring to FIG. 8, a first binocular camera 134-1 may comprise of vision sensors 132-1 and 132-2 having a first baseline b1 defined by the distance l1 therebetween. Likewise, a second binocular camera 134-2 may comprise of vision sensors 132-2 and 132-3 having a second baseline b2 defined by the distance l2 therebetween. The first baseline b1 may be shorter than the second baseline b2. Alternatively, the first baseline b1 may be equal to or greater than the second baseline b2. In some embodiments, a third binocular camera 134-3 may comprise of vision sensors 132-1 and 132-3 having a third baseline b3 defined by the sum of distances l1 and l2. As shown in FIG. 8, one or more of the binocular cameras 134 may utilize one or more common vision sensors. For example, the vision sensor 132-2 may be utilized by the first and second binocular cameras, and may function as the "left-eye" of the first binocular camera 134-1 and function as the "right-eye" of the second binocular camera 134-2 when these cameras are imaging from the left side of the vehicle body. Alternatively, the vision sensor 132-1 may be utilized by the first and third binocular cameras, and may function as the "right-eye" of each of the first and third binocular cameras 134-1 and 134-3 when these cameras are imaging from the left side of the vehicle body. In other embodiments described elsewhere herein, the plurality of binocular cameras need not share any common vision sensors, and each binocular camera may comprise a unique subset (or pair) of vision sensors.

Accordingly, a plurality of different binocular cameras having different baselines can be provided on multiple sides of the vehicle body, depending on the number of vision sensors coupled to the vehicle body and the lateral distance(s) between the vision sensors. The binocular cameras can be disposed on the same side of the vehicle, on laterally adjacent sides of the vehicle, or on opposite sides of the vehicle. For example, one or more binocular cameras can be disposed on the front, rear, or lateral sides of the vehicle, or suitable combinations thereof.

In some embodiments, binocular cameras located on different sides (e.g. laterally adjacent sides) of the vehicle body may share one or more common vision sensors. For example, referring to FIG. 8, a plurality of binocular cameras may be provided on the front side of the vehicle body. A fourth binocular camera 134-4 may comprise of vision sensors 132-1 and 132-4 having a fourth baseline b4 defined by the distance l4 therebetween. The vision sensor 132-1 may be shared by the first and fourth binocular cameras 134-1 and 134-4, and may be capable of rotating about a vertical axis to change the direction of its optical axis.

For example, when the vision sensor 132-1 is oriented such that its optical axis OA is substantially perpendicular to the left side of the vehicle body, the vision sensor 132-1 may function as the "right-eye" of the first binocular camera 134-1. The vision sensor 132-1 may be capable of rotating about a vertical axis such that its optical axis can be aligned at different angles relative to the vertical axis. When the vision sensor 132-1 is oriented such that its optical axis OA' is substantially perpendicular to the front side of the vehicle body, the vision sensor 132-1 may then function as the "left-eye" of the fourth binocular camera 134-1. As such, a single vision sensor can be utilized in different binocular cameras located on different sides of the vehicle body, depending on the direction in which its optical axis is oriented.

The vision sensors 132 can be configured to acquire a plurality of images from different positions or viewpoints relative to the vehicle. An object that is proximal to the vision sensors generally has a larger parallax compared to an object that is further away from the vision sensors. A binocular error δ for a given subset of vision sensors in a binocular camera may be given by $$\delta = \frac{z^2}{fb}\varepsilon$$

where z corresponds to a depth of the imaged object from an image plane, f is the focal length of the vision sensors, b is the length of the baseline, and ε is the parallax. The binocular error δ may be indicative of an error in the depth of the imaged object as extracted from one or more stereoscopic images captured by the binocular camera. A high binocular error indicates a large error in the "perceived" distance of the object(s) from the vehicle, whereas a low binocular error indicates a low error in the "perceived" distance of the object(s) from the vehicle. For objects that are located further away (i.e. z is greater), parallax ε is low and binocular error δ can be reduced by increasing the length of the baseline b. The length of the baseline b can be increased, for example by increasing the lateral distance between the vision sensors. The increase in baseline b also increases disparity which allows more accurate depth and distance information to be obtained.

For objects that are located closer to the vision sensors, parallax ε is higher but the binocular error δ can be maintained by using a shorter baseline b since z is lower. Thus, a binocular camera comprising a subset of vision sensors that are spaced further apart (i.e. longer baseline b) can be useful for imaging distant objects, since the binocular error is lower and it is more likely for distant objects to fall within its field of view. However, due to the increased baseline, proximal objects may not fall within the field of view of the abovementioned binocular camera.

To address the above, a binocular camera comprising a pair of vision sensors that are spaced closer together (i.e. shorter baseline b) can be useful for imaging proximal objects, since the binocular error is lower and it is more likely for proximal objects to fall within its field of view. Referring to FIG. 8, the first baseline b1 of the first binocular camera 134-1 may be less than the second baseline b2 of the second binocular camera 134-2. Accordingly, the first binocular camera 134-1 comprising of the vision sensors 132-1 and 132-2 can be configured to obtain depth information of objects that are located closer to the left side of the vehicle body, whereas the second binocular camera 134-2 comprising of the vision sensors 132-2 and 132-3 can be configured to obtain depth information of objects that are located further away from the left side of the vehicle body. Additionally or optionally, another binocular camera comprising of the vision sensors 132-2 and 132-4 can be configured to obtain depth information of objects that are located further away from the left side of the vehicle body.

The first and second binocular cameras can be configured to capture stereoscopic images. One or more processors onboard the vehicle or remote from the vehicle may be configured to process the stereoscopic images, and calculate a binocular error δ1 for the first binocular camera 134-1 and a binocular error δ2 for the second binocular camera 134-2. The processors may be further configured to compare the binocular errors δ1 and δ2 to determine which binocular camera (and corresponding set of stereoscopic images) to utilize for obtaining depth information of objects located at different distances from the cameras. For example, when δ1 is greater than δ2, the processors may select and utilize the second binocular camera 134-2 over the first binocular camera 134-1 for vision sensing, since the imaged object(s) may be located further away from the left side of the vehicle body. Conversely, when δ2 is greater than δ1, the processors may select and utilize the first binocular camera 134-1 over the second binocular camera 134-2 for vision sensing, since the imaged object(s) may be located closer to the left side of the vehicle body. In some embodiments, when δ1 is equal to δ2, the processors may select either the first binocular camera or the second binocular camera for vision sensing since the binocular error is the same for both cameras.

In some embodiments, the processors can be configured to determine a first disparity d1 between matched points in stereoscopic images captured by the first binocular camera 134-1, and a second disparity d2 between matched points in stereoscopic images captured by the second binocular camera 134-2. The processors can compare the first and second disparities d1 and d2 to determine which binocular camera (and corresponding set of stereoscopic images) to utilize for obtaining depth information of objects located at different distances from the cameras. For example, when d1 is greater than d2, the processors may select and utilize the first binocular camera 134-1 over the second binocular camera 134-2 for vision sensing, since more accurate depth information can be extracted from the stereoscopic images captured by the first binocular camera. Conversely, when d2 is greater than d1, the processors may select and utilize the second binocular camera 134-2 over the first binocular camera 134-1 for vision sensing, since more accurate depth information can be extracted from the stereoscopic images captured by the second binocular camera. In some embodiments, when d1 is equal to d2, the processors may select either the first binocular camera or the second binocular camera for vision sensing since the disparity is the same for both.

In some embodiments, the processors may be configured to compare the first and second disparities d1 and d2 to a predefined threshold disparity dp, in order to determine which binocular camera (and corresponding set of stereoscopic images) to utilize. The predefined threshold disparity can be obtained from experimental data. The predefined threshold disparity may be a single value or may comprise a range of values. In some embodiments, the predefined threshold disparity can be configured to vary or be adjusted depending on one or more of the following: (1) the environment in which the vehicle is being autonomously operated, (2) weather conditions within the environment, (3) an altitude of the vehicle, (4) object density and distribution within the environment, or (5) visual or physical properties of objects located within the environment.

In some cases, when (1) d1 is greater than the dp and (2) d2 is less than dp, the processors may select and utilize the first binocular camera over the second binocular camera for vision sensing since more accurate depth and distance information can be obtained using the first binocular camera. Conversely, when (1) d2 is greater than the dp and (2) d1 is less than dp, the processors may select and utilize the second binocular camera over the first binocular camera for vision sensing since more accurate depth and distance information can be obtained using the second binocular camera. When both d1 and d2 are greater than dp, the processors may compare d1 and d2 to determine which is higher, and select the binocular camera having the higher disparity for vision sensing and depth extraction. In some cases, both d1 and d2 may be less than dp, for example in an environment with poor lighting or adverse weather conditions. In those cases, the processors may not select the vision sensors for environmental sensing and depth extraction, and may instead select or utilize another set of non-vision sensors (e.g., lidar, radar or ultrasonic) for sensing the surrounding environment.

The vision sensors can be used to simultaneously capture images at a specified frequency to produce a time series of image data. The time series of image data obtained from the vision sensors can be processed to determine the position, orientation, and/or velocity of the vehicle using any suitable method, such as a machine vision algorithm. For example, a machine vision algorithm can be used to identify one or more feature points within each image (e.g., an edge of an object, a corner of an object, or a boundary between objects of two different colors). Any suitable method or combination of methods can be used to identify and provide a digital representation of the feature points, such as the features from accelerated segment test (FAST) algorithm or the binary robust independent elementary features (BRIEF) algorithm. The image data can then be matched to each other to identify a set of common feature points appearing in images obtained by both vision sensors. The motion of the vehicle can be determined based on the common feature points and the spatial disposition of the vision sensors relative to the vehicle and to each other.

As previously described, an optical axis of a vision sensor may be perpendicular to the side of the vehicle body on which the vision sensor is located. In some embodiments, a vision sensor may be capable of rotating about a vertical axis such that its optical axis extend from the side of the vehicle body in a non-orthogonal manner (e.g., at an acute angle or oblique angle). The vision sensors may be configured to rotate (and/or translate) to focus at different points in space.

Figure 9:
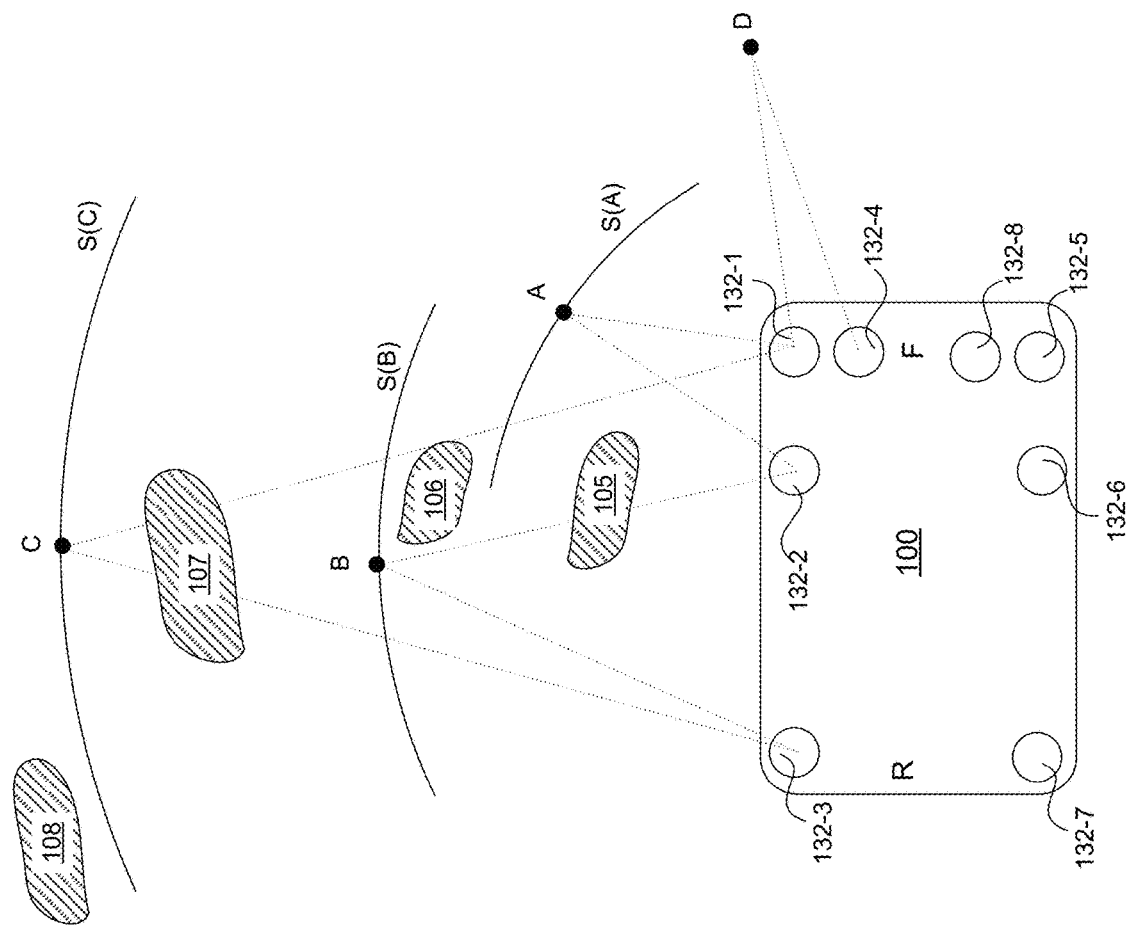
FIG. 9 shows an example of multiple binocular cameras being arranged on a vehicle for sensing various directions and ranges, in accordance with an embodiment of the disclosure.

FIG. 9 shows an example of multiple binocular cameras being arranged on a vehicle for sensing various directions and ranges, in accordance with an embodiment of the disclosure. In FIG. 9, the vision sensors 132-1 and 132-2 of the first binocular camera 134-1 may be oriented (e.g. rotated) such that their respective optical axes intersect at point A in space. In another example, the vision sensors 132-2 and 132-3 of the second binocular camera 134-2 may be oriented (e.g. rotated) such that their respective optical axes intersect at point B in space. In a further example, the vision sensors 132-1 and 132-3 of the third binocular camera 134-3 may be oriented (e.g. rotated) such that their respective optical axes intersect at point C in space. Likewise, in another example, the vision sensors 132-1 and 132-4 of the fourth binocular camera 134-4 may be oriented (e.g. rotated) such that their respective optical axes intersect at point D in space. The above binocular cameras have different disparities which are relative to the vergence angles. For any angle, there is a surface in space corresponding to zero disparity. For example, point A lies on a surface S(A) of zero disparity for the first binocular camera, point B lies on a surface S(B) of zero disparity for the second binocular camera, and point C lies on a surface S(C) of zero disparity for the third binocular camera. These zero disparity surfaces S(A), S(B), and S(C) are located at different distances from the vehicle body. For example, the surface (A) may be located closest to the vehicle, the surface S(C) may be located furthest away from the vehicle, and the surface S(B) may be located between surfaces S(A) and S(B).

For a given surface, objects that are farther away from the surface have disparity greater than zero, and objects that are before the surface have disparity less than zero. Within a region, the disparities can be grouped into three pools:

| Disparities | |
|---|---|
| + | d > 0 |
| − | d < 0 |
| 0 | d = 0 |

The difference in disparities in stereoscopic images obtained by different binocular cameras can be used to resolve any ambiguous matches for objects located at different distances from the vehicle. The difference in disparities can also be used to determine which zone (relative to the vehicle) that an obstacle lies in. For example, in FIG. 9, a plurality of obstacles 105, 106, 107 and 108 may be located at different distances from the left side of the vehicle body. One or more obstacles may lie within the surface of zero disparity for a particular binocular camera, but outside of the surface of zero disparity of another binocular camera. The differences in disparities can be summarized in the table below:

| Binocular camera | Surface S of zero disparity | Obstacle 105 | Obstacle 106 | Obstacle 107 | Obstacle 108 |
|---|---|---|---|---|---|
| 134-1 | S(A) | d < 0 | d > 0 | d > 0 | d > 0 |
| 134-2 | S(B) | d < 0 | d < 0 | d > 0 | d > 0 |
| 134-3 | S(C) | d < 0 | d < 0 | d < 0 | d > 0 |

As described above with reference to FIG. 9, the vision sensors can be oriented in various configurations to focus at different points in space. In some embodiments, the vision sensors may be capable of shifting their optical axes in real-time to create different surfaces of zero disparity, to extract depth information of objects located at various distances from the vehicle body, and also to resolve any ambiguities in the extracted depth information. For example, the depth information obtained by at least one binocular camera can be compared with the depth information obtained by one or more other binocular cameras to correct for binocular errors.

Figure 10:
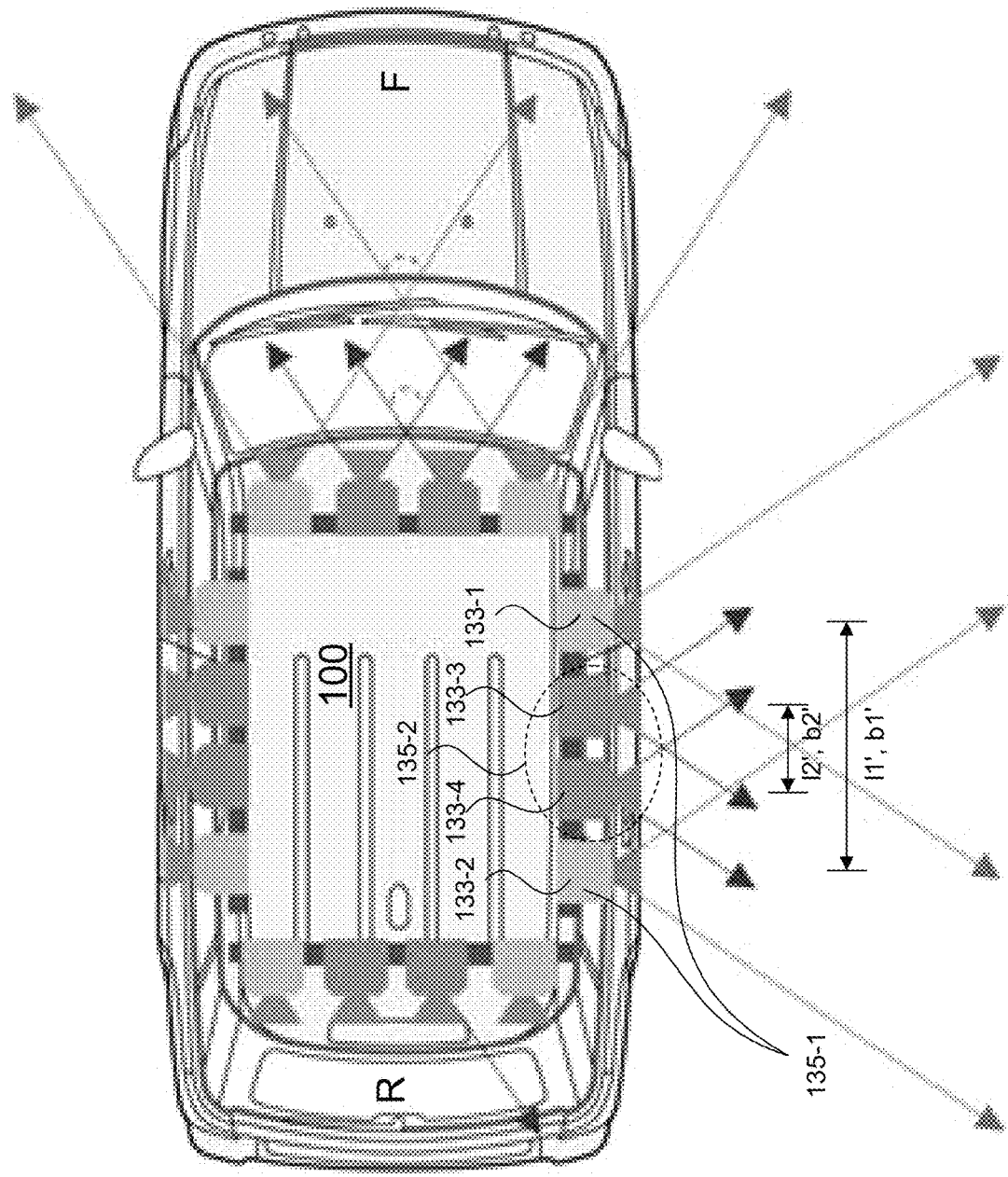
FIG. 10 shows an example of a vehicle with a plurality of binocular cameras comprising various combinations of vision sensors, in accordance with an embodiment of the disclosure.

FIG. 10 shows an example of a vehicle with a plurality of binocular cameras comprising various combinations of vision sensors, in accordance with an embodiment of the disclosure. The vision sensing system may comprise a plurality of vision sensors coupled to different sides of the vehicle body. For example, the plurality of vision sensors can be coupled the vehicle body such that the optical axes and field of view of the vision sensors extend from different sides (e.g., front, rear, left and right sides) of the vehicle body. In the example of FIG. 10, the vision sensors may be mounted on or integrated into a top portion (e.g. hood) of the vehicle.

The vision sensing system of FIG. 10 operates in a similar manner to the system of FIG. 8 except for the following differences. In FIG. 10, each binocular camera 135 is comprised of a unique subset of vision sensors 133, and need not share any vision sensor with another binocular camera. Accordingly, all of the binocular cameras 135 in FIG. 10 are capable of operating independently and simultaneously to image the environment proximate to or surrounding the vehicle body. In some cases, the vision sensors 133 may be rigidly coupled to the vehicle body such that they maintain a same field of view with respect to the side(s) of the vehicle body. In some alternative embodiments (not shown), one or more of the vision sensors 133 may be capable of changing its orientation to change the direction of its optical axis, as described elsewhere herein with respect to FIG. 9.

In FIG. 10, a first binocular camera 135-1 and a second binocular camera 135-2 are supported facing out from the right side of the vehicle body. The first binocular camera 135-1 may be comprised of vision sensors 133-1 and 133-2 having a first baseline b1 ' defined by the distance l1' therebetween. Likewise, the second binocular camera 135-12 may be comprised of vision sensors 133-3 and 133-4 having a second baseline b1 ' defined by the distance l1' therebetween. Unlike FIG. 8, the first and second binocular cameras 135-1 and 135-2 have unique subsets of vision sensors, and need not utilize any common vision sensor. In some embodiments, the pair of vision sensors of the second binocular camera may be positioned between the pair of vision sensors of the first binocular camera on one side of the vehicle. The second binocular camera may be configured to collect image data closer to the vehicle than the first binocular camera, and within a blind spot of the first binocular camera.

As shown in FIG. 10, the first baseline b1 ' may be longer than the second baseline b2'. In some alternative embodiments, the first baseline b1 ' may be less than the second baseline b2'. The vision sensors 133 have overlapping fields of view to ensure that sufficient image data points of the surrounding environment can be collected. The first binocular camera 135-1 has a field of view that is greater than the second binocular camera 135-2. Accordingly, the first binocular camera 135-1 comprising the pair of vision sensors 133-1 and 133-2 that are spaced further apart (i.e. longer baseline b) can be useful for imaging distant objects, since the binocular error is lower and it is more likely to capture distant objects within its field of view. In contrast, the second binocular camera 135-2 comprising the pair of stereo vision sensors 133-3 and 133-4 that are spaced closer together (i.e. shorter baseline b) can be useful for imaging proximal objects, since the binocular error is lower and it is more likely to capture proximal objects within its field of view. As previously described, different binocular cameras of different baselines can be configured to image objects located at different distances from the corresponding side(s) of the vehicle body, in order to minimize binocular errors and improve the accuracy of the extracted depth information. An environmental map can be constructed with a certain level of accuracy based on the collected image data points, as described elsewhere herein.

The vision sensors shown in FIGS. 8-10 may be configured to capture binocular (stereoscopic) or multi-ocular images of the environment proximate to or surrounding the vehicle. Additionally or optionally, one or more monocular cameras may be provided on the vehicle, and configured to capture monocular color images. One or more of the cameras may capture images at a same time instance or at different time instances. A 3-D depth map of the environment can be obtained from the binocular or multi-ocular images. The plurality of vision sensors may provide fields of view of n degrees. In some embodiments, n may be about 90°, 100°, 110°, 120°, 130°, 140°, 150°, 160°, 170°, 180°, 190°, 200°, 210°, 220°, 230°, 240°, 250°, 260°, 270°, 280°, 290°, 300°, 310°, 320°, 330°, 340°, 350°, or 360°. Any value for n may be contemplated. For example, n may be greater than 0°, or less than or equal to 360°. When n is 360°, complete-surround visual sensing can be obtained. In some cases, the visual sensing range may be defined by any shape having a predetermined distance from the center of the vehicle. The predetermined distance may range from several meters to hundreds of meters. For example, the predetermined radius may be about 1 m, 5 m, 10 m, 20 m, 30 m, 40 m, 50 m, 60 m, 70 m, 80 m, 90 m, 100 m, 200 m, 300 m, 400 m, 500 m, or any values therebetween. In some cases, the predetermined distance may be less than 1 m or greater than 500 m. Any value for the predetermined radius may be contemplated. In some embodiments, the visual sensing range may depend on an environmental complexity of the environment in which the vehicle operates. The visual sensing range can dynamically adjust as the vehicle moves through different environments. For example, when the vehicle is moving in an environment comprising a large number of objects or obstacles, the visual sensing range can be extended, and/or a sensitivity level (e.g., resolution) of the visual sensing may be increased. Conversely, when the vehicle is moving in an environment comprising a low number of objects or obstacles, the visual sensing range may be reduced, and/or a sensitivity level (e.g., resolution) of the visual sensing may be decreased.

The cameras may be capable of taking multiple images substantially simultaneously, sequentially, or at different points in time. The multiple images may aid in the creation of a 3D scene, a 3D virtual environment, a 3D map, or a 3D model. For instance, a right-eye image and a left-eye image may be taken and used for stereo-mapping. A depth map may be calculated from a calibrated binocular image, as described in detail below. Any number of images (e.g., 2 or more, 3 or more, 4 or more, 5 or more, 6 or more, 7 or more, 8 or more, 9 or more) may be taken simultaneously to aid in the creation of a 3D scene/virtual environment/model, and/or for depth mapping. The images may be directed in substantially the same direction or may be directed in slightly different directions. In some instances, data from other sensors (e.g., ultrasonic data, LIDAR data, data from any other sensors as described elsewhere herein, or data from external devices) may aid in the creation of a 2D or 3D image or map.

In some embodiments, stereoscopic image data obtained from one or more cameras can be analyzed to determine the environmental information. The stereoscopic image data can include binocular images or video. The environmental information may comprise an environmental map. The environmental map may comprise a topological map or a metric map. The metric map may comprise at least one of the following: a point cloud, a 3D grid map, a 2D grid map, a 2.5D grid map, or an occupancy grid map. The occupancy grid may be used to define a 3D map of the spatial environment proximate to or surrounding the movable object.

In some embodiments, analysis of stereoscopic video data may comprise at least one of the following: (1) imaging device calibration, (2) stereo matching of image frames, and (3) depth map calculation. The imaging device calibration may comprise calibrating intrinsic parameters and extrinsic parameters of an imaging device such as a binocular camera. The binocular camera may be configured to capture one or more binocular images. The stereoscopic video data may be obtained from a plurality of binocular images. The stereo matching may comprise (1) extracting substantially in or near real-time feature points of each monocular image in each binocular image, (2) calculating the motion characteristics of the feature points, (3) matching corresponding feature points extracted from the image frames based on the motion characteristics of the feature points, and (4) eliminating mismatch feature points. The depth map calculation may comprise (1) calculating a pixel-based disparity map based on the matched feature points and (2) calculating a depth map based on the extrinsic parameters of the binocular camera. The depth map calculation may comprise filtering and applying a threshold to the depth map to determine or more obstacles. For example, the threshold may be applied to classify objects in the environment having a predetermined size and/or number of pixels in the depth map.

Figure 11:
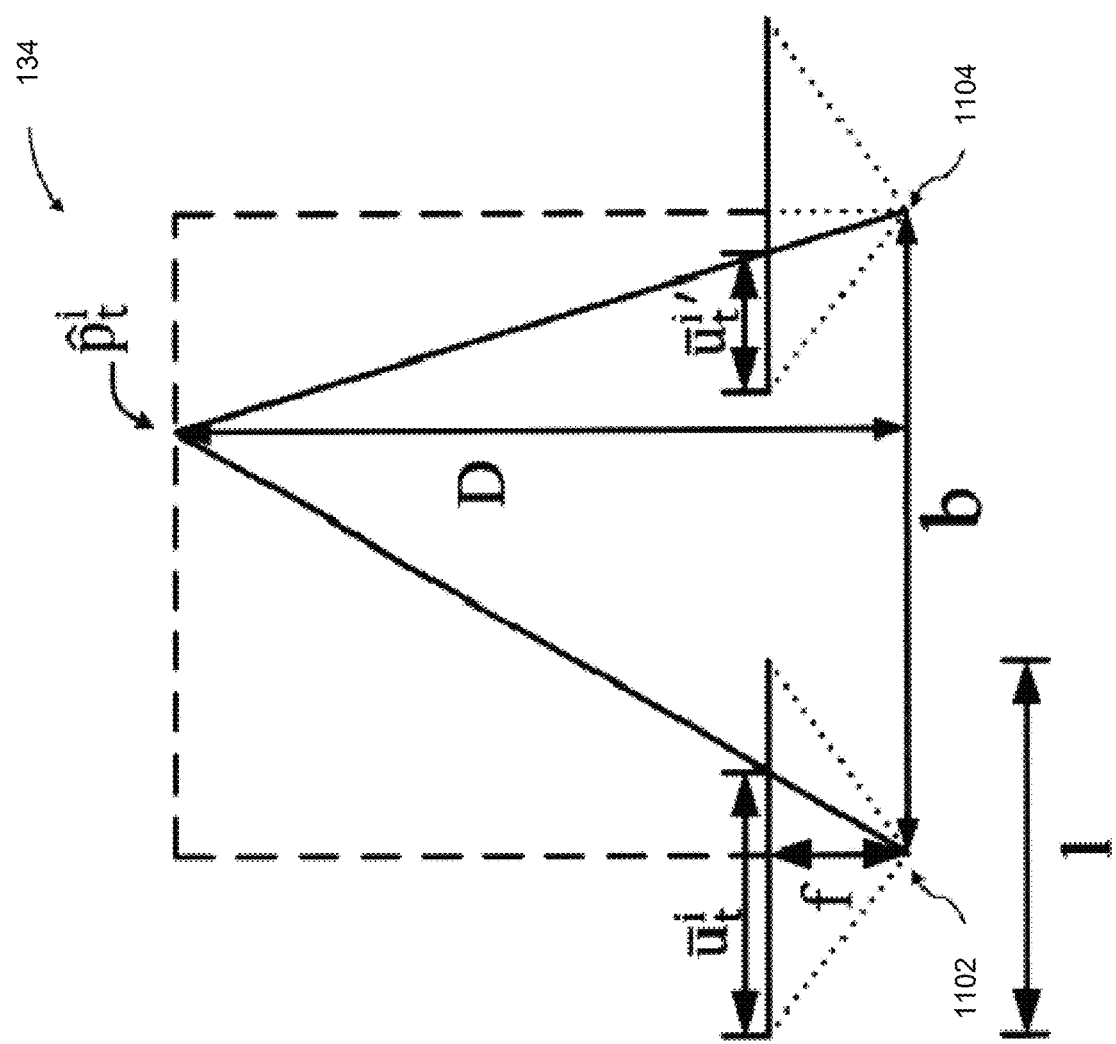
FIG. 11 illustrates a binocular camera 134 for stereo vision, in accordance with some embodiments.

FIG. 11 illustrates a binocular camera 134 for stereo vision, in accordance with some embodiments. The binocular camera can include a left vision sensor and a right vision sensor (not shown) centered at positions 1102 and 1104, respectively. The parameters focal length f, photosensor size l, and the baseline distance b between the vision sensors are known for the binocular camera. The 3D coordinate $\hat{p}_t^i$ corresponds to a pair of matched feature points $m_t^i=(u_t^i, v_t^i)$ and $m_t^{i\prime}=(u_t^{i\prime}, v_t^{i\prime})$ in the images captured by the left and right vision sensors, respectively. The pixel distances $u_t^i$ and $u_t^{i\prime}$ can be multiplied by the size of a single pixel to become spatial distances $\bar{u}_t^i$ and $\bar{u}_t^{i\prime}$. Thus, using the formula $$\frac{D}{f}|\bar{u}_t^i - l/2| + \frac{D}{f}|\bar{u}_t^{i\prime} - l/2| = b$$

the distance between the 3D coordinate $\hat{p}_t^i$ and the vision sensors, denoted D, can be determined. Based on the internal parameter matrix of the camera K and calculated value of D, the estimated 3D coordinate $\hat{p}_t^i$ can thus be derived for the point $(u_t^i, v_t^i)$.

Following frame-to-frame matching and stereo matching of feature points, a feature point-3D coordinate pair $c_i=\{m_t^i, \hat{p}_t^i\}$ can be obtained for each feature point. The velocity of the camera can thus be determined by analyzing the motion of the feature points within the images using any suitable algorithm. For example, given a set of n coordinate pairs $c_1, c_2, \ldots, c_n$ obtained at a time t, the matrix $\tilde{R}$ can be expressed as three row vectors $\tilde{R}=[r_1\ r_2\ r_3]^T$, and the internal parameter matrix of the camera can be expressed as $$K = \begin{bmatrix} f_u & 0 & u_c \\ 0 & f_v & v_c \\ 0 & 0 & 1 \end{bmatrix}$$

Consequently, an estimated positional movement or change between each feature point in time, $\tilde{T}_v$, can be obtained by solving $$\begin{bmatrix} (u_t^1 - u_c)\tilde{r}_3^T \hat{p}_t^1 - f_u \tilde{r}_1^T \hat{p}_t^1 \\ (v_t^1 - v_c)\tilde{r}_3^T \hat{p}_t^1 - f_v \tilde{r}_1^T \hat{p}_t^1 \\ (u_t^2 - u_c)\tilde{r}_3^T \hat{p}_t^2 - f_u \tilde{r}_1^T \hat{p}_t^2 \\ (v_t^2 - v_c)\tilde{r}_3^T \hat{p}_t^2 - f_v \tilde{r}_1^T \hat{p}_t^2 \\ \cdots \\ (u_t^n - u_c)\tilde{r}_3^T \hat{p}_t^n - f_u \tilde{r}_1^T \hat{p}_t^n \\ (v_t^n - v_c)\tilde{r}_3^T \hat{p}_t^n - f_v \tilde{r}_1^T \hat{p}_t^n \end{bmatrix} = \begin{bmatrix} f_u & 0 & u_c - u_t^1 \\ 0 & f_v & v_c - v_t^1 \\ f_u & 0 & u_c - u_t^2 \\ 0 & f_v & v_c - v_t^2 \\ \cdots & \cdots & \cdots \\ f_u & 0 & u_c - u_t^n \\ 0 & f_v & v_c - v_t^n \end{bmatrix} \cdot \tilde{T}_v$$

As the estimated positional movement is primarily obtained based on frame matching of image data from the left and right vision sensors, the accuracy and precision of this estimate can be influenced by the size of n. For example, the accuracy and precision of the estimate may increase as n increases.

The vision sensors described in FIGS. 8-10 may be characterized by one or more sensor parameters. The sensor parameters may be intrinsic or extrinsic parameters. An intrinsic parameter may relate to the internal configuration of a vision sensor. Example of intrinsic parameters may include focal length, scale factor, radial distortion coefficients, and tangential distortion coefficients. Intrinsic parameters may be any parameters that are dependent on hardware configurations, in some cases the intrinsic parameters may be set by a factory setting for the vision sensor. Extrinsic parameters may relate to the spatial relationship between any two or more vision sensors. Each vision sensor may have a relative coordinate system independent of other sensors on board the movable object. Extrinsic properties may be important for sensor fusion, combining data from sensors in different locations on the movable object. Sensor fusion may involve a process of transforming the relative coordinates of a given sensor to match the reference frame of another sensor.

Figure 12:
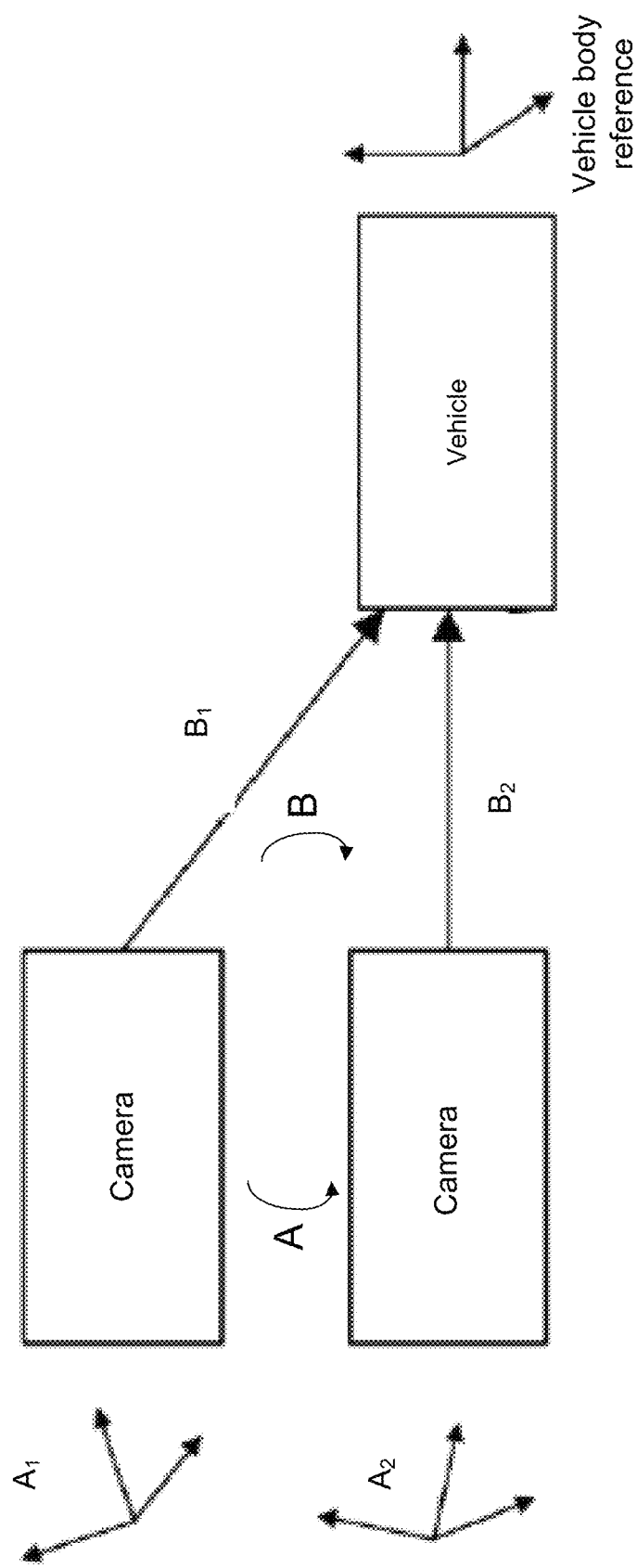
FIG. 12 illustrates the transforming of relative coordinates of one or more cameras to match the reference frame of the vehicle.

FIG. 12 illustrates the transforming of relative coordinates of one or more cameras to match the reference frame of the vehicle. A transformation may be conducted such that the coordinate system of each camera is rotated to match the coordinate system of the vehicle body. The transformation may be accounted for mathematically by a transformation matrix.

Intrinsic properties may be specific to a sensor and may vary infrequently. Recalibration of intrinsic properties may occur periodically while the vehicle is not operating. It may not be critical to recalibrate intrinsic properties while the vehicle is operating because these properties remain relatively consistent while the vehicle is operating in comparison to extrinsic properties. Intrinsic properties may be calibrated by interpreting an image of a known calibration standard or target. Vanishing lines or points on a calibration standard or target may be used to calibrate the intrinsic properties such as focal length and distortion.

Extrinsic properties may change with a higher frequency compared to intrinsic properties. Shifting during stop and motion of the vehicle, vibration, and thermal drift may cause changes in the extrinsic properties of the sensors. For example a camera location may shift due to vibration of the vehicle during driving. Extrinsic properties may deviate from their initial configuration while the vehicle is in operation; therefore it may be preferably to perform a recalibration of the extrinsic properties while the vehicle is operating. Recalibration of the extrinsic properties while the vehicle is operating may require computing resources. The computing resources may be onboard or off-board the vehicle.

The recalibration of extrinsic properties may occur with a set time frequency for example, the extrinsic properties may be recalibrated every 1 min, 5 min, 10 min, 20 min, 30 min, 40 min, 50 min, 1 hour, 2 hours, 3 hours, 4 hours, 5 hours, 10 hours, 12 hours, or once every day. Alternatively the recalibration of extrinsic properties may occur with a set distance frequency, for example a recalibration may occur every time the vehicle travels an additional 0.5 mile, 1 mile, 2 miles 3 miles, 4 miles, 5 miles, 10 miles, 15 miles, 20 miles, 25 miles, 30 miles, 35 miles, 40 miles 45 miles, 50 miles, or 100 from an initial starting location. The frequency of the onboard calibration of extrinsic properties may be decided based on the available computing resources, fuel or power requirements, terrain and/or weather conditions. Some conditions may decrease or increase the expected drift in the calibration of the extrinsic sensors, for example, if the vehicle is driving at a low speed on a smooth paved road, there may be less vibration of the body of the vehicle and therefore less drift in the calibration of the extrinsic sensors.

The extrinsic parameters may have an initial calibration. The initial calibration of the extrinsic parameters may describe relative differences between the sensors, e.g., relative locations, rotations, and/or displacements of two or more sensors. The parameters may include changes to sensors over time, such as displacements of sensors between a certain time and a subsequent time. The displacements may include translational displacement and/or rotational displacement. The translational displacement may occur along one or more of the 3 axes. Similarly, the rotational displacement may occur in one or more of the 3 axes. In general, the calibration is achieved by a filtering process; non-limiting examples include various types of Kalman filters.

The calibration of the extrinsic parameters may be adjusted while the vehicle is in operation (e.g. during driving). A method of calibrating the extrinsic parameters may comprise detecting, with aid of a processor, a change in a spatial configuration of two or more sensors relative to one another from the initial spatial configuration to a subsequent spatial configuration. In further embodiments, the method determines the subsequent spatial configuration using filters, such as Kalman filters. Finally, the method may include adjusting data from at least one of the sensors while the vehicle is in motion based on the subsequent spatial configuration.

The vehicle may have one or more on board processors. The processors may be individually or collectively, configured to (i) detect a change in a spatial configuration of one or more sensors relative to one another from the initial spatial configuration to a subsequent spatial configuration, based on the sensor data; (ii) determine the subsequent spatial configuration using a plurality of Kalman filters; and (iii) adjust data, while the vehicle is in motion, from at least one of the sensors based on the subsequent spatial configuration. Alternatively the processor or processors may be off board the vehicle. The vehicle may transmit information about the spatial configuration of a given sensor to an off board processor which may be configured to perform the aforementioned steps (i)-(iii) and transmit the information back to the vehicle.

In some embodiments, multiple cameras can be calibrated relative to one another. Calibrating multiple vision sensors may comprise integrating sensor data. A first camera can capture a first image, and a second camera can capture a second image with different displacement and different orientation. Therefore, the two cameras need to be calibrated, and the calibration can utilize both the first image taken by the first camera and the second image taken by the second camera. The following will disclose the mathematical formulation of calibrations.

In an embodiment, two or more cameras are assembled into a stereo camera system. The calibration of the two or more cameras is as follows. First, each camera takes an image. Then, an identification system selects N features. In terms of mathematical formulation, let $\alpha$ and $\beta$ denote two cameras. The features identified in their images are denoted by vectors $x_i^\alpha = x_i^\alpha, y_i^\alpha)$ and $x_i^\beta = (x_i^\beta, y_i^\beta)$, where $i=1, \ldots, N$. The features $x_i^\alpha$ and $x_i^\beta$ are determined by the coordinate systems of cameras $\alpha$ and $\beta$, respectively. To find a faithful mapping, the features need to be analyzed in a same reference coordinate system $X_i=(X_i, Y_i, Z_i)$. The relationship between features $x_i^\alpha$ and $x_i^\beta$ and the reference coordinate system $X_i$ can be described by projection: $\tilde{x}_i^\alpha \approx P^\alpha \tilde{X}_i$ and $\tilde{x}_i^\beta \approx P^\beta \tilde{X}_i$, where $\tilde{x}_i^\alpha$ and $\tilde{x}_i^\beta$ are features described in the normalized coordinates, namely $\tilde{x}_i^\alpha=(x_i^\alpha, y_i^\alpha, 1)$ and $\tilde{x}_i^\beta=(x_i^\beta, y_i^\beta, 1)$. $P^\alpha$ and $P^\beta$ are projections of cameras $\alpha$ and $\beta$, respectively, and they can be determined by the intrinsic parameters K and extrinsic parameters (e.g., rotation R and translation T): $P^\alpha=K^\alpha[R^\alpha T^\alpha]$ and $P^\beta=K^\beta[R^\beta T^\beta]$. Once the projections $P^\alpha$ and $P^\beta$ are computed and the intrinsic parameters $K^\alpha$ and $K^\beta$ are known, the extrinsic parameters R and T can be computed:

$$R=R^\beta(R^\alpha)^{-1},$$

$$T=T^\beta-R^\beta(R^\alpha)^{-1}T^\alpha$$

When parameters R and T are derived, the calibration is complete.

Typically, the intrinsic parameters $K^\alpha$ and $K^\beta$ do not change; even if they change, the amount of change is small. Therefore, the intrinsic parameters can be calibrated off-line. Namely, in some applications, the intrinsic parameters can be determined before the UAV takes off. In instances, the intrinsic parameters $K^\alpha$ and $K^\beta$ remain static during vehicle motion, so the calibration is to compute optimal solutions for the Pa and PP. An example uses minimizing projection errors to find solutions:

$$\min_{P^\alpha, P^\beta} \sum_{i=1}^N \left[(\tilde{x}_i^\alpha - P^\alpha \tilde{X}_i)^2 + (\tilde{x}_i^\beta - P^\beta \tilde{X}_i)^2\right]$$

This problem is a non-linear optimization problem. Various solution methods can be included in the embodiments. In some applications, solutions are achieved by bundle adjustment method. In the bundle adjustment method, projections $P^\alpha$ and $P^\beta$ are given initial values. Using epipolar constraint to derive essential matrix E, followed by a decomposition (e.g., singular value decomposition) that obtains $E=\lfloor T \rfloor_x R$ where $\lfloor T \rfloor_x$ is the skew symmetric matrix of T.

This solution finds a corresponding mapping between these features and the features in another image taken by another camera. In some embodiments, the spatial configuration of two cameras $\alpha$ and $\beta$ forming a stereo camera system arranges one camera on the left hand side and the other on the right hand side.

In some embodiments, the vision sensing system may include one or more monocular cameras. Each monocular camera may comprise a vision sensor. The monocular cameras can be operably coupled to different sides (e.g. front, left, or lateral sides) of a vehicle. In some embodiments, a monocular camera can be mounted to the vehicle via a carrier, that permits the monocular camera to move relative to the vehicle with respect to up to six degrees of freedom. Alternatively, the monocular camera can be directly mounted onto the vehicle, or coupled to a support structure mounted onto the vehicle. In some embodiments, the monocular camera can be an element of a payload of the vehicle. The monocular cameras can be configured to capture image data of the environment proximate to or surrounding the vehicle.

Figure 13:
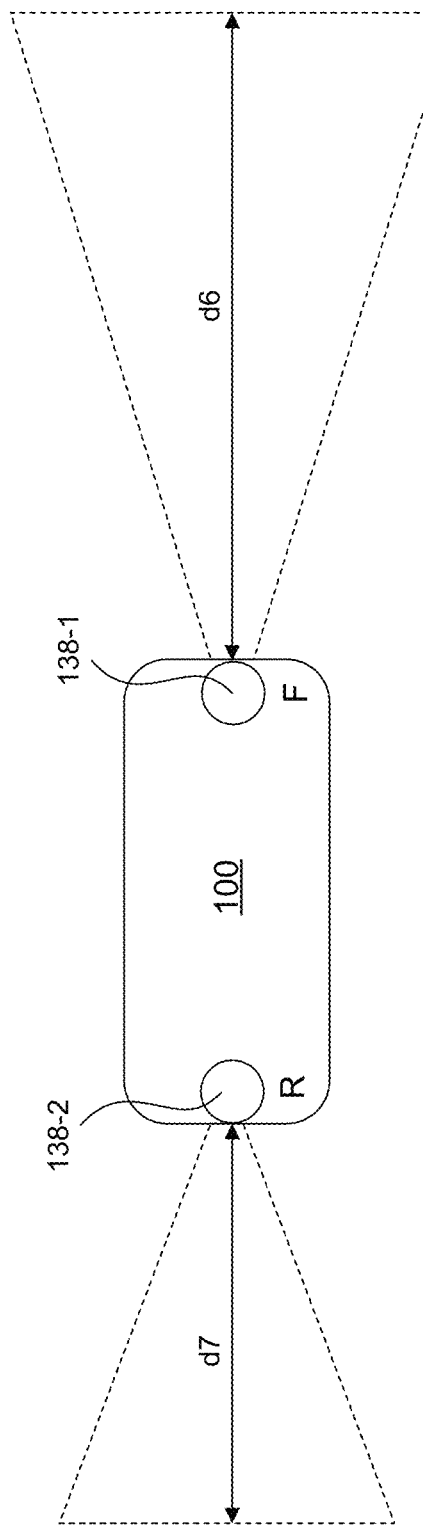
FIG. 13 illustrates a plurality of monocular cameras are supported on different sides of a vehicle, in accordance with some embodiments.

FIG. 13 illustrates a plurality of monocular cameras supported on different sides of a vehicle, in accordance with some embodiments. A first monocular camera 138-1 may be mounted on the front side of the vehicle body, and a second monocular camera 138-2 may be mounted on the rear side of the vehicle body. The first and second monocular cameras may have the same imaging resolution or different imaging resolutions. A visual detection range of the camera may be based in part on the field of view and the imaging resolution of the camera. For example, the image data captured by the first monocular camera can be used to detect objects located up to a maximum distance d6 from the front side of the vehicle body. Similarly, the image data captured by the second monocular camera can be used to detect objects located up to a maximum distance d7 from the front side of the vehicle body. In some embodiments, the distance d6 may be greater than d7 when the first monocular camera has a higher imaging resolution than the second monocular camera. For example, the distance d6 may be greater than d7 by at least 10%, 20%, 30%, 40%, 50%, 60%, 70%, 80%, 90%, 100%, or more than 100%. In some embodiments, the first monocular camera may be configured to capture 4K resolution images/video, and the second monocular camera may be configured to capture 1080p resolution images/video. The image data (4K resolution) captured by the first monocular camera may be used to detect objects located up to a maximum distance of 200 m from the front side of the vehicle body. The image data (1080p resolution) captured by the second monocular camera may be used to detect objects located up to a maximum distance of 100 m from the rear side of the vehicle body.

A target object (e.g., an obstacle) may be identified from 2D images captured by the monocular cameras. In some cases, the target object may be selected based on moving target detection. In those instances, the vehicle and the surrounding environment are assumed to be static/stationary, and the target object to be tracked may be the only moving object in the image. The target object can be identified and selected through background subtraction.

Identification of a target object from a 2D image may be based on feature point recognition. A feature point can be a portion of an image (e.g., an edge, corner, interest point, blob, ridge, etc.) that is uniquely distinguishable from the remaining portions of the image and/or other feature points in the image. Optionally, a feature point may be relatively invariant to transformations of the imaged object (e.g., translation, rotation, scaling) and/or changes in the characteristics of the image (e.g., brightness, exposure). A feature point may be detected in portions of an image that is rich in terms of informational content (e.g., significant 2D texture). A feature point may be detected in portions of an image that are stable under perturbations (e.g., when varying illumination and brightness of an image).

Feature points can be detected using various algorithms (e.g., texture detection algorithm) which may extract one or more feature points from image data. The algorithms may additionally make various calculations regarding the feature points. For example, the algorithms may calculate a total number of feature points, or "feature point number." The algorithms may also calculate a distribution of feature points. For example, the feature points may be widely distributed within an image (e.g., image data) or a subsection of the image. For example, the feature points may be narrowly distributed within an image (e.g., image data) or a subsection of the image. The algorithms may also calculate a quality of the feature points. In some instances, the quality of feature points may be determined or evaluated based on a value calculated by algorithms mentioned herein (e.g., FAST, Corner detector, Harris, etc).

The algorithm may be an edge detection algorithm, a corner detection algorithm, a blob detection algorithm, or a ridge detection algorithm. In some embodiments, the corner detection algorithm may be a "Features from accelerated segment test" (FAST). In some embodiments, the feature detector may extract feature points and make calculations regarding feature points using FAST. In some embodiments, the feature detector can be a Canny edge detector, Sobel operator, Harris & Stephens/Plessy/Shi-Tomasi corner detection algorithm, the SUSAN corner detector, Level curve curvature approach, Laplacian of Gaussian, Difference of Gaussians, Determinant of Hessian, MSER, PCBR, or Grey-level blobs, ORB, FREAK, or suitable combinations thereof.

In some embodiments, a feature point may comprise one or more non-salient features. As used herein, non-salient features may refer to non-salient regions or non-distinct (e.g., non-recognizable) objects within an image. Non-salient features may refer to elements within an image that are unlikely to stand out or catch attention of a human observer. Examples of non-salient features may include individual pixels or groups of pixels that are non-distinct or non-identifiable to a viewer, when viewed outside of the context of their surrounding pixels.

In some alternative embodiments, a feature point may comprise one or more salient features. Salient features may refer to salient regions or distinct (e.g., recognizable) objects within an image. As used herein, salient features may refer to salient regions or distinct (e.g., recognizable) objects within an image. Salient features may refer to elements within an image that are likely to stand out or catch attention of a human observer. A salient feature may have semantic meaning. Salient features may refer to elements that may be identified consistently under computer vision processes. A salient feature may refer to animate objects, inanimate objects, landmarks, marks, logos, obstacles, and the like within an image. A salient feature may be persistently observed under differing conditions. For example, a salient feature may be persistently identified (e.g., by a human observer or by computer programs) in images acquired from different points of view, during different times of the day, under different lighting conditions, under different weather conditions, under different image acquisition settings (e.g., different gain, exposure, etc), and the like. For example, salient features may include humans, animals, faces, bodies, structures, buildings, vehicles, planes, signs, and the like.

Salient features may be identified or determined using any existing saliency calculating methods. For example, salient features may be identified by contrast based filtering (e.g., color, intensity, orientation, size, motion, depth based, etc), using a spectral residual approach, via frequency-tuned salient region detection, via a binarized normed gradients for objectness estimation, using a context-aware top down approach, by measuring visual saliency by site entropy rate, and the like. For example, salient features may be identified in a saliency map that is generated by subjecting one or more images to contrast based filtering (e.g., color, intensity, orientation, etc). A saliency map may represent areas with feature contrasts. A saliency map may be a predictor where people will look. A saliency map may comprise a spatial heat map representation of features or fixations. For example, in a saliency map, salient regions may have a higher luminance contrast, color contrast, edge content, intensities, etc than non-salient regions. In some embodiments, salient features may be identified using object recognition algorithms (e.g., feature based methods, appearance based methods, etc). Optionally, one or more objects or types of patterns, objects, figures, colors, logos, outlines, etc may be pre-stored as possible salient features. An image may be analyzed to identify salient features that are pre-stored (e.g., an object or types of objects). The pre-stored salient features may be updated. Alternatively, salient features may not need to be pre-stored. Salient features may be recognized on a real time basis independent to pre-stored information.

Figure 14:
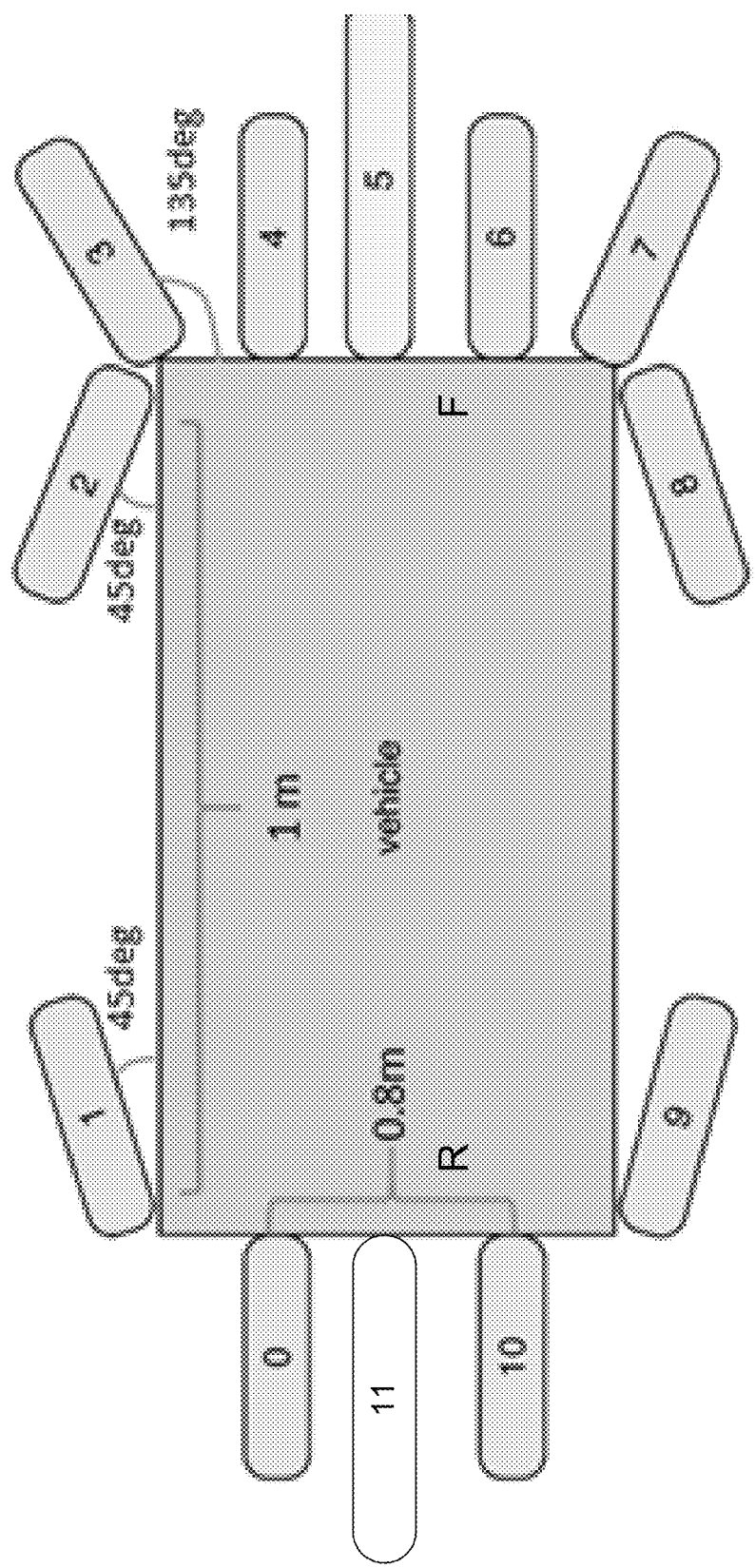
FIG. 14 illustrates a vision sensing system comprising a plurality of binocular cameras and at least one monocular camera, in accordance with some embodiments.

FIG. 14 illustrates a vision sensing system comprising a plurality of binocular cameras and at least one monocular camera, in accordance with some embodiments. A plurality of vision sensors #1, 2, 3, 4, 6, 7, 8, 9 and 10 are supported on different sides (e.g. front, rear and lateral sides) of the vehicle body. The vision sensors may have a same orientation or different orientations relative to the side of the vehicle to which they are mounted. For example, vision sensors #1, 2, 8 and 9 may be oriented at a predetermined angle (e.g. about 45 degrees) relative to the left and right sides of the vehicle body. Additionally or optionally, vision sensors #3 and 7 may be oriented at another predetermined angle (e.g. about 135 degrees) relative to the front side of the vehicle body. In some embodiments, the vision sensors may be rigidly coupled to the vehicle in a preset orientation. In other embodiments, the vision sensors may be capable of rotating about a vertical axis to change their orientations as described elsewhere herein. The change in orientations (optical axes) of the vision sensors may occur when the vehicle is moving or when the vehicle is stationary.

Each of the above vision sensors can be used collectively with one or more other vision sensors to form one or more binocular cameras. The vision sensors can be combined in different ways to form different binocular cameras for near and long range visual sensing, as described elsewhere herein. Accordingly, a plurality of binocular cameras can be configured and used to detect objects located at various distances from multiple sides of the vehicle.

In some embodiments, a binocular camera B1 can be formed by collectively utilizing vision sensors #1 and #3. Similarly, a binocular camera B2 can be formed by collectively utilizing vision sensors #1 and #2. Accordingly, a plurality of binocular cameras may be provided on different sides of the vehicle by combining the vision sensors in different configurations, as shown in the following table.

| Vehicle body side | Binocular camera | Visual detection range | Combination of vision sensors |
|---|---|---|---|
| Left | B1 | Far | #1 and #3 |
|  | B2 | Intermediate | #1 and #2 |
|  | B3 | Near | #2 and #3 |
| Right | B4 | Far | #7 and #9 |
|  | B5 | Intermediate | #8 and #9 |
|  | B6 | Near | #7 and #8 |
| Front | B7 | Far | #3 and #7 |
|  | B8 | Intermediate | #3 and #6 |
|  | B9 | Intermediate | #4 and #7 |
|  | B10 | Near | #3 and #4 |
|  | B11 | Near | #4 and #6 |
|  | B12 | Near | #6 and #7 |
| Rear | B13 | Intermediate | #0 and #10 |

In some embodiments, different sets or combinations of binocular cameras may be selectively activated as the vehicle is moving through different types of environment (e.g., indoor, outdoor, densely-built areas, open areas, different terrains, altitudes, etc.). The binocular cameras may be selectively used or activated depending on the type of environment in which the vehicle is operating. For example, when the vehicle is moving through an environment that has a high object density (e.g., in a densely populated city), binocular cameras having near and/or intermediate sensing ranges may be selectively activated. Since surrounding objects are likely to be closer to the vehicle, there may not be a need to activate binocular cameras that have far sensing ranges in such an environment.

Conversely, when the vehicle is moving through an environment that has a low object density (e.g., in a sparsely populated city or open terrain), binocular cameras having far and/or intermediate sensing ranges may be selectively activated. Since surrounding objects are likely to be further away from the vehicle in such an environment, there may not be a need to activate binocular cameras that have near sensing ranges in such an environment.

In addition to the binocular cameras, the vision sensing system may also comprise a forward-facing monocular camera #5 mounted on the front side of the vehicle, and rearward-facing monocular camera #11 mounted on the rear side of the vehicle. The monocular cameras may be similar those described in FIG. 13. For example, the forward-facing monocular camera #5 may have a higher imaging resolution (4K) and the rearward-facing monocular camera #11 may have a lower imaging resolution (1080p). The 4K image data can be used to detect objects that lie within a maximum predetermined distance (e.g. 200 m) from the front side of the vehicle. The 1080p image data can be used to detect objects that lie within another maximum predetermined distance (e.g. 100 m) from the rear side of the vehicle. Accordingly, the forward-facing monocular camera #5 can be used for monitoring the environment in front of the vehicle, and the rearward-facing monocular camera #11 can be used for monitoring the environment behind the vehicle. The 4K and 1080p image data can be polychromatic (e.g., RGB, CMYK, HSV) or monochromatic (e.g., grayscale, black-and-white, sepia). In some embodiments, one or more of the monocular cameras (e.g., forward-facing monocular camera) can be configured to capture color image data. Color images contain more information compared to monochromatic images. For example, different colors can aid in detecting the type and physical nature of objects (e.g., children, toy dolls, statues, types of animals, color of the animals, etc.). Objects such as pedestrians, other vehicles, man-made structures and obstacles can be detected by processing the image data using one or more visual detection algorithms as described elsewhere herein. In some embodiments, the color image data may be processed using one or more processors implementing an Artificial Neural Network (ANN), which can be trained to more accurately identify the nature of objects progressively over time, determine whether the objects pose a potential danger and whether human lives (either the driver's or people outside of the vehicle are in danger), etc.

Figure 15:
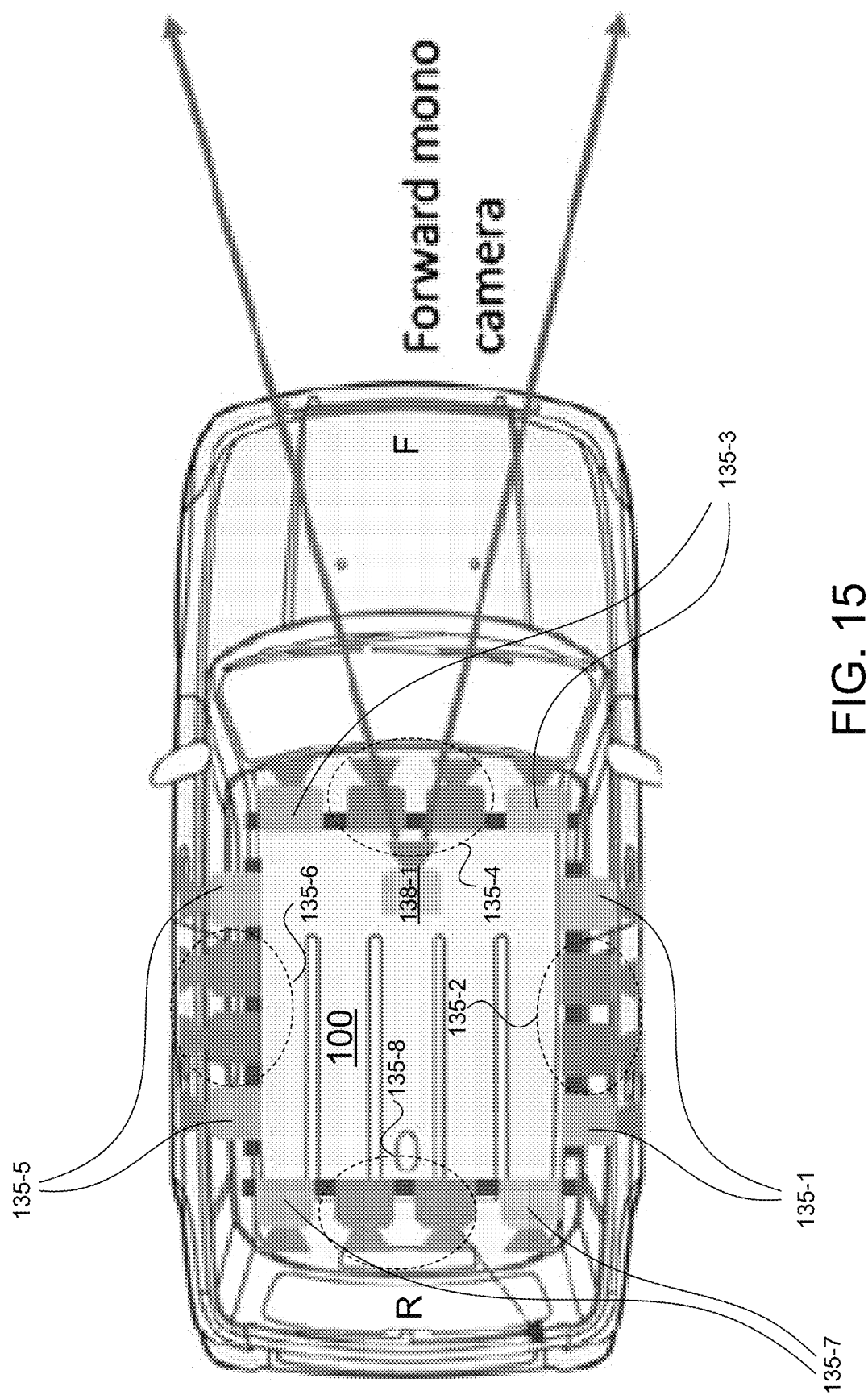
FIG. 15 illustrates a vision sensing system on a vehicle in accordance with some embodiments.

FIG. 15 illustrates a vision sensing system on a vehicle in accordance with some embodiments. The system of FIG. 15 is similar to that of FIG. 10 except it further includes a forward-facing monocular camera 138-1 mounted on a top portion (e.g. hood) of the vehicle, along with the plurality of near and far sensing binocular cameras located on different sides (e.g., front, rear and lateral sides of the hood) of the vehicle.

In some embodiments, the sensing assembly may include a radar system. The radar system may be a wave imaging radar system. The radar system may be configured to operate at millimeter wavelengths (e.g. 1 cm to 1 mm), at frequencies ranging from 30 GHz to 300 GHz. Electromagnetic waves at millimeter wavelengths are not completely attenuated by substantial distances of fog or smoke, compared to light in the visible spectrum. Also, electromagnetic waves at millimeter wavelengths can penetrate clothing and significant thickness of materials such as dry wood and wallboard. Accordingly, the radar system can improve navigation and visibility through environments with thick fog or smoke. The radar system has a stable detection performance that is independent of color or texture of the object surface, and has excellent object penetration ability (e.g. ability to penetrate through rain, fog, smoke and certain types of materials). The detection accuracy of the radar system is not significantly affected by the surrounding environment and by weather conditions. The radar system may have a detection range of about 100 m, 110 m, 120 m, 130 m, 140 m, 150 m, 160 m, 170 m, 180 m or more, and is capable of operating in darkness. The radar system can be used to monitor a wide environmental area and can be used in conjunction with lidar system and vision sensing system for sensing the surrounding of the vehicle.

Figure 16:
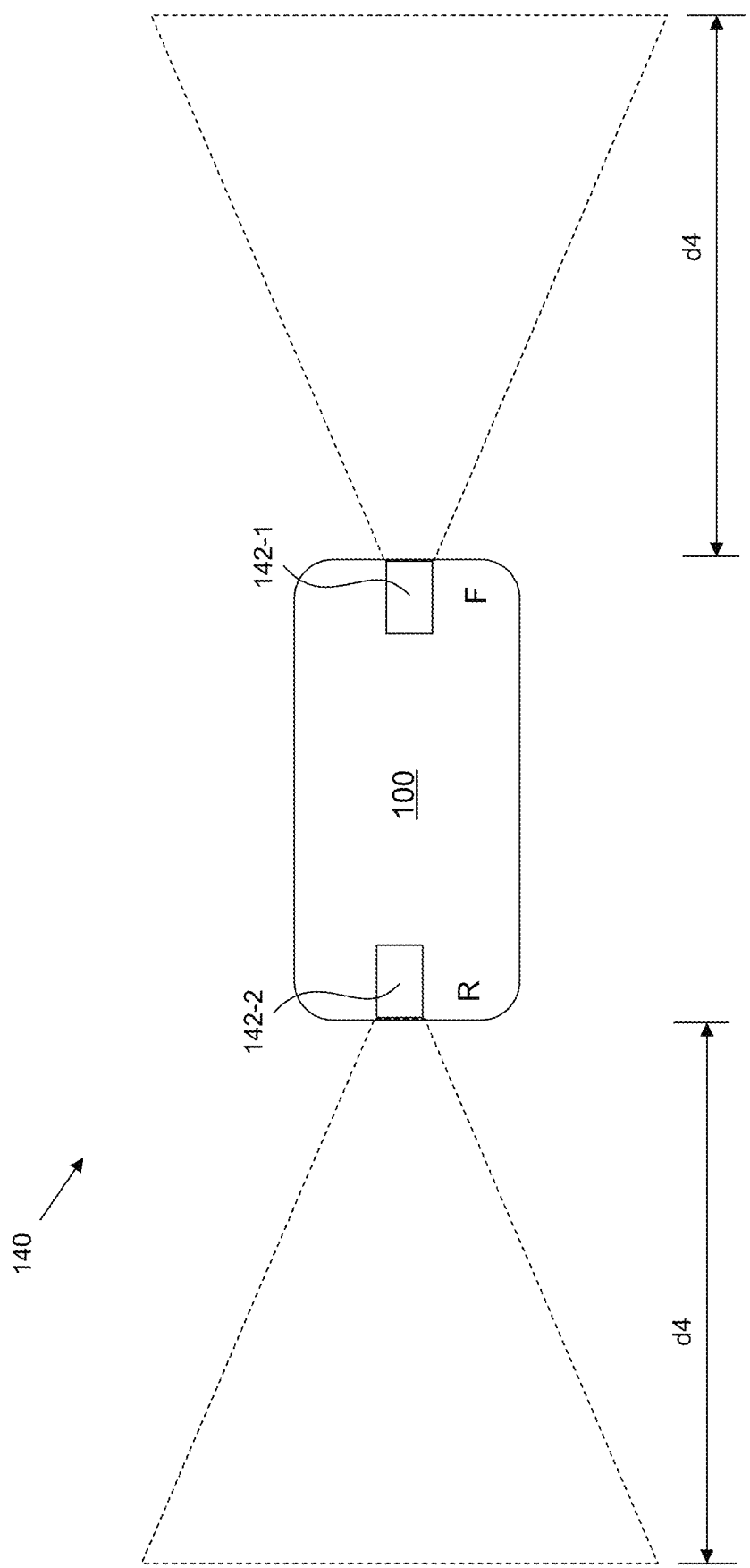
FIG. 16 illustrates a radar system being arranged on a vehicle in accordance with some embodiments.

FIG. 16 illustrates a radar system being arranged on a vehicle in accordance with some embodiments. The radar system may include one or more millimeter-wave radar units. For example, the radar system may include a first radar unit 142-1 supported on a front side of the vehicle and configured to detect objects in front of the vehicle. Additionally or optionally, the radar system may include a second radar unit 142-2 supported on a rear side of the vehicle to detect objects behind the vehicle.

In some embodiments, the radar system may be configured to modulate a millimeter wave signal with a two or more lower frequency signals (known as frequency shift keying or FSK) or with a linearly changing (ramping up or ramping down in frequency) lower frequency signals (known as linear frequency modulated LFM). The radar system can measure the distance to a target and the relative velocity of the target simultaneously. The radar system may aid in autonomous vehicle control and vehicle collision avoidance.

The radar system may include one or more circuits that transmit and receive millimeter waves. The radar system may be supported on a portion of the vehicle (e.g. behind a portion of the vehicle's hood) that is configured to be transparent to millimeter-wave energy.

The radar system may include an antenna, a millimeter-wave unit, and a signal processing unit. The antenna may be a planar antenna which is advantageous for reducing size and thickness. For example, the antenna may be about 10 cm in diameter, and can be supported behind a vehicle's grill or fender, or designed into the front portion of the vehicle.

The millimeter-wave unit may include a monolithic microwave integrated circuit based on high electron mobility transistors (HEMTs) used in the transmission/reception section. In some embodiments, the millimeter-wave unit may include a voltage-controlled oscillator (VCO) that employs a microwave IC (MIC). The VCO may be configured to receive a triangular modulation wave to produce an FM-modulated 30-GHz signal. The millimeter-wave unit may also include a transmission module for increasing the frequency of the signal, and amplifying the signal to a predetermined level for transmission. The reception module is configured to capture and amplify the signal reflected from a target.

The signal processing unit may be configured to process the amplified/reflected signals from the reception module. The signal processing unit may be configured to detect the difference between the relative velocity obtained through range changes and the measured relative velocity. When the difference exceeds a predetermined threshold, the signal processing unit may consider the target an unwanted reflection and discard the data. The signal processing unit may also monitor the continuity of the range and velocity data.

When the signal processing unit detects continuity for a target a plurality of times, the signal processing unit may then determine that the radar system has detected a true target and thus stores the data. The continuity of the target may be judged by comparing to that of a previous target. In some embodiments, the range and relative velocity obtained by the signal processing unit may be displayed on a separate display unit as target data.

Figure 19:
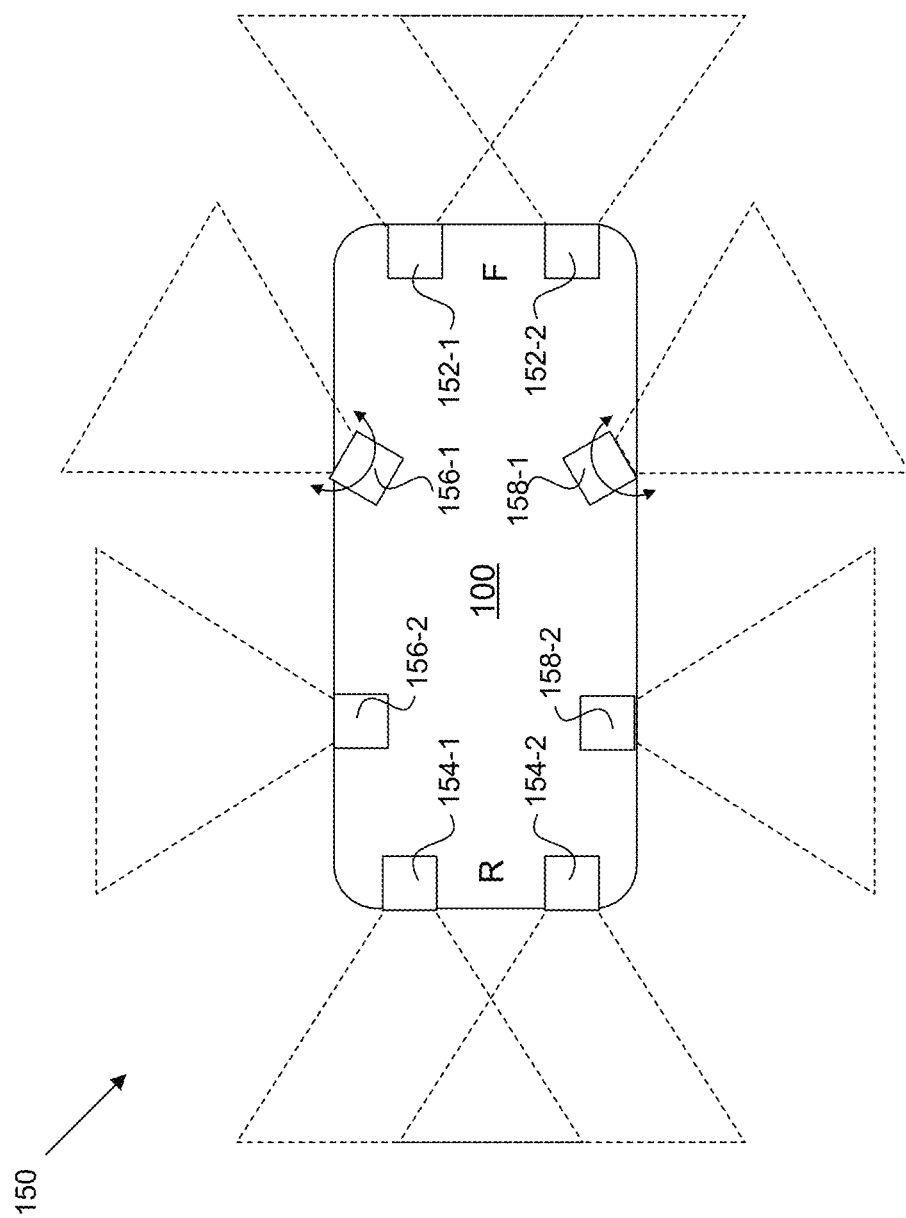
FIG. 19 illustrates an ultrasonic sensing system being arranged on a vehicle in accordance with some embodiments.

In some embodiments, the sensing assembly may include an ultrasonic sensing system for proximity sensing. FIG. 19 illustrates an ultrasonic sensing system being arranged on a vehicle in accordance with some embodiments. The ultrasonic sensing system 150 may include a plurality of ultrasonic sensors supported on different sides (e.g. front, rear, and lateral sides) of the vehicle body. The ultrasonic sensors may include, for example a first set of ultrasonic sensors 152-1 and 152-2 located at or near the front side of the vehicle, a second set of ultrasonic sensors 154-1 and 154-2 located at or near the rear side of the vehicle, a third set of ultrasonic sensors 156-1 and 156-2 located at or near the left side of the vehicle, and a fourth set of ultrasonic sensors 158-1 and 158-2 located at or near the right side of the vehicle. The ultrasonic sensors may be located near or adjacent to the vision sensors. The ultrasonic sensors can be situated on a portion of the vehicle that is different from the portions used to carry the vision sensors. The ultrasonic data may be used to supplement the visual correlation of image data to identify invalid pixel points. For example, image data captured by binocular cameras in the vision sensing system may not be useful for detecting the position of a white-colored wall, or a glass wall. In contrast, ultrasonic data collected by the ultrasonic sensing system 150 can be used to detect the position/distance of objects having no obvious texture or that are transparent. Ultrasonic sensors may be configured to detect objects independent of visual characteristics, such as color, reflectivity, or texture. Ultrasonic sensors may be capable of detecting objects that are not capable of being detected by vision sensors.

Similar to the radar system, the ultrasonic sensors can operate reliably in harsh environments, such as in dirt, dust, or fog environments. The ultrasonic sensors are capable of detecting small targets or objects. Advantages of ultrasonic sensors include compact form factor and easy installation. The ultrasonic sensors can be used to detect proximal areas to the vehicle that do not fall within the sensing scope of the other sensing systems (i.e. "blind" spots).

In some embodiments, the ultrasonic sensing system 150 may include at least two ultrasonic sensors provided at the front, rear, left and right sides of the vehicle. An effective detection range of the ultrasonic sensors may be a distance up to 1 m, 2 m, 3 m, 4 m, 5 m, 6 m, 7 m, 8 m or more from each side of the vehicle. The ultrasonic sensors may be operably coupled to the vehicle via one or more carriers, that permit the ultrasonic sensors to move relative to the vehicle with respect to up to six degrees of freedom. For example, an ultrasonic sensor may be configured to tilt (e.g. pitch upwards, downwards or sideways) by a predetermined amount, thereby changing the direction and scope of scan relative to the vehicle. In some embodiments, the carriers may include one or more motors configured to rotate and/or translate the ultrasonic sensors in one or more degrees of freedom. The ultrasonic sensors can be actuated and controlled to scan different areas proximal to the vehicle so as to avoid any "blind" spots. In some embodiments, a plurality of carriers may be configured to control the positions of the ultrasonic sensors, for example by rotating and/or translating the ultrasonic sensors simultaneously or sequentially, to sense an entire area proximal to the different sides of the vehicle. In some alternative embodiments (not shown), the ultrasonic sensors may be rigidly coupled to the sides of the vehicle.

Figure 17:
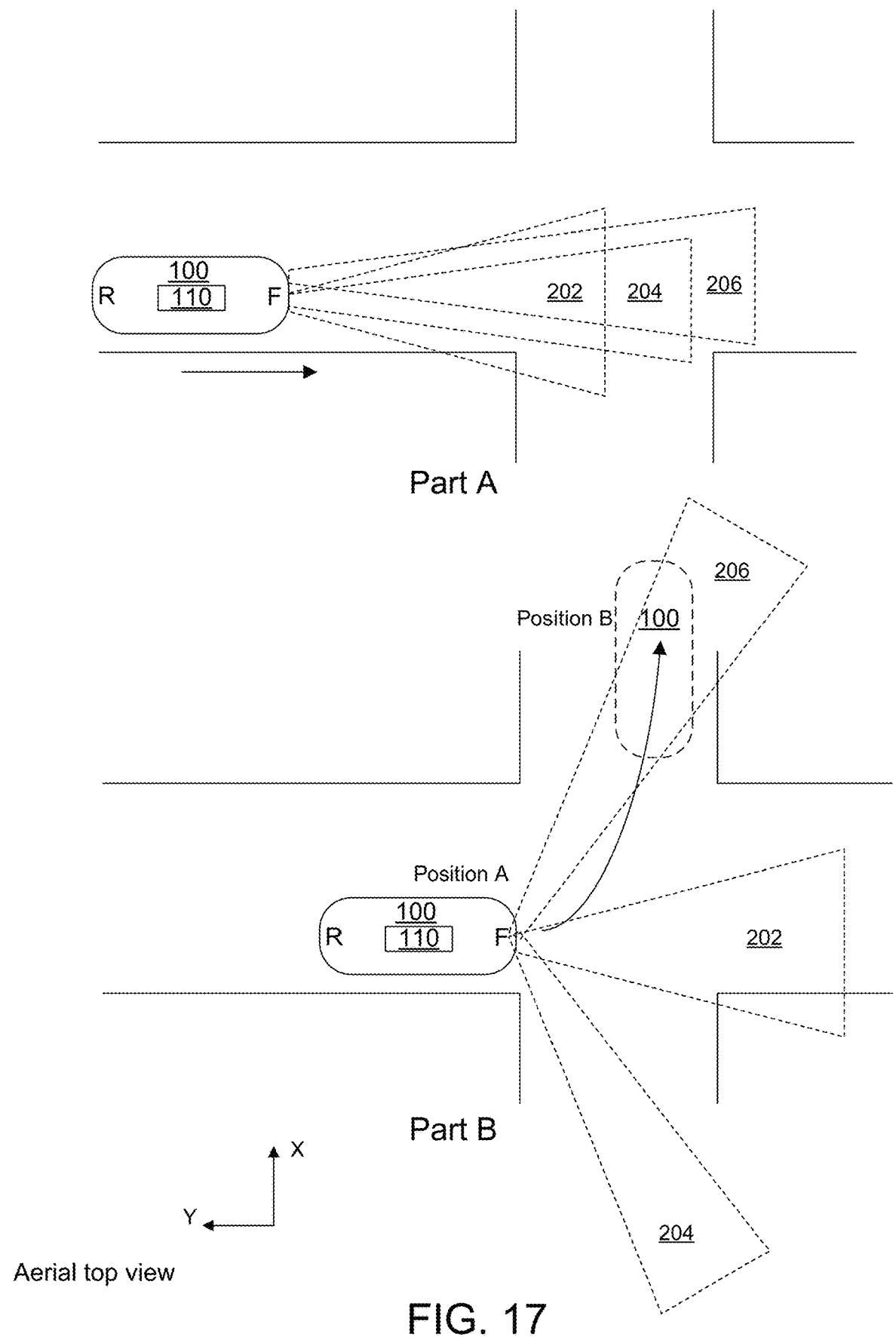
FIG. 17 illustrates how one or more sensors may be configured to change orientation based on a vehicle's motion or predicted motion in accordance with some embodiments.

FIG. 17 illustrates how one or more sensors may be configured to change orientation based on a vehicle's motion or predicted motion in accordance with some embodiments. In some embodiments, a vehicle 100 may comprise a sensing assembly 110. The sensing assembly may comprise one or more sensors having corresponding detectable ranges 202, 204, 206. The one or more sensors of the sensing assembly may be of the same type of sensors or different types of sensors.

In one example, when a vehicle is moving in a forward direction, one or more of the sensors of the sensing assembly may be oriented in a forward facing direction, as illustrated in Part A. The one or more sensors of the sensing assembly may be oriented in a direction of travel. In some embodiments, if the vehicle is traveling backwards, the one or more sensors may be oriented in a rear facing direction or another direction. In some embodiments, the one or more sensors may remain facing in a forward direction when the vehicle is traveling directly backwards. The vehicle may rely on one or more other sensors when traveling backwards. When the vehicle is turning to the right or left, the one or more sensors may remain facing forward, or may be re-oriented to face the direction of the turn.

One or more sensors of a sensing assembly may be configured to change its orientation based on the vehicle's motion or predicted motion path. In one example, one or more sensors that face forward when the vehicle is moving in a forward direction may be configured to change its orientation based on the vehicle's motion or predicted motion path. Optionally, all of the sensors that face forward when the vehicle is moving in a forward direction may be configured to change its orientation based on the vehicle's motion or predicted motion path. Alternatively, at least one of the sensors may remain forward facing even when the vehicle turns, while one or more other sensors may change its orientation based on the vehicle's motion or predicted motion path.

The orientation of the one or more sensors may change based on the vehicle's motion or predicted motion path. The orientation may change based on the vehicle turning or being predicted to turn. The orientation may change based on the vehicle location. For instance, the orientation may change because the intersection is recognized, regardless of whether the vehicle will go straight or turn. The orientation may change in real-time. For instance, the orientation changing in real-time may comprise the orientation starting to change within 15 seconds, 10 seconds, 5 seconds, 3 seconds, 2 seconds, 1 second, 0.5 seconds, 0.3 seconds, 0.1 seconds, 0.05 seconds, 0.01 seconds, 0.005 seconds, or 0.001 seconds of a recognition of a condition that triggers the change in orientation.

The orientation of the one or more sensors may change to scan for obstacles prior to or as the vehicle is undergoing a condition that triggers the change in orientation. For instance, the condition that triggers the change in orientation may be the vehicle changing its motion or predicted motion path. A change in direction may constitute a change in motion. A predicted change in direction may constitute a predicted change in motion path. In another instance, the condition that triggers the change in orientation may be the vehicle approaching or passing through an intersection. The condition that triggers the change in orientation may be the vehicle approaching or entering a traffic circle, merging onto a road, changing lanes, approaching a pedestrian cross-walk, parking, entering a structure, or other maneuvers by the vehicle.

A detected change in motion or predicted change in motion may be based on a vehicle input, data collected by sensors, and/or a map of an environment that the vehicle is located.

An example of a vehicle input may comprise a pre-planned driving route. The pre-planned driving route may have a start point and a destination. The vehicle may be autonomously driving along the driving route. Alternatively, a driver may driving along the driving route and/or manually assisting the vehicle that may be semi-autonomously driving along the driving route. The driver may be manually driving along the driving route and the vehicle may provide driving assistance as the driver drives along the route. Another example of a vehicle input may comprise activation of a turn signal of the vehicle. For instance, if a driver or the vehicle autonomously turns the turn signal on, a determination may be made that the vehicle is about to turn or maneuver in the direction indicated by the turn signal. A vehicle input may comprise a rotation of a steering wheel of the vehicle. The rotation of the steering wheel may be initiated by a driver, or autonomously by the vehicle. The direction that the steering wheel is rotated may be indicative of the direction that the vehicle is starting to turn. The degree that the steering wheel is rotated may be indicative of the arc length or sharpness of turn. The vehicle input may comprise a change in direction of one or more driving wheels of the vehicle. The driving wheels may or may change direction in response to a rotation of the steering wheel. The driving wheels may change direction without requiring rotation of the steering wheel. The direction that the driving wheel is rotated may be indicative of the direction that the vehicle is starting to turn. The degree that the driving wheel is rotated may be indicative of the arc length or sharpness of turn.

Data collected by sensors may also be used to detect a condition that may trigger orientation of one or more sensors. For example, one or more sensors on-board the vehicle may be used to detect and/or recognize that the vehicle is approaching an intersection. Data about the intersection (e.g., number of roads intersecting, level of traffic, direction of roads) may be collected with aid of the sensors. Other features, such as traffic lights, traffic circles, merges, lanes splitting off, pedestrian cross-walks, barricades, construction, signs for re-direction, ramps, debris, potential obstacles, or other features may be detected with aid of one or more sensors. In another example, the one or more sensors on-board the vehicle may be used to detect and/or recognize the change of orientation in the road. For example, the road may curve to the right or left. The sensors may be used to detect the direction and/or degree of curve.

A map of the environment within which the vehicle is located may also be used to detect a condition that may trigger orientation of one or more sensors. For example, the location of the vehicle on the map may be determined. The map may include positioning of roads and/or updated information about particular areas (e.g., whether there is an accident, construction, broken traffic light, etc.). For example, the map may be used to detect and/or recognize that the vehicle is approaching an intersection. Data about the intersection (e.g., number of roads intersecting, level of traffic, direction of roads) may be known on the map. Other features, such as traffic lights, traffic circles, merges, lanes splitting off, pedestrian cross-walks, barricades, construction, or other features may be on the map. In another example, the map may be used to predict the change of orientation in the road. For example, the road may curve to the right or left. The map may have information about the direction and/or degree of curve.

In some embodiments, the degree of the change in orientation may depend on the motion or predicted motion of the vehicle. For instance, the degree of change in orientation may depend on the angle at which the vehicle changes orientation. In one example, the degree of change of orientation may be greater when there is a greater predicted change in orientation. For example, a sensor may turn further to the left when the vehicle is making a steep turn to the left, as compared to a smaller turn to the left when the vehicle path is curving a little to the left. There may be a linear relationship, exponential relationship, or any other type of relationship between the degree that the sensor turns and that the vehicle turns or is predicted to turn. The angle of rotation of the sensor may be adjusted based on a turn angle or arc length of the vehicle's motion or predicted motion path.

The speed at which the sensor changes orientation may depend on the motion or predicted motion of the vehicle. For instance, the speed of change in orientation may depend on the angle at which the vehicle changes orientation, or the sharpness of the turn. In one example, the speed of change of orientation may be greater when there is a greater predicted change in orientation. For example, a sensor may turn to the left faster when the vehicle is making a steep turn to the left, as compared to a slower turn to the left when the vehicle path is curving a little to the left. The sensor may turn faster if there is greater suddenness or sharpness to the turn. The sensor may turn faster when the curvature of the turn is higher. There may be a linear relationship, exponential relationship, or any other type of relationship between the speed that the sensor turns and that the vehicle turns or is predicted to turn. The velocity of rotation of the sensor may be adjusted based on a turn angle or arc length of the vehicle's motion or predicted motion path. Alternatively, the speed at which the sensor changes may be constant or predetermined.

In some embodiments, the degree and/or speed of change may be predetermined. A sensor may be configured to change its orientation by rotating a predetermined amount based on the vehicle's motion or predicted motion path.

The sensors may change orientation by rotating about a yaw axis. The yaw of the sensors may be altered. The sensors may rotate to the left or right when the vehicle is turning to the left or right, or is predicted to turn left or right. In some embodiments, the sensors may change orientation by rotating about a pitch axis. The sensors may angle up or down as the vehicle is traveling up or down a hill, or as the predicted path change vertical orientation. The sensors may change orientation by rotating about a combination of the yaw and pitch axis. Alternatively or in addition, sensors may or may not rotate about a roll axis.

In some instances, at least one of the sensors may be configured to rotate clockwise (e.g., about a yaw axis) prior to, or as the vehicle changes its direction to the right, so as to detect a region to the front-right of the vehicle. In another instance, at least one of the sensors may be configured to rotate counterclockwise (e.g., about a yaw axis) prior to, or as the vehicle changes its direction to the left, so as to detect a region to the front-left of the vehicle.

Part A illustrates a vehicle 100 traveling in a forward direction with a plurality of sensors facing forward. The detectable ranges 202, 204, 206 of the forward-facing sensors may be provided in front of the vehicle. Additional sensors having various detectable ranges may be provided, as described elsewhere herein.

Part B illustrates the vehicle approaching an intersection. The orientation at of at least one of the sensors may change when approaching or upon reaching the intersection. In some embodiments, a first sensor may still face forward, so that a detection range 202 is in front of the vehicle. A second sensor may turn towards the right, so that the detection range 204 is to the right-front of the vehicle. A third sensor may turn towards the left, so that the detection range 206 is to the left-front of the vehicle. Such a change in orientation may be made prior to any determination on which direction the vehicle will go at the intersection. Such a change in orientation can be made after and based on a determination or detection of which direction the vehicle will go at the intersection. In one example, it may be known the vehicle is turning or will turn to the left (e.g., moving from Position A to Position B). The sensors may change orientation in response to knowing the vehicle will turn to the left. The forward facing sensor may be useful for detecting conditions in front of the vehicle. The right-facing sensor may be useful for detecting oncoming traffic or other conditions to the right of the vehicle when the vehicle makes the left turn. The left-facing sensor may be useful for detecting conditions to the left of the vehicle, such as oncoming traffic from the left, potential obstacles, or other conditions. In some embodiments, the sensor remaining to the front, turning to the left, and turning to the right, may all be the same type of sensor. The sensors may have the same detectable range sizes (e.g., ranges, widths, and/or shapes). Alternatively, they may have different detectable ranges (e.g., ranges, widths, and/or shapes). The sensor remaining to the front, turning to the left, and turning to the right may comprise two or more different types of sensors. The same or different types of sensors may be any sensor type as described elsewhere herein.

In some embodiments, one or more of the sensors may change orientation to face the direction that the vehicle is turning. In one example, all of the sensors may change orientation to face the direction that the vehicle is turning. In some instances, one of the sensors may remain facing to the front while the remaining sensors may change orientation to face the direction that the vehicle is turning. In another instance, one or more sensors may change orientation to face a different direction from the direction the vehicle is turning. For instance, if the vehicle is turning to the left, one or more sensors may turn to face to the right, or if the vehicle is turning to the right, one or more of the sensor may turn to face to the left. This may be in addition to, or as an alternative to one or more of the sensors facing forward and/or in the direction that the vehicle is turning. As previously described, the sensors that remain facing in the same orientation or change orientation may be of the same sensor type or different sensors types.

In some embodiments, the sensors may re-adjust orientation to face the various number of roads presented before the vehicle. For instance, if a vehicle comes to a four-way intersection, the sensors may face in three different directions, to be oriented towards each of the other three directions that the vehicle may travel. If the vehicle comes to a three-way intersection, the sensors may face in two different directions. If the vehicle is merely following a path that is curving with no offshoots or directions that the vehicle might turn, the sensors may be oriented in front of the vehicle, or may be angled to follow the road that the vehicle is traversing.

Figure 18:
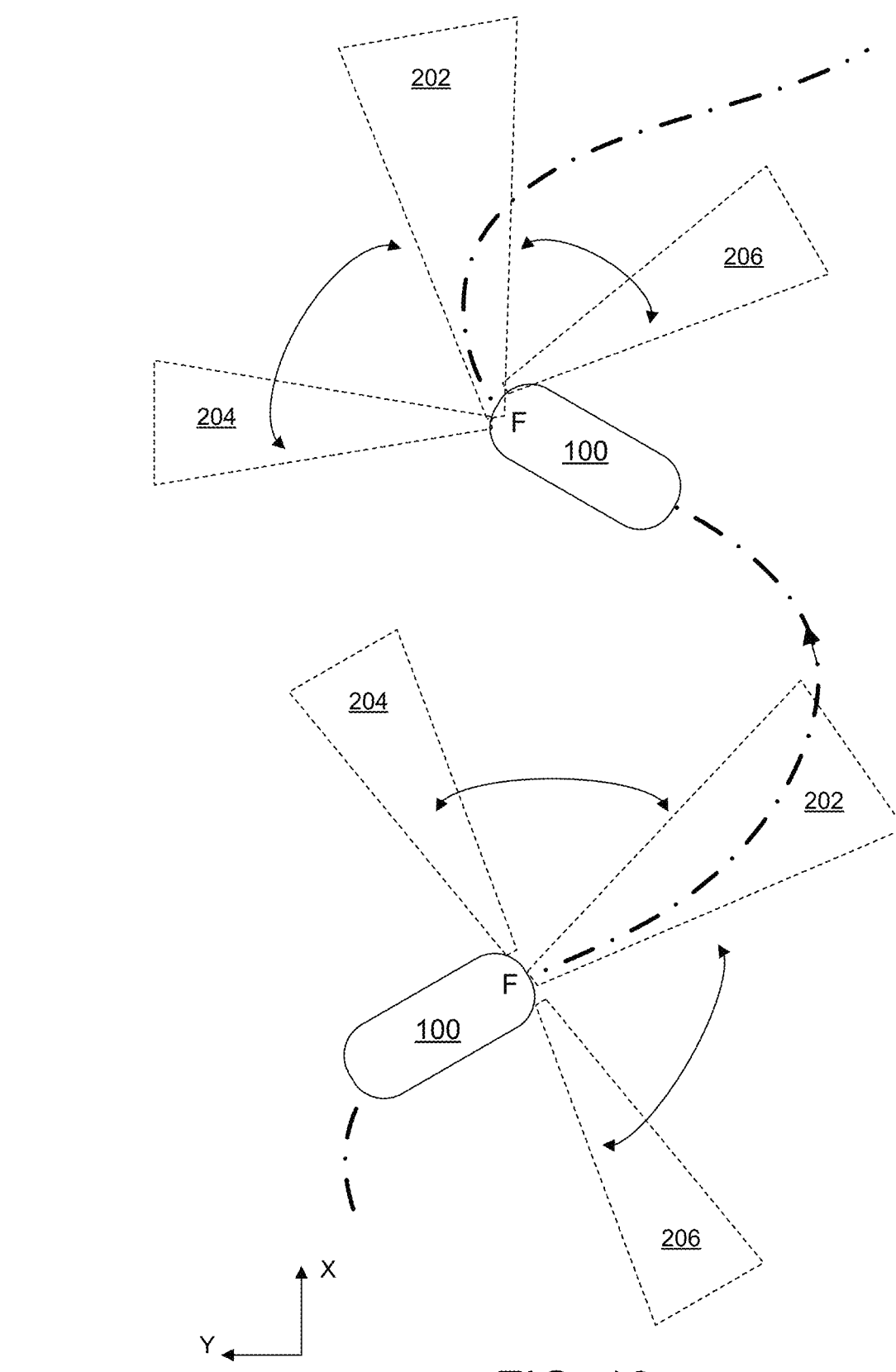
FIG. 18 provides an additional illustration of how one or more sensors may be configured to change based on a vehicle's motion or predicted motion in accordance with embodiments.

FIG. 18 provides an additional illustration of how one or more sensors may be configured to change based on a vehicle's motion or predicted motion in accordance with embodiments. A vehicle 100 may be traveling along a predicted path. One or more sensors of a sensing assembly on-board the vehicle may have various detectable ranges 202, 204, 206. The sensors may be of the same type or of different types. The sensors may have the same detectable ranges (e.g., detectable range, width, and/or shape) or may have different detectable ranges.

One or more sensors may have an orientation relative to the vehicle based on a vehicle's motion or predicted motion of travel. For example, if the vehicle is predicted to move forward, a sensor may remain forward facing with a detectable range 202 in front of the vehicle. If the vehicle is predicted to turn towards the right, the sensor may turn to the right with a detectable range 202 to the right and front of the vehicle. One or more of the sensors may face a direction of travel (or predicted direction of travel) of the vehicle.

In some embodiments, one or more sensors may face at a different direction from the direction of travel. The one or more sensors may reorient to face at a different direction from the direction of travel. For example, one or more sensors may face toward the right to have a detectable range 204 to the right of the direction of travel, and/or one or more sensors may face toward the left to have a detectable range 206 to the left of the direction of travel. These sensors may remain facing at different directions from the direction of travel or may at times align with the direction of travel.

The one or more sensors may orient themselves to face the various different directions. The sensors may start in a forward direction and orient themselves to the various different directions as needed. The sensors may directly move from one desired orientation to another.

In some embodiments, the sensors may scan back and forth between different directions. The sensors may rotate back and forth at a predetermined speed. The sensors may rotate back and forth at a speed depending on direction of travel or curvature of path. In some instances, a sensor may scan between a forward facing direction and a preset direction to the left or right. In some instances, the sensor may scan between a direction of travel and a preset direction relative to the vehicle or preset degree relative to the direction of travel, to the left or right. In some embodiments, the direction to the left or right of the vehicle may depend on a trigger condition that causes the sensors to scan back and forth.

In addition to changing orientation about the yaw axis, the sensors may be capable of changing orientation about a pitch axis. In some embodiments a predicted path of the vehicle may be for the vehicle to go from downhill to uphill. The pitch of one or more sensors may be altered depending on the predicted vertical road change. For example, when a vehicle is traveling on a flat road, the sensors may have a neutral horizontal position. If the vehicle is cresting a hill, the sensors may angle slightly downwards to capture more of the road in the detectable range. If the vehicle is at, or entering, a trough or valley of the road, the sensors may angle slightly upwards to capture more of the road at the detectable range. Any description herein relating to horizontal change of orientation may also apply to vertical change of orientation. For instance, descriptions relating to change of orientation, speed of orientation, sensor types, as described elsewhere herein apply to vertical orientation as well.

Figure 20:
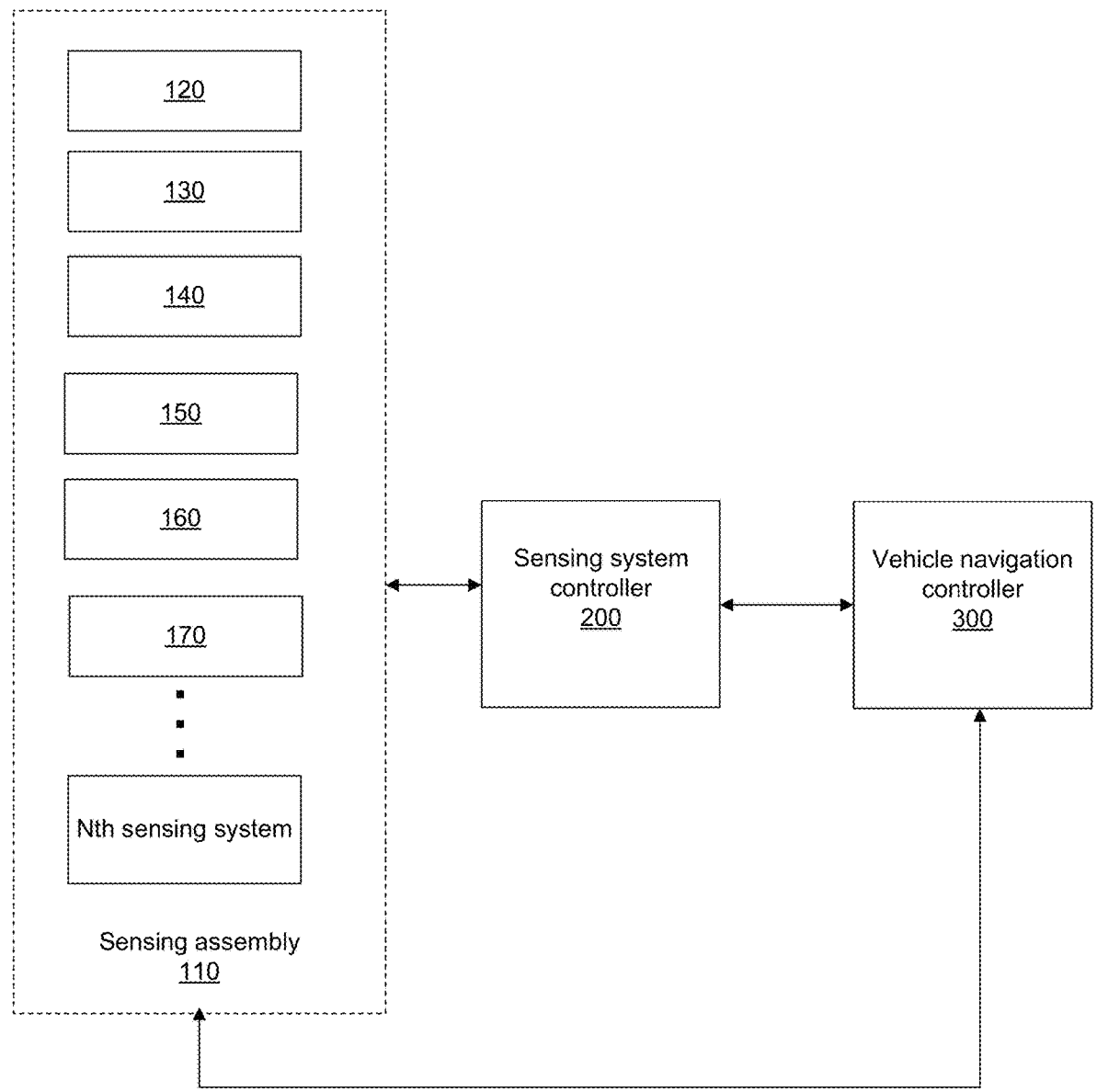
FIG. 20 illustrates a sensing system controller in communication with a sensing assembly of a vehicle, in accordance with some embodiments.

FIG. 20 illustrates a sensing system controller in communication with a sensing assembly of a vehicle, in accordance with some embodiments. A sensing system controller 200 may be operably connected to two or more same or different types of sensors in a sensing assembly 110. For example, the sensing system controller may be in communication with lidar 120, cameras 130, radar 140, ultrasonic sensors 150, GPS 160 and/or odometers 170. In some cases, the sensing system controller may be communication with N different types of sensors, where N can be any integer greater than one. The sensing system controller can comprise one or more processors that are configured to obtain sensing data collected from a plurality of sensors coupled to a vehicle (e.g., vehicle 100).

The sensing system controller can be configured to process the sensing data by fusing two or more sets of data from different sensors. For example, the sensor data from two or more groups of single-channel lidar units and stereo cameras can be fused into a set of RGB-D data. The sensing system controller may analyze the RGB-D data to detect obstacles in the environment, and provide the obstacle information to a vehicle navigation controller 300. The sensing system controller may also include one or more processors for processing (e.g. fusing) data from the forward and/or rear monocular cameras, long range lidar, and/or millimeter wave radar, so as to implement remote object monitoring and obstacle avoidance. The sensing system controller may analyze data from one or more ultrasonic sensors to detect obstacles in an area proximate to the vehicle, that may lie in the "blind" spots of the other sensors. The sensing system controller may also provide data from the vehicle odometer and GPS to the vehicle navigation controller 300 to assist in position, driving and path planning.

The sensor fusion approaches described above can be applied to various types of functionalities, including navigation, object recognition, and obstacle avoidance. In some embodiments, environmental data obtained using sensor fusion results can be used to improve the robustness, safety, and flexibility of operation of the vehicle by providing accurate location information as well as information regarding potential obstructions. The environmental data can be provided to a user (e.g., via remote controller or terminal, mobile device, or other user device) so as to inform the user's manual control of the vehicle. Alternatively or in combination, the environmental data can be used for semi-autonomous or fully autonomous control systems to direct the automated driving of the vehicle.

The obstacles described herein may be substantially stationary (e.g., buildings, plants, structures) or substantially mobile (e.g., human beings, animals, vehicles, or other objects capable of movement). Some obstacles may include a combination of stationary and mobile components (e.g., a windmill). Mobile obstacles or obstacle components may move according to a predetermined or predictable path or pattern. For example, the movement of a car may be relatively predictable (e.g., according to the shape of the road). Alternatively, some mobile obstacles or obstacle components may move along random or otherwise unpredictable trajectories. For example, a living being such as an animal may move in a relatively unpredictable manner. Different types of environments may be associated with different amounts and types of obstacles. For example, a high altitude environment may have few or no obstacles. In contrast, an indoor environment or a low altitude environment may have more obstacles. Some types of low altitude, outdoor environments (e.g., fields and other flat, open spaces) may have fewer obstacles than other types (e.g., urban settings and other highly populated areas, forests). Accordingly, a vehicle described herein operating within an environment with a high obstacle density may be exposed to an increased risk of collisions, near-misses, or other safety incidents. Conversely, vehicle operation within a low obstacle density environment may be relatively safe. Mobile obstacles may pose an increased risk compared to stationary obstacles, as mobile obstacles may collide with or obstruct the vehicle independently of any action taken by the vehicle. The sensor fusion approaches can be used to improve detection of obstacles within the environment in which the vehicle operates.

The vehicle described herein can be configured to move along different motion paths between a plurality of locations. For many real world applications, knowing merely the position and motion of the vehicle may not be sufficient for real-time navigation. For example, the surrounding environment may include obstacles in the path between the vehicle and a target destination. These obstacles may be stationary, capable of movement, or in motion. As such, information about the external environment may be necessary for the vehicle to avoid such obstacles by re-planning its path in real-time. In some embodiments, information about the external environment may be provided in a 3D map based on one or more images captured by cameras and other sensors onboard the vehicle. A motion path for the vehicle can be generated by using the 3D map.

The embodiments disclosed herein can be used to perform obstacle avoidance maneuvers in order to prevent a vehicle from colliding with environmental objects. In some embodiments, obstacle detection and avoidance can be automated, thereby improving safety and reducing user responsibility for avoiding collisions. This approach may be advantageous for inexperienced operators as well as in situations where the user cannot readily perceive the presence of obstacles near the vehicle. Additionally, the implementation of automated obstacle avoidance can reduce the safety risks associated with semi-autonomous or fully autonomous vehicle navigation. Furthermore, the multi-sensor fusion techniques described herein can be used to generate more accurate environmental representations, thus improving the reliability of such automated collision prevention mechanisms.

Figure 21:
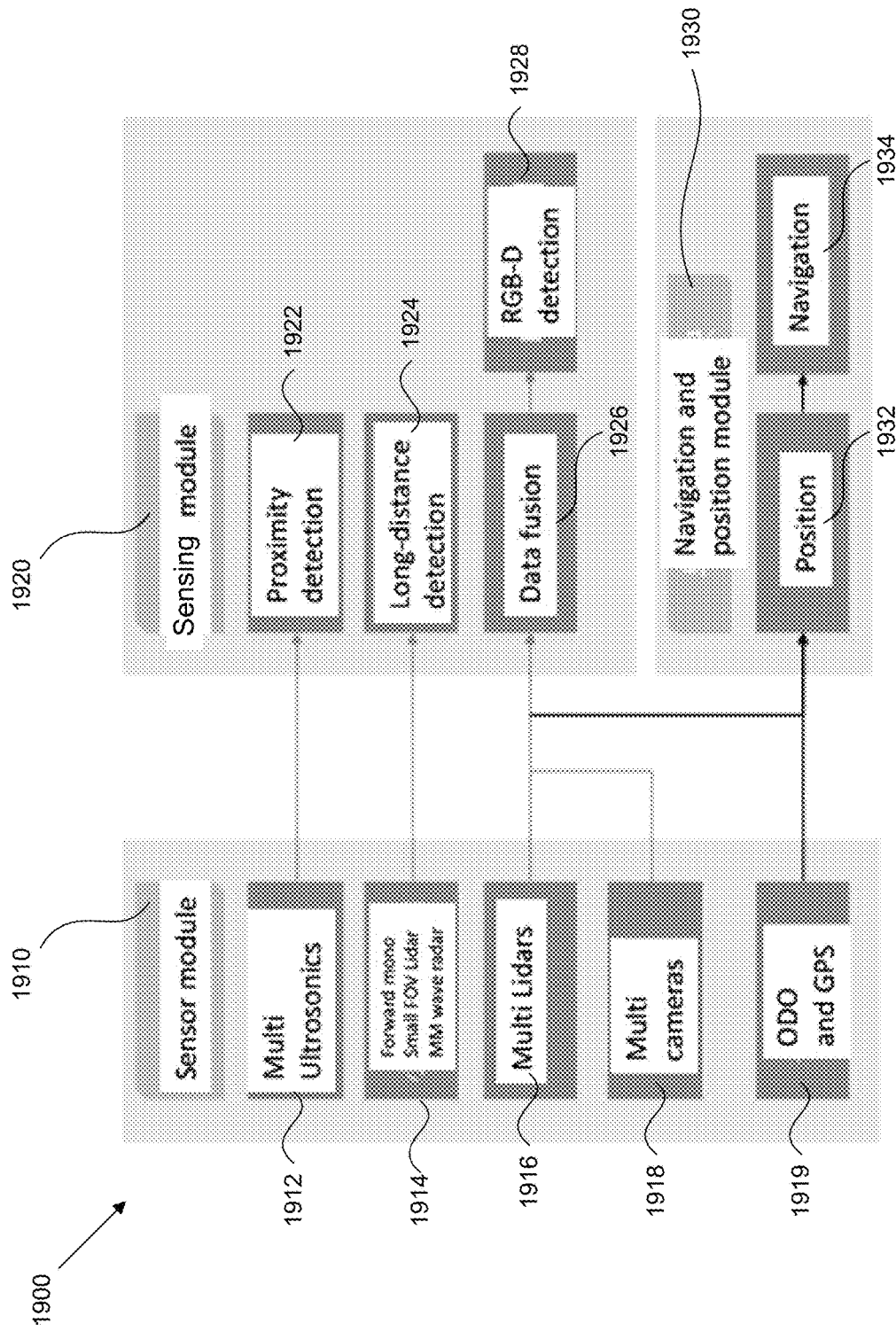
FIG. 21 illustrates an automatic driving system 1900 comprising a hardware sensor module 1910, a sensing module 1930, and a navigation and position module 1940, in accordance with some embodiments.

FIG. 21 illustrates an automatic driving system 1900 comprising a hardware sensor module 1910, a sensing module 1920, and a navigation and position module 1930, in accordance with some embodiments. The hardware sensor module may correspond to the sensing assembly described elsewhere herein. For example, the hardware sensor module may include a first group of sensors 1912 for proximity detection, and a second group of sensors 1914 for long-distance detection. The first group of sensors may include, for example one or more ultrasonic sensors coupled to multiple sides of the vehicle. The ultrasonic sensors may be configured to adjust its orientation to change its direction and scan area, so as to adequately sense the area proximate or surrounding the vehicle. The ultrasonic sensors can also scan areas that lie in the "blind" spots of the second group of sensors. The second group of sensors may include, for example a forward monocular camera, a long range lidar, and a millimeter-wavelength radar as described elsewhere herein. The sensor module may also include multiple lidar units 1916 provided in groups located around the vehicle, and multiple binocular cameras 1918. The lidar units may be single-channel lidar units. Additionally and optionally, the sensor module may include an odometer 1919-1 and a GPS sensor 1919-2.

The sensing module 1920 may receive the data from the sensor module 1910 in an asynchronous and Publish/Subscribe manner. The sensing module may include one or more submodules that subscribe to data collected by the sensor module 1910. The sensors in the sensor module 1910 may be configured to automatically send data to the corresponding subscribed sub-modules. For example, the ultrasonic sensors in the first group of sensors may send data to a submodule 1922 for detecting objects that are proximal to the vehicle. Similarly, the forward monocular camera, long range lidar, and millimeter-wavelength radar in the second group of sensors may send data to another submodule 1924 for detecting objects that are distant to the vehicle.

The multiple lidar units and binocular cameras may send data to a submodule 1926 which fuses the data into a set of RGB-D data. The RGB-D data is then provided to a detection submodule 1928 configured to analyze the RGB-D data to detect obstacles in the environment.

One or more submodules in the sensing module 1920 may be configured to provide the obstacle detection information to the navigation and position module 1930. The navigation and position module may comprise a position submodule 1932 for determining a plurality of positions and pathways for avoiding the obstacles so as to safely navigate the vehicle within an environment, based on the obstacle information obtained by the sensing module, along with real-time data from the vehicle odometer and the GPS sensor. The position submodule then sends the plurality of positions and pathways to a navigation submodule 1934 configured to control autonomous driving of the vehicle based on the plurality of positions and pathways.

In some embodiments, a plurality of sensors may be used to collect information about a vehicle. The plurality of sensors may comprise a plurality of sensor types, such as any combination of the various sensor types described elsewhere herein. For example, a first sensor type may be a vision sensor while a second sensor type may be lidar units. However, any combination of different sensor types may be provided.

In some embodiments, data from a first sensor type may be fused with data from a second sensor type. The fused data from the first and second sensor types may be subsequently used for detection about a vehicle.

In another example data from the first sensor type may be used for detection about a vehicle, and data from a second sensor type may be used for detection about a vehicle. This detection data may then be fused to come up with a master detection about a vehicle.

In some embodiments, weights may be assigned to data from the first sensor type and/or the second sensor type. The weight might depend on suitability of the sensor type for operation within an environment type within which the vehicle is operating. For example, if a first sensor type is more suitable for the environment that the vehicle is operating than the second sensor type, then the data from the first sensor type may be weighted more than the data from the second sensor type. In some embodiments, if data from a particular sensor type is not at all suited for operation within the environment, the data from the sensor type may be weighted at zero, or another low value. The data may be weighted prior to or after fusing the data. The data may be weighted prior to or after detection about the vehicle.

For any number of data from any number of sensor types (e.g., 1, 2, 3, 4, 5, 6, 7, 8, or more), the data may be fused before detection occurs, or afterwards. Data from any number of sensor types may be weighted. They may all be weighted together at the same time, or sequence.

The data from the lidar sensors (e.g. single or subsets of lidar units) and the data from vision sensors (e.g., binocular cameras or monocular cameras) can be processed using at least one or more of the following sensor fusion techniques. In some embodiments, the data from the lidar sensors and the vision sensors may be first fused together, and then the fused data can be used for obstacle detection and/or recognition of the surrounding environment.

In some other embodiments, some portion of the obstacle detection may occur prior to sensor fusion. For example, the data from the lidar sensors may be individually used to detect obstacles, and the data from the vision sensors may be individually used to detect obstacles. The obstacles may or may not be the same, of the same type, or at the same distance from the vehicle. An environmental map may then be created by fusing together information about the obstacles detected respectively by the lidar sensors and the vision sensors. One or more processors may be configured to determine characteristics of the obstacles from the environmental map, and correlate or corroborate the obstacles detected by the respective lidar sensors and vision sensors.

In some embodiments, the one or more processors may be configured to determine if the data from each of the lidar sensors and vision sensors is reliable. For example, under foggy conditions, if visibility is determined to fall below a threshold based upon image data collected by the vision sensors, the data from the vision sensors may be deemed unreliable, and may not be used in the sensor fusion (or alternatively, assigned a low weight in the sensor fusion). Under these foggy conditions, only the data from the lidar sensors may be used for obstacle detection. This may correspond to a first condition in which the data from the vision sensors is assigned a weight of 0 (minimum), whereas the data from the lidar units is assigned a weight of 1 (maximum). In another example, if visibility is determined to be above the threshold, the data from the vision sensors camera can then be used. Under such circumstances, the lidar sensor data and vision sensor data can each be used to detect obstacles, and the detected obstacles can then be fused together in an environmental map. The processors can be configured to determine a veracity (or accuracy) of the detected obstacles based on the fused data or environmental map.

In some embodiments, the data from the various sensors may be mapped onto a point cloud. One or more processors may be configured to continuously monitor the point cloud to determine whether points in the cloud are due to noise, or come from a same object/obstacle. The processors may be configured to track one or more points, and their spatial locations within the point cloud. For example, if the processors is tracking a particular point or cluster of points and determine that a duration of those point(s) in the point cloud is less a predefined time threshold, the processors may then classify those point(s) as noise and exclude them from further analysis. In some embodiments, the processors may assign a rating to objects in the point cloud based on the duration of their appearance in the point cloud. Objects appearing for brief time periods may be assigned a lower rating compared to objects appearing for longer time periods. In some embodiments, the rating of an object can also be determined by comparing the object from the point cloud to a set of known object models. For example, an object that closely matches a known model may be assigned a higher rating, whereas another object that less closely matches the known model may be assigned a lower rating. The rating of an object in the point cloud may be used to determine whether the object is in fact a real physical object, as well as the object type. In some cases, objects that have a rating greater than a first predetermined rating may be classified as real physical objects, whereas objects that a rating less than a second predetermined rating may be classified as noise data. In some embodiments, certain objects may have ratings that fall in between the first and second predetermined ratings. In those embodiments, the identification of those objects may be ambiguous, and the processors may be configured to continue monitoring those points over time to establish whether they correspond to real physical objects or noise data. In some cases, one or more sensors may be configured to collect more data on those objects or points that are deemed to be ambiguous.

Figure 22:
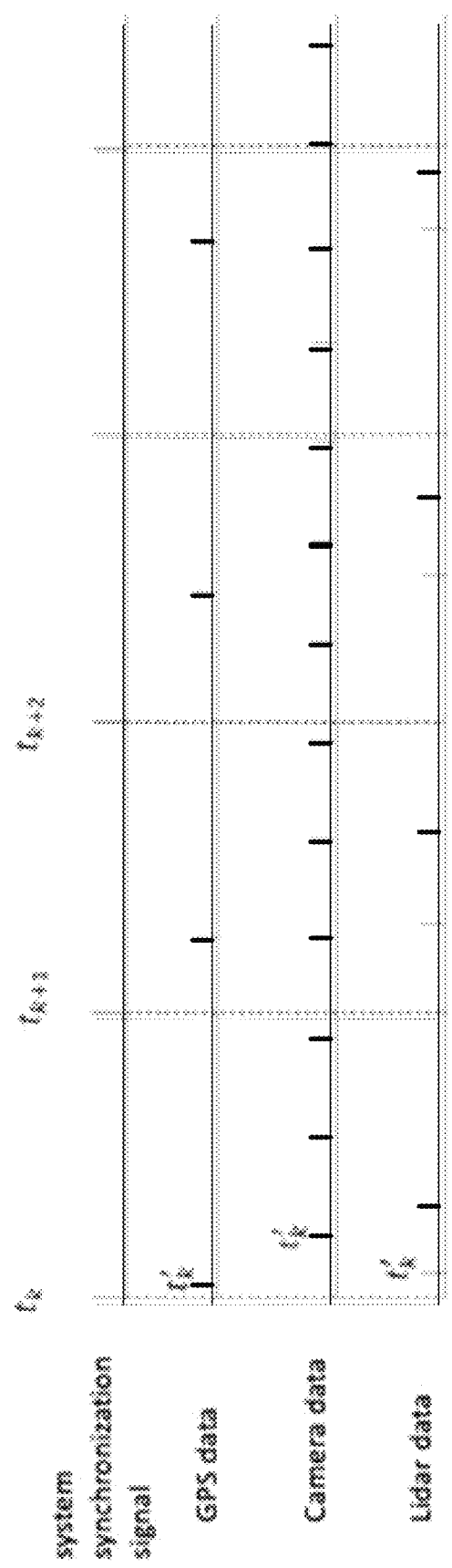
FIG. 22 illustrates the time synchronization of different types of sensors in a sensor module, in accordance with some embodiments.

FIG. 22 illustrates the time synchronization of different types of sensors in a sensor module, in accordance with some embodiments. As previously described, different submodules in a sensing module 1920 can subscribe to different sensor data from the hardware sensor module 1910, whereby each sensor sends data to the corresponding submodule(s). As shown in FIG. 20, a plurality of system synchronization signals $t_k$ and so forth may be generated at predetermined or random time intervals. The submodules may be configured to collect sensor data (e.g., as collected data for current frame), and process the data each time a system synchronization signal is received. The navigation and position module may be configured to receive data from lidars, cameras and GPS sensors that had been processed. Each time a system synchronization signal (e.g., $t_k$) is received, the next sensor data $t_k'$ can be collected and sent to the navigation and position module. Although the sensor data may be collected at different points in time by the respective sensors, the sensor data may be fused together as a common set of sensor data representative of the environment as at timing $t_k$.

In some embodiments, a system for controlling a movable object may be provided in accordance with embodiments. The system can be used in combination with any suitable embodiment of the systems, devices, and methods disclosed herein. The system can include a sensing module, processing unit, non-transitory computer readable medium, control module, and communication module.

The sensing module can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module can be operatively coupled to a processing unit having a plurality of processors. In some embodiments, the sensing module can be operatively coupled to a transmission module (e.g., a Wi-Fi image transmission module) configured to directly transmit sensing data to a suitable external device or system. For example, the transmission module can be used to transmit images captured by a camera of the sensing module to a remote terminal.

The processing unit can have one or more processors, such as a programmable processor (e.g., a central processing unit (CPU)). The processing unit can be operatively coupled to a non-transitory computer readable medium. The non-transitory computer readable medium can store logic, code, and/or program instructions executable by the processing unit for performing one or more steps. The non-transitory computer readable medium can include one or more memory units (e.g., removable media or external storage such as an SD card or random access memory (RAM)). In some embodiments, data from the sensing module can be directly conveyed to and stored within the memory units of the non-transitory computer readable medium. The memory units of the non-transitory computer readable medium can store logic, code and/or program instructions executable by the processing unit to perform any suitable embodiment of the methods described herein. For example, the processing unit can be configured to execute instructions causing one or more processors of the processing unit to analyze sensing data produced by the sensing module. The memory units can store sensing data from the sensing module to be processed by the processing unit. In some embodiments, the memory units of the non-transitory computer readable medium can be used to store the processing results produced by the processing unit.

In some embodiments, the processing unit can be operatively coupled to a control module configured to control a state of the movable object. For example, the control module can be configured to control the propulsion mechanisms of the movable object to adjust the spatial disposition, velocity, and/or acceleration of the movable object with respect to six degrees of freedom. Alternatively or in combination, the control module can control one or more of a state of a carrier, payload, or sensing module.

The processing unit can be operatively coupled to a communication module configured to transmit and/or receive data from one or more external devices (e.g., a terminal, display device, or other remote controller). Any suitable means of communication can be used, such as wired communication or wireless communication. For example, the communication module can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module can transmit and/or receive one or more of sensing data from the sensing module, processing results produced by the processing unit, predetermined control data, user commands from a terminal or remote controller, and the like.

The components of the system can be arranged in any suitable configuration. For example, one or more of the components of the system can be located on the movable object, carrier, payload, terminal, sensing system, or an additional external device in communication with one or more of the above. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system can occur at one or more of the aforementioned locations.

As used herein A and/or B encompasses one or more of A or B, and combinations thereof such as A and B. It will be understood that although the terms "first," "second," "third" etc. may be used herein to describe various elements, components, regions and/or sections, these elements, components, regions and/or sections should not be limited by these terms. These terms are merely used to distinguish one element, component, region or section from another element, component, region or section. Thus, a first element, component, region or section discussed below could be termed a second element, component, region or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the figures. It will be understood that relative terms are intended to encompass different orientations of the elements in addition to the orientation depicted in the figures. For example, if the element in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the element in one of the figures were turned over, elements described as "below" or "beneath" other elements would then be oriented "above" the other elements. The exemplary terms "below" or "beneath" can, therefore, encompass both an orientation of above and below.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. An autonomous driving assembly for a vehicle, comprising:
   a plurality of lidar units configured to be supported by a vehicle body, the lidar units being collectively configured to detect a periphery region in proximity to the vehicle body to aid in autonomous driving upon coupling the driving assembly to the vehicle body, the plurality of lidar units including a subset of lidar units including at least two lidar units having a fixed disposition relative to one another, the subset of lidar units being supported by a support structure;
   wherein:
      each of the plurality of lidar units has a field of view of less than 180 degrees;
      the support structure is attached to the vehicle rotatably attached to the vehicle body via a gimbal; and
      at least one of the plurality of lidar units is configured to be moved to focus on a region having a highest object density within a volume of space around the vehicle, the object density being determined based on a number of objects within the volume of space, a percentage of the volume of space that is taken up by one or more objects, or a percentage of the volume of space that is not taken up by one or more objects having a continuous volume that meets a minimum threshold.

2. The assembly of claim 1, wherein:
   the subset of lidar units is a first set of lidar units, and the support structure is a first support structure; and
   the plurality of lidar units further comprise a second subset of lidar units comprising at least two lidar units having a fixed disposition relative to one another; and
   the second subset of lidar units are supported by a second support structure that is separate from the first support structure.

3. The assembly of claim 2, wherein the first subset of lidar units and the second subset of lidar units are supported on different areas of the vehicle body, and configured to work in concert to detect the periphery region or a portion of the periphery region.

4. The assembly of claim 2, wherein the first subset of lidar units comprise a first lidar unit optically aligned in a first direction and a second lidar optically aligned in a second direction, wherein an angle between the first direction and the second direction is 50 degrees or less.

5. The assembly of claim 2, wherein:
   the first subset of lidar units comprise at least three lidar units supported by the first support structure; or
   the second subset of lidar units comprise at least three lidar units supported by the second support structure.

6. The assembly of claim 5, wherein the at least three lidar units of the first subset of lidar units are arranged in a manner to increase overlap between adjacent fields of view of the at least three lidar units.

7. The assembly of claim 5, wherein the at least three lidar units of the second subset of lidar units are arranged in a manner to increase overlap between adjacent fields of view of the at least three lidar units.

8. The assembly of claim 2, wherein the first subset of lidar units are configured to move relative to the second subset of lidar units so as to adjust an overlap of field of view between the first subset of lidar units and the second subset of lidar units.

9. The assembly of claim 2, wherein the first subset of lidar units and the second subset of lidar units are configured to move relative to each other so as to adjust an overlap of field of view between the first subset of lidar units and the second subset of lidar units.

10. The assembly of claim 2, wherein an overlap of field of view between the first subset of lidar units and the second subset of lidar units is adjustable in real-time to compensate for blind spots while the vehicle is in operation.

11. The assembly of claim 2, wherein at least 70 degrees of overlap of field of view exists between the first subset of lidar units and the second subset of lidar units.

12. The assembly of claim 2, wherein the first subset of lidar units comprises a collective field of view of at least 160 degrees, and the second subset of lidar units comprises a collective field of view of at least 160 degrees.

13. The assembly of claim 2, wherein a collective field of view of the first subset of lidar units and the second subset of lidar units is inversely proportional to a collective detection range of the first subset of lidar units and the second subset of lidar units.

14. The assembly of claim 2, wherein the at least two lidar units of the first subset of lidar units are configured to not move relative to one another during operation of the vehicle, and wherein the at least two lidar units of the second subset of lidar units are configured to not move relative to one another during operation of the vehicle.

15. The assembly of claim 2, wherein at least one of the first subset of lidar units or the second subset of lidar units undergoes an initial intrinsic calibration prior to utilization of the at least one of the first subset of lidar units or the second subset of lidar units for sensing.

16. The assembly of claim 15, wherein the lidar units of the first subset do not require online calibration during operation of the vehicle, and the lidar units of the second subset do not require online calibration during operation of the vehicle.

17. The assembly of claim 15, wherein the first subset of lidar units and the second subset of lidar units undergo an online calibration relative to each other during the operation of the vehicle.

18. The assembly of claim 1, further comprising:
- a long range lidar unit comprising a field of view that is narrower than a collective field of view of the plurality of lidar units.

* * * * *